United States Patent [19]

Maloney

[11] Patent Number: 5,801,628
[45] Date of Patent: Sep. 1, 1998

[54] INVENTORIABLE-OBJECT CONTROL AND TRACKING SYSTEM

[75] Inventor: William C. Maloney, Marietta, Ga.

[73] Assignee: Key-Trak, Inc., Ovieda, Fla.

[21] Appl. No.: 708,617

[22] Filed: Sep. 5, 1996

Related U.S. Application Data

[60] Provisional application No. 60/003,429 Sep. 8, 1995.
[51] Int. Cl.$^6$ .................................................. G08B 13/14
[52] U.S. Cl. ............................ 340/568; 235/375; 235/385
[58] Field of Search .................................... 235/385, 375; 340/568

[56] References Cited

U.S. PATENT DOCUMENTS

| | | | |
|---|---|---|---|
| 3,451,043 | 6/1969 | Krause . | |
| 4,419,734 | 12/1983 | Wolfson et al. | 364/567 |
| 4,519,522 | 5/1985 | McElwee | 221/13 |
| 4,549,170 | 10/1985 | Serres et al. | 340/568 |
| 4,575,719 | 3/1986 | Bertogna et al. | 340/825.35 |
| 4,595,922 | 6/1986 | Cobb et al. | 340/825.49 |
| 4,737,910 | 4/1988 | Kimbrow | 364/403 |
| 4,796,209 | 1/1989 | Burk | 364/559 |
| 4,814,592 | 3/1989 | Bradt et al. | 235/385 |
| 4,845,492 | 7/1989 | Cobb et al. | 340/825.49 |
| 4,866,661 | 9/1989 | de Prins | 235/385 |
| 4,889,977 | 12/1989 | Haydon | 235/385 |
| 5,038,023 | 8/1991 | Saliga | 235/385 |
| 5,287,414 | 2/1994 | Foster | 235/385 |
| 5,319,544 | 6/1994 | Schmerer et al. | 364/403 |
| 5,335,170 | 8/1994 | Pettiuti et al. | 364/403 |
| 5,374,815 | 12/1994 | Waterhouse et al. | 235/385 |
| 5,404,384 | 4/1995 | Colburn et al. | 377/6 |
| 5,426,284 | 6/1995 | Doyle | 235/385 |
| 5,521,815 | 5/1996 | Rose, Jr. | 364/409 |
| 5,533,079 | 7/1996 | Colburn et al. | 377/6 |

FOREIGN PATENT DOCUMENTS 9504324  2/1995  WIPO .

*Primary Examiner*—Harold Pitts
*Attorney, Agent, or Firm*—Isaf, Vaughan & Kerr

[57] ABSTRACT

An inventoriable-object control and tracking system comprising, in accordance with its preferred embodiments, an object identification assembly having an electronic device, with a unique electronically-readable identification code, which is connected to an inventoriable-object to enable control over access to the object and tracking of the object to identify a user in possession of the object. The system further includes a row and column matrix of electrical connectors located offset from a panel defining a corresponding row and column matrix of polarized slots for receipt of a plurality of object identification assemblies in a single orientation. Each connector of a matrix of electrical connectors comprises a pair of opposed, spring contacts having independently-deflectable portions to insure proper electrical contact with an electronic device of each object identification assembly. The system also includes a local controller connected to the matrix of electrical connectors and to a remote controller which executes, in accordance with the preferred methods, a plurality of software routines that communicate bi-directionally using a serial protocol, via a parallel data communications interface, to acquire and process data from each object identification assembly present. In accordance with the preferred apparatus, the system additionally comprises a storage unit having a drawer which is withdrawable from an enclosure upon operation of an electronically-actuated locking mechanism. The storage unit includes a slot and electrical connector positioned in a drawer face plate assembly for receipt of a personal identification assembly which enables a user to gain access to the plurality of object identification assemblies residing in the storage unit.

6 Claims, 39 Drawing Sheets

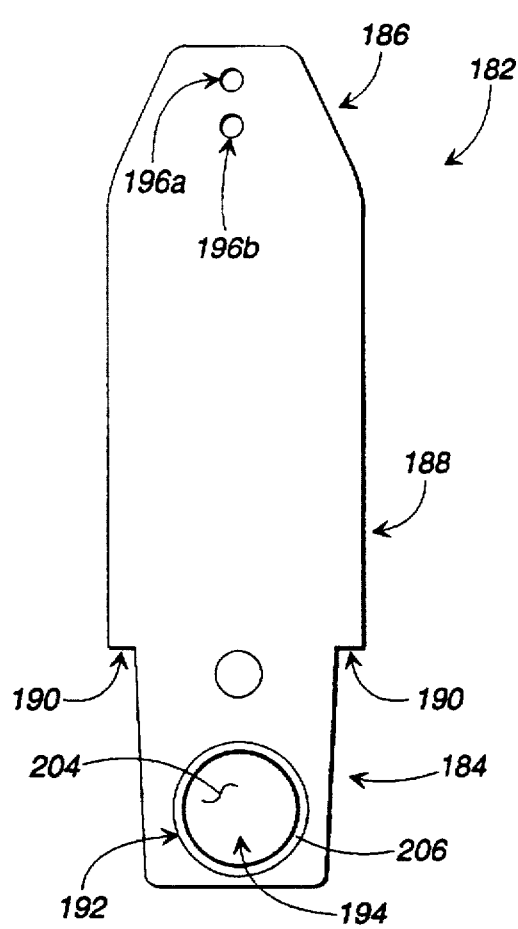
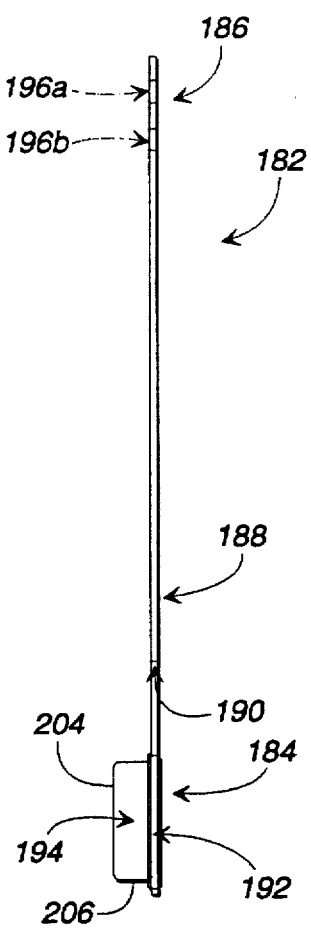
FIG. 12  FIG. 13
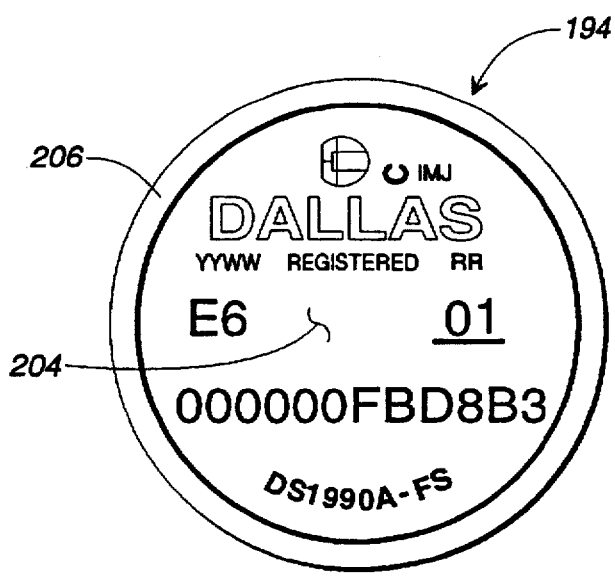
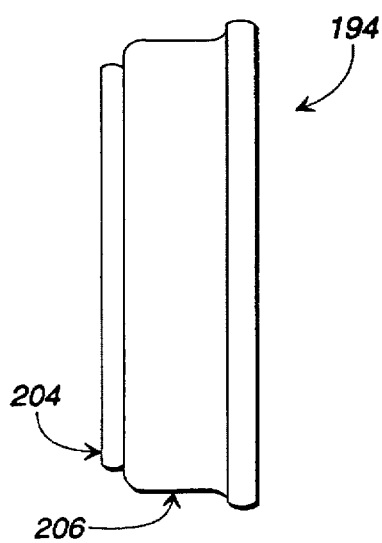
FIG. 14  FIG. 15

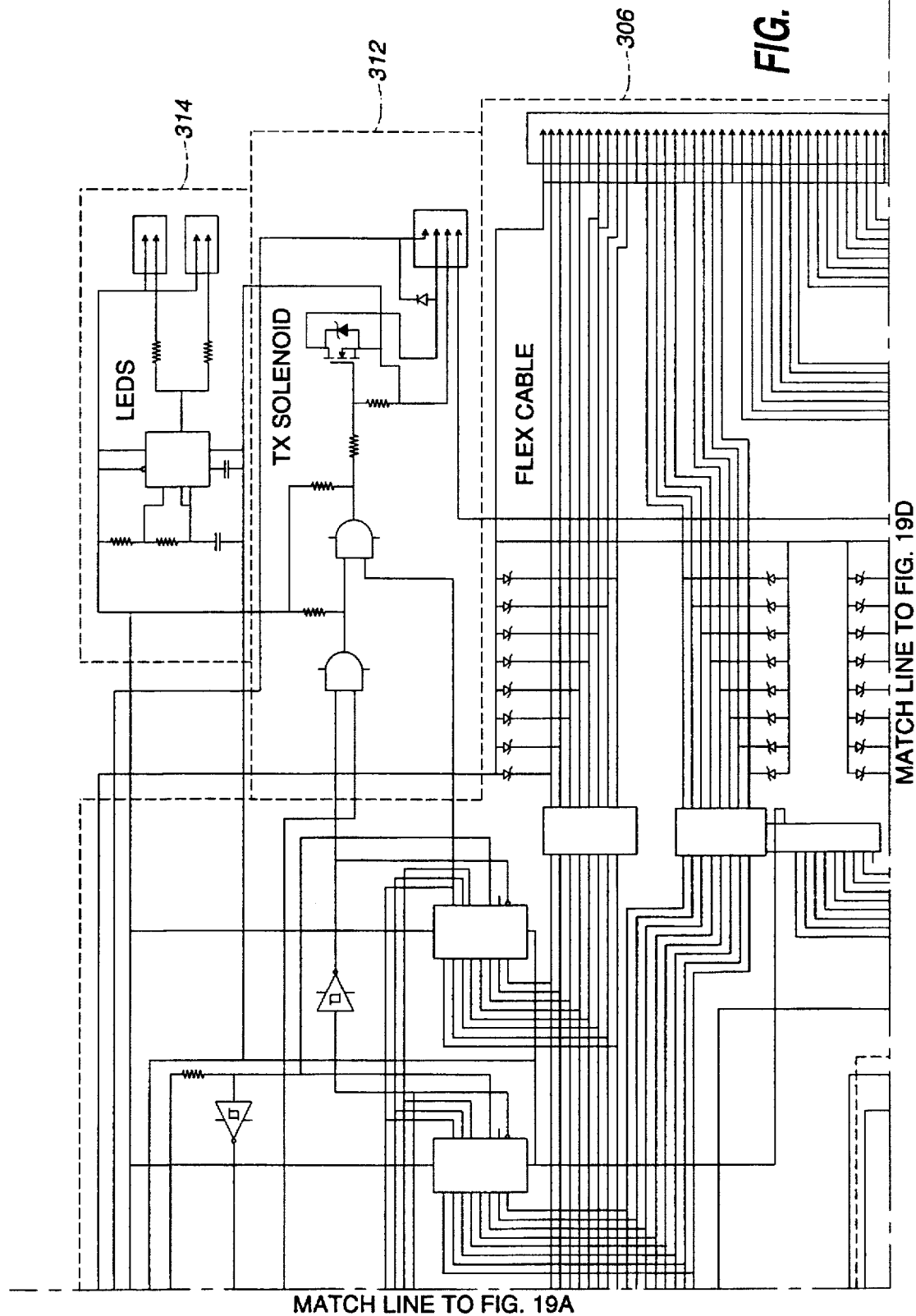

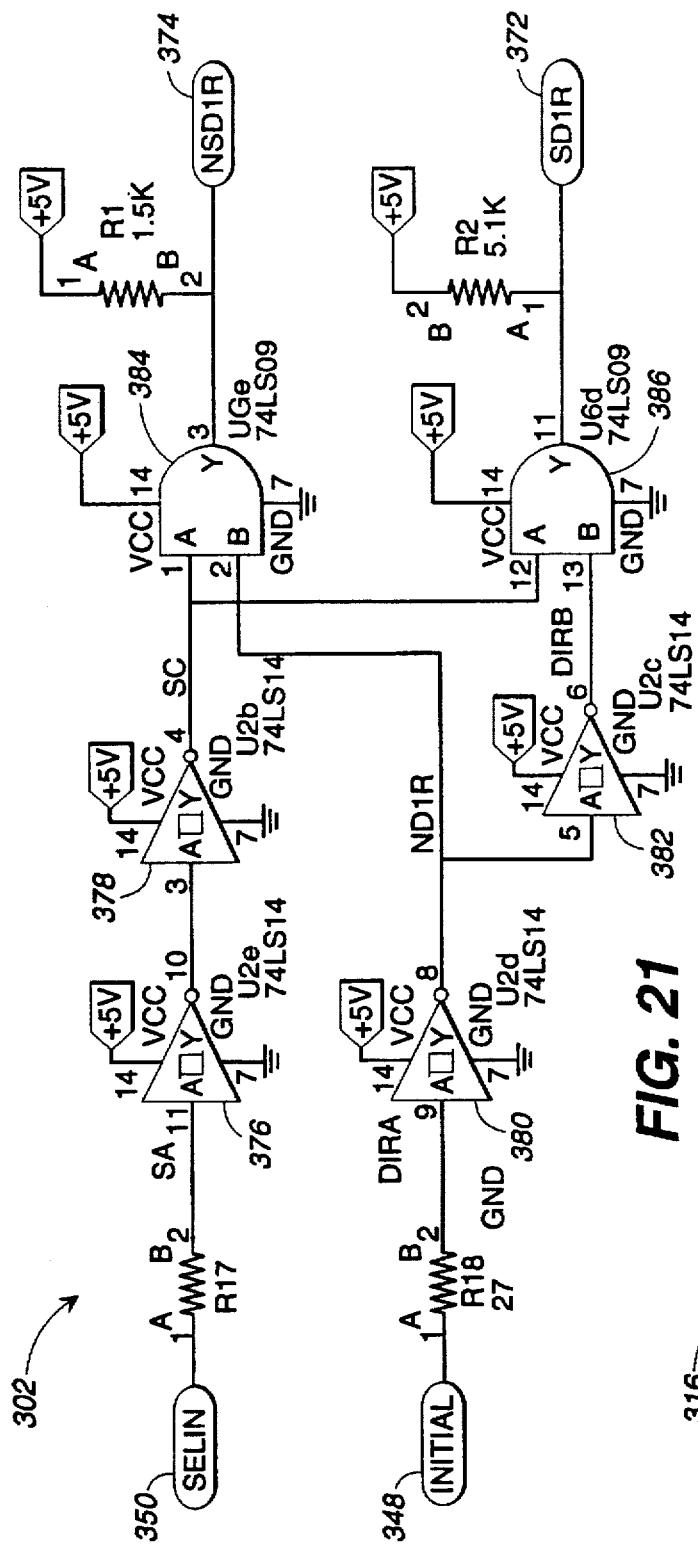
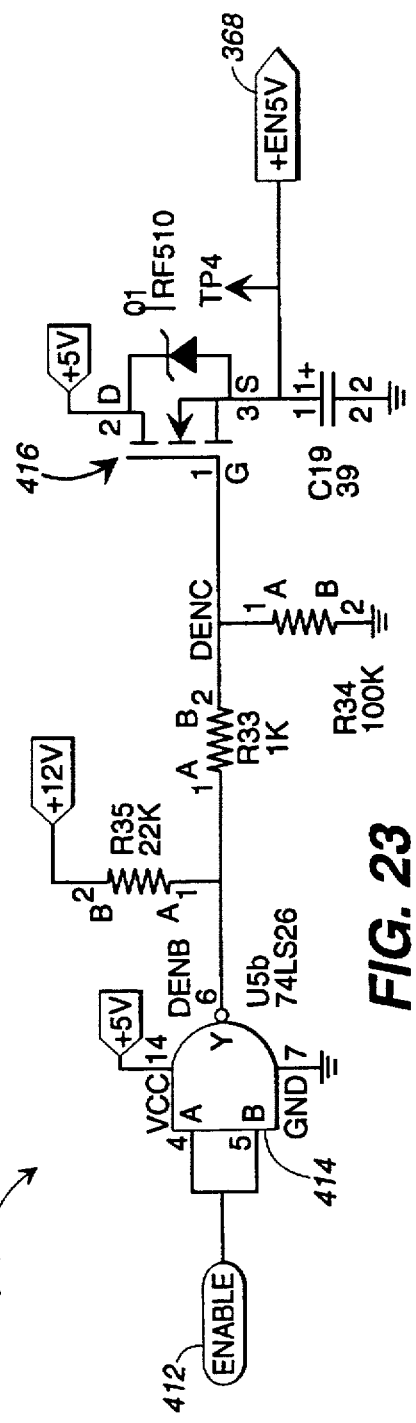
FIG. 21
FIG. 23

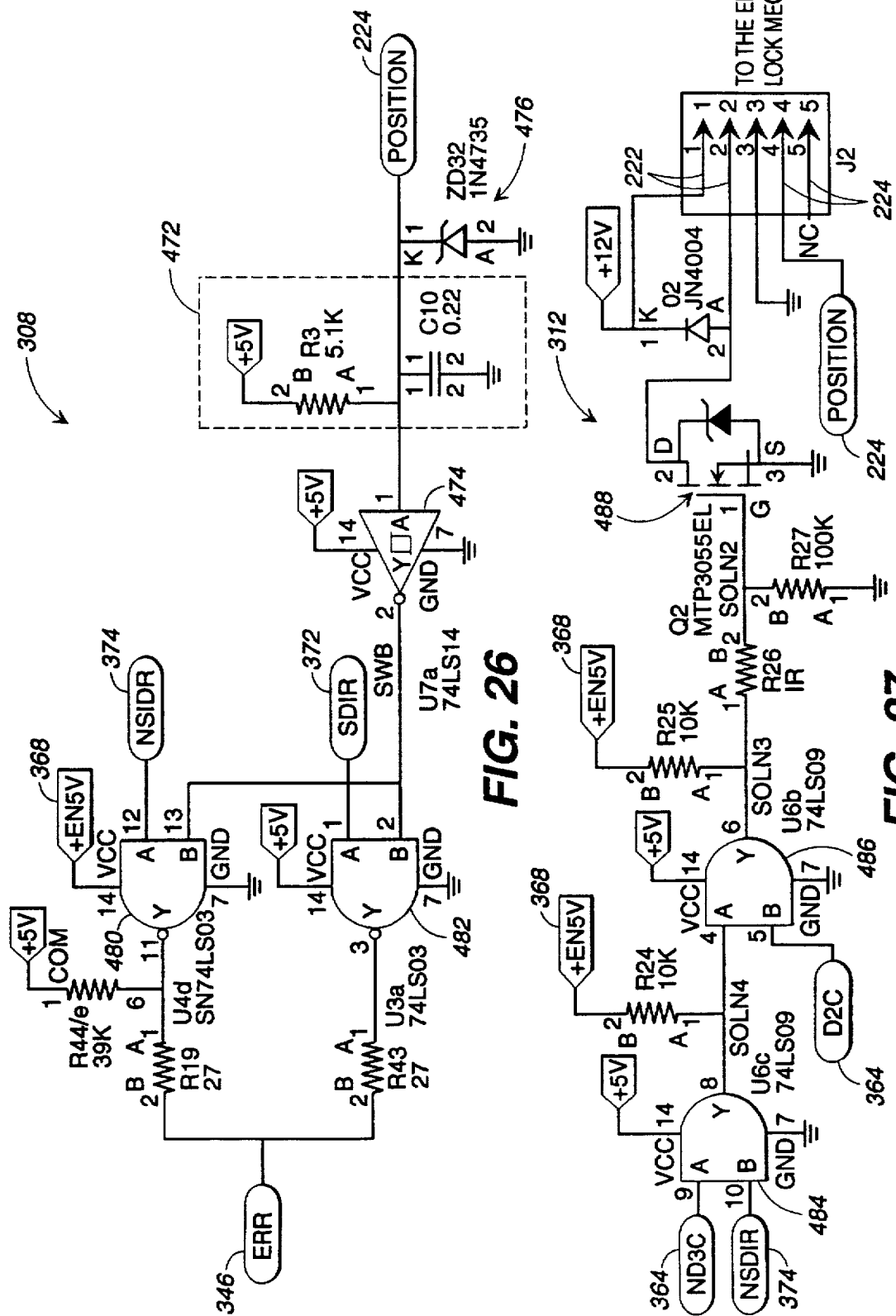

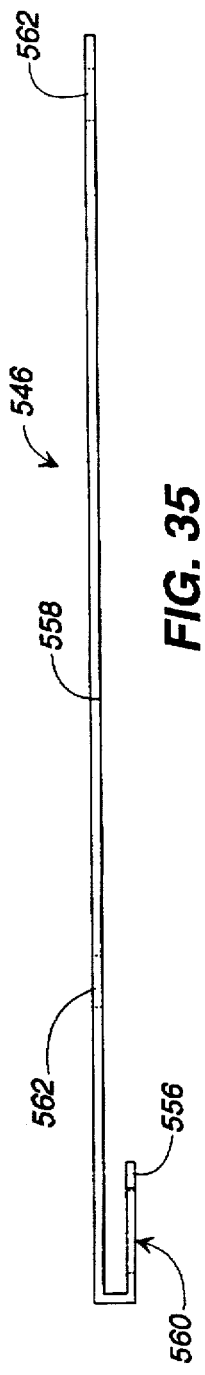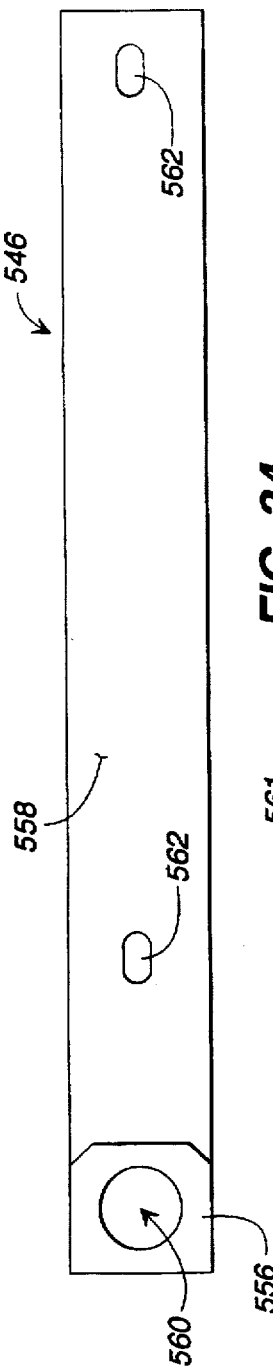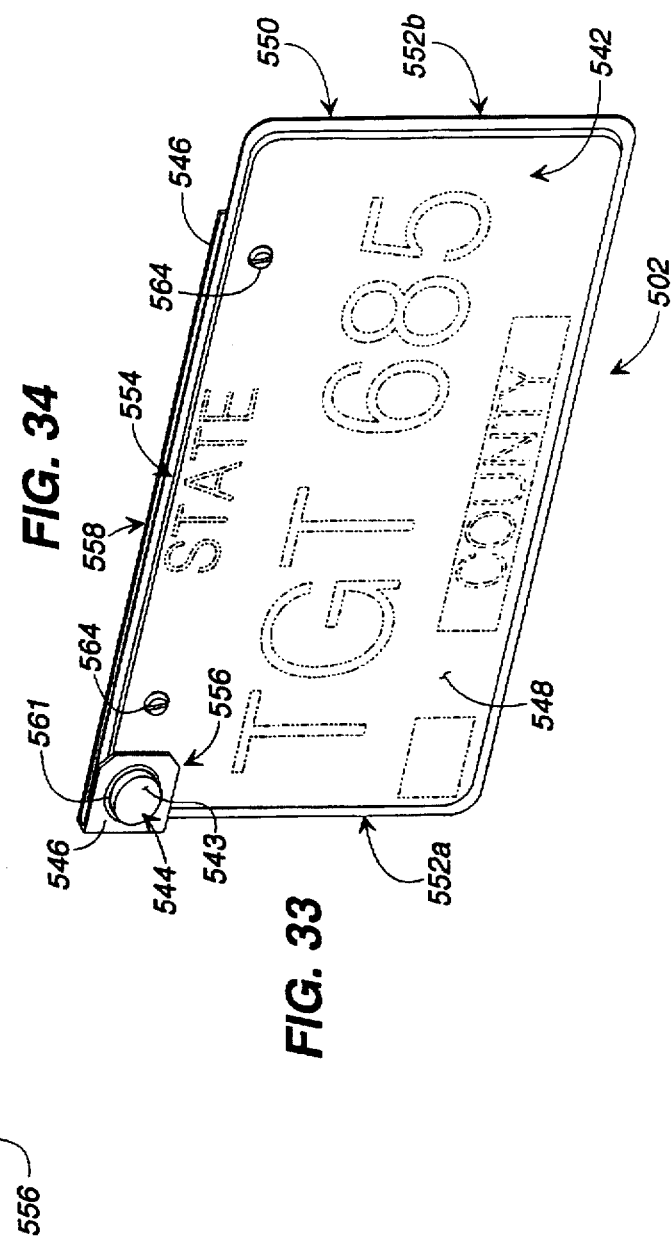

INVENTORIABLE-OBJECT CONTROL AND TRACKING SYSTEM

CROSS REFERENCE TO RELATED APPLICATIONS

This application claims the benefit of U.S. Provisional Application Ser. No. 60/003,429, filed Sep. 8, 1995.

FIELD OF THE INVENTION

This invention relates generally to the field of controlling and tracking access to various types of objects, and in its most preferred embodiments, to integrating an electronic identification code and tracking system to continually inventory a plurality of objects.

BACKGROUND OF THE INVENTION

Many objects have intrinsic value of their own or have value because they enable access to other valuable objects. For instance, jewelry and coins have intrinsic value due to the value of their precious stones or metals, automobiles have intrinsic value due to their ability to provide transportation, and files of business information have intrinsic value due to the content of the information contained within the files. Due to their intrinsic value and the potential for theft or misuse, jewelry, coins, and files are often kept in lockable storage cases or cabinets, while automobiles have their own door, trunk, and ignition locks. Because keys to the locks enable access to such objects, the keys, themselves, have value as well. Other objects may be inherently dangerous or create legal liability because unauthorized use of such an object can create a safety hazard for others. For instance, explosives and many medicines are inherently dangerous if used or dispensed improperly by untrained individuals. Also, unauthorized use or copying of keys to apartments or hotel rooms can enable theft of personal valuables and can create personal safety hazards to tenants and guests.

Regardless of the source of an object's value, its dangerous nature, or its potential for creating legal liability, business owners, landlords, and hotel proprietors have sought, over the years, to restrict access to the above-described objects, and others, by limiting their access to only those individuals who require access to the objects in order to perform their job functions. Typically, access has been restricted by first placing the objects in a lockable container for which a limited number of keys exist. Then, control over the removal and re-insertion of an object stored in the container has been maintained by employing manual procedural methods such as issuing keys for the container to only select individuals (i.e., usually managers or supervisors), requiring an employee or maintenance worker to request that a manager or supervisor provide access to the container for removal and/or re-insertion of objects from/to the container, and requiring the employee or worker to sign for any object removed and/or re-inserted from/to the container. For example, many automobile dealers place the keys to vehicles on their lot inside a locked box. When a potential customer desires to take a vehicle on a test drive, the customer's salesperson requests that a manager open the box so that the salesperson can remove the keys to the vehicle from the locked box. Similarly, many apartment landlords store the keys to tenants' units in a locked container and require maintenance workers to request use of a key when it is necessary for them to enter a tenant's unit to perform various maintenance tasks. Likewise, many hospitals provide only nursing supervisors with a key to a medicine cabinet and require other nurses to request that the supervisor open the cabinet to enable the removal of medicine for a patient.

Unfortunately, such manual apparatus and methods have met with limited success since they typically rely heavily on the thoroughness of humans to consistently follow designated procedures. Also, such systems are often fraught with the potential for misuse and abuse due to the dishonesty of some individuals and the inability of the systems themselves to detect possible misuse and abuse. For instance, once a salesperson or maintenance worker gains access to a key, the salesperson or worker may keep the key out of the locked container until the next day unless a manager or landlord reviews a log at the end of the day to determine which, if any, keys have not been returned to the locked container. By keeping the key overnight, a salesperson or cohort may steal a car (or items from a car) or a worker may return to an apartment complex during the night to burglarize a unit and, potentially, cause physical harm to a tenant. Additionally, by keeping a key out of the locked container for a longer period of time than necessary without the knowledge of a manager or landlord, the key may be copied or become lost by the salesperson or maintenance worker. The limited success and inherent problems of manual systems suggest the need for a system which automatically controls access to and tracks the use of various types of objects.

At least one automatic system has been developed and used in the past. The system employed a lockable container for storing objects which were each attached to a unique assembly identified by a conventional bar-code symbol printed on a tongue of the assembly. The container incorporated an enclosure and a drawer which, after unlocking, could be slidably removed or inserted into the enclosure, thereby creating relative movement between the drawer and a bar-code scanner mounted to the enclosure. When stored in the container, the tongue of each assembly extended downward through an aperture in a top panel of the drawer to enable reading of the bar-code for each assembly by the bar-code scanner whenever the drawer was moved relative to the enclosure. Because the bar-code scanner required relative movement between the drawer and the enclosure to function, the bar-codes associated with each object could only be read if the drawer was opened or closed. Therefore, the system had no way of detecting the presence or absence of an object unless the drawer was opened or closed, for example, by a manager or landlord. Thus, the system could not accurately track the amount of time that an object was not present in the container, nor could it determine who actually had possession of the object. Also, because the assemblies were not restrained and were therefore, prone to variable, random movement relative to the drawer and enclosure, misreads by the bar-code scanner were a continual problem requiring repeated openings and closings of the drawer to effect accurate reading of all of the bar-codes on the present assemblies. Other problems, including dust and dirt present on the bar-codes, also caused misreads by the bar-code scanner. Additionally, because the bar-codes were visible on the assemblies, they could be easily copied by an individual for the creation of substitute objects designed to "fool" the system, thereby compromising the security supposedly provided by the system.

There is a need, therefore, in the industry for a system which controls access to and tracks the use of objects of various types which address these and other related, and unrelated, problems.

SUMMARY OF THE INVENTION

Briefly described, the present invention includes an inventoriable-object control and tracking system which limits access to an inventoriable-object, tracks activities performed related to the object, and automatically detects the absence of the object for an inordinate amount of time. More particularly, the present invention includes an inventory control and tracking system which couples an electronic device, having a unique identification code, to an inventoriable-object and interfaces the device to a remote controller through a novelly-designed interface to enable periodic, consistent, and accurate identification of the object's presence or absence.

In the preferred embodiments of the apparatus of the present invention, each of a plurality of inventoriable objects is coupled to an object identification assembly having an electronic device mounted to an interface member of the assembly. The electronic device stores a unique identification code which is invisible to the eye, but electronically readable upon supply of a proper sequence of signals to the electronic device. By associating each inventoriable object with a different electronic device and, hence, a different identification code, the system provides a unique, trackable identification code for each object. Each identification assembly is receivable by a connector comprised of opposed, self-aligning, spring contacts having separate portions which independently deflect to insure and maintain consistent electrical interaction of the electronic device and connector. Each connector is one of a plurality of connectors which are electrically attached to a backplane with one contact of each connector being electrically connected to a positive data line and the other contact of each connector being electrically connected to a negative return line. The positive-connected contacts are arranged on the backplane in columns, while the negative-connected contacts are arranged on the backplane in rows, thereby defining a row and column matrix arrangement of connectors in which each connector has an associated row and column address and is independently, electrically-addressable from the other connectors of the matrix arrangement. The plurality of connectors and backplane are offset relative to panel which defines a polarized slot or opening aligned with each connector (the combination of a slot, or opening, and a connector being referred to herein as a receptacle) for receipt of an object identification assembly. The polarized design of each slot and opening enables receipt of an object identification assembly in only one orientation, thereby insuring that an identification assembly is always properly oriented for receipt by a connector.

The rows and columns of contacts are, in accordance with the preferred embodiments of the present invention, electrically coupled to a local controller by flexible cabling which enables relative motion between the backplane and the local controller should such relative motion be necessary in a particular embodiment. The local controller includes an electrically addressable switch which controls the supply of electrical power to most of the electronic components of the local controller. The addressable switch has a unique address and must electronically receive its address before it allows the supply of electrical power to the remaining electronic components of the local controller, thereby minimizing the opportunity for unauthorized operation of the local controller. The local controller also includes row and column address decoding and access circuitry which enables the unique identification of and independent interaction between a remote controller and each of the plurality of connectors to allow reading of the identification code of an electronic device by the remote controller when the electronic device resides in a connector. The remote controller connects electrically to and communicates with the local controller, in a bi-directional manner, using a parallel computer interface commonly employed for communication between computers and printers. Signals, including output data from the electrical devices, are transferred through the parallel interface in a serial protocol instead of the parallel protocol typically employed for communication between most computers and printers. The remote controller includes a central processing unit and a storage device to enable receipt and storage of data from the local controller which is related to the presence or absence of an object identification assembly and, hence, an object from the backplane.

In accordance with the first preferred embodiment of the present invention, a backplane and top panel are rigidly positioned within a cavity of a drawer which is slidably mounted within a surrounding enclosure. The top panel is oriented to enable user access for the insertion and removal of object identification assemblies when the drawer is extended in an open position from within the enclosure. A flexible cable attaches electrically to the rear of the backplane and extends forward beneath the backplane where it connects to a local controller which is mounted to the enclosure. The flexing and routing of the cable enable motion of the drawer relative to the local controller without binding of the cable. The local controller connects electrically to a face plate connector, substantially similar to those mounted to the backplane, which resides in a face plate of the drawer. The face plate connector is accessible from the front of the drawer at all times for receipt of a personal identification assembly (i.e., an object identification assembly without a coupled inventoriable-object for use by a user to provide a unique identification code for the user) from a user. The local controller also connects to an electrically-actuated lock which is located at the rear of the enclosure cavity for interaction with and securing of the drawer when the drawer is oriented in a closed position within the enclosure and for release of the drawer from the enclosure in response to appropriate signals communicated to the local controller from a remote controller. A drawer switch, also connected to the local controller, is positioned to contact the drawer when the drawer is positioned completely within the enclosure and to indicate the position of the drawer (i.e., open or closed) to the remote controller. The local controller is additionally connected, via parallel ribbon cabling, to a pair of pass-through parallel port connectors (also referred to herein as data communication interfaces) mounted to and extending through the rear of the enclosure. One of the pass-through parallel port connectors receives a parallel cable extending to the enclosure from a parallel port of the remote controller, while the other pass-through parallel port connector receives a parallel cable extending from the enclosure to a printer. The parallel cable (also referred to herein as a communication link) extending between the enclosure and remote controller defines a plurality of parallel communication paths which enable the remote controller to communicate with the local controller and the various components connected to or a part of the local controller including, for example, the connectors, the addressable switch, the face plate connector, the electrically-actuated lock, and the drawer switch.

In an alternate embodiment of the apparatus of the present invention, multiple enclosures are daisy-chainable together using parallel cables, serving as data communication links, which extend between the pass-through parallel ports (or data communication interfaces) of each enclosure, thereby causing the parallel ports and cables to function as a parallel bus. The enclosures of this alternate embodiment are substantially similar to the enclosure of the first preferred embodiment and, therefore, include components and elements substantially similar to those of the enclosure of the first preferred embodiment. For example, the local controller of each enclosure of the alternate embodiment includes an addressable switch having a unique address which enables an addressable switch and, hence, its local controller to be uniquely selected from those of other enclosures for operation by and communication with a remote controller.

According to a second preferred embodiment of the present invention, each inventoriable-object of a first plurality of inventoriable-objects (for example, a vehicle ignition key) is coupled to an object identification assembly of a first plurality of object identification assemblies and each inventoriable-object of a second plurality of inventoriable-objects (different than those of the first plurality of inventoriable-objects and including, for example, a vehicle license plate) is coupled to an object identification assembly of a second plurality of object identification assemblies (different than those of the first plurality of object identification assemblies). A first backplane and a first plurality of connectors (substantially similar to those of the first preferred embodiment), attached to the first backplane and defining a row and column matrix arrangement of connectors, are positioned within a cavity of a drawer which is slidably mounted within a surrounding enclosure. The first backplane and first plurality of connectors reside near the front of the drawer's cavity for receipt of object identification assemblies of the first plurality of object identification assemblies. A second backplane and a second plurality of connectors (substantially similar to those of the first preferred embodiment), attached to the second backplane and defining a row and column matrix arrangement having a single row and multiple columns of connectors, are positioned near the rear of the drawer's cavity and receive object identification assemblies of the second plurality of object identification assemblies. The second plurality of connectors and second backplane are offset from a panel having polarized openings which are each aligned with a connector of the second plurality of connectors. Flexible cables connect the first and second pluralities of connectors to a local controller and, hence, to a remote controller which are substantially similar in structure and function to the local and remote controllers of the first preferred embodiment of the present invention.

In accordance with preferred methods of the present invention, the above-described connectors receive a plurality of object identification assemblies with each connector receiving one object identification assembly which extends through an aligned, polarized slot or opening in a panel. The remote controller executes a plurality of software routines which communicate bi-directionally and serially with the local controller, via the data communication links and interfaces, to control access to and tracking of the plurality (or pluralities) of object identification assemblies received by the backplane (or backplanes). The software routines provide a plurality of functions including for example, but not limited to: addressing/selecting a local controller's addressable switch to cause the local controller to become active (i.e., power up the remainder of its electronic components); reading the unique identification code stored by an electronic device of a personal identification assembly which is received by a face plate connector of an enclosure's drawer; signaling a local controller, and its electrically-actuated lock, to release its drawer from its enclosure; requesting a local controller to return data which indicates the current position of its connected drawer switch and, hence, the position of a drawer; and, causing a local controller, after being activated, to uniquely address and read the identification code of the electronic device of each object identification assembly present in a connector of a row and column matrix of connectors coupled to the local controller. When directed by a remote controller to uniquely address and read the identification codes of the present electronic devices, a local controller outputs each identification code to the remote controller for further processing, including, for instance, logging of all removals and insertions (or replacements) of object identification assemblies (and, hence, inventoriable-objects), determination of the current location (slot or opening, and drawer) of each object identification assembly, and periodic checking to determine whether or not an object identification assembly is absent from the connectors of a backplane and if so, whether or not the object identification assembly has been absent for an inordinate amount of time. Note that the remote controller may request that a local controller read and output the identification codes of any electronic devices present in a connector matrix at any time (whether or not its associated drawer is open, partially open, or closed relative to its enclosure) and without requiring any movement, relative or absolute, of the inventoriable-objects, their coupled object identification assemblies, or their corresponding connectors, drawers, or enclosures.

According to the preferred method of the present invention, a face plate connector of a drawer receives a personal identification assembly in response to a prompt issued to a user and a remote controller, functioning in cooperation with the drawer's local controller, reads the identification code stored by the electronic device of the personal identification assembly. Upon receiving a password from the user attempting to gain access to the system and verifying that the password is valid for the personal identification assembly received by the face plate connector, the remote controller prompts the user to identify the type of activity that the user wishes to perform on an object identification assembly (for example, removal of an object identification assembly from a drawer or insertion of an object identification assembly into a drawer). If the user indicates that he wishes to remove an object identification assembly from an enclosure, the remote controller prompts for and receives the identity of an object desired by a user for removal and then determines which enclosure, of a plurality of enclosures (if more than one enclosure is present in the system), stores the object identification assembly which is coupled to the object desired by the user. The remote controller next displays the slot or opening location of the object identification assembly (and, hence, the location of the desired object) relative to the other slots and/or openings in the enclosure's drawer on a display screen shown by the system's video monitor and causes the enclosure's drawer electrically-actuated lock to be released by signaling the enclosure's local controller to operate the lock mechanism. If, on the other hand, the user indicates that he wishes to insert (or return) an object identification assembly into an enclosure and if the system is configured to track multiple objects, the remote controller prompts for and receives input from the user which identifies the type of object to be received by a drawer. The remote controller then determines the location of one or more empty slots or openings in an enclosure, suitable for the type of object to be received, and displays the locations on a display screen shown on the system's video monitor. The remote controller subsequently signals the appropriate local controller, via a data communication link and interface, to cause the electrically-actuated lock of the corresponding enclosure to operate, thereby releasing the enclosure's drawer for insertion of the object by the user.

The remote controller, acting in conjunction with the local controller and in accordance with the preferred method of the present invention, repeatedly scans the backplane connectors to identify which object identification assemblies have been removed or replaced and logs the identification code of the removed or replaced assemblies along with the date/time, location of the assemblies, and the identification code read from the personal identification assembly received by the face plate connector (i.e., thereby identifying the user accessing the drawer). The remote controller also monitors the drawer switch to determine whether or not the drawer has been open for an excessive amount of time. If so, the remote controller sounds an alarm to alert someone to close the drawer. If not, the remote controller continues to scan the backplane connectors and continues to monitor the drawer switch until the remote controller detects that the drawer has been closed. Once the drawer is closed, the remote controller performs a final scan of the backplane connectors to identify and log object identification assemblies which are present in the drawer. The remote controller then processes the identification codes of the present object identification assemblies to make a final determination of which assemblies have been removed or inserted while the drawer was open, a determination as to which user performed the removal or insertion, and a determination of the date and time which identifies when the assemblies were removed from or inserted into the drawer. The remote controller subsequently determines whether or not any assemblies have been removed from the system for an excessive amount of time and, if so, issues an alarm to call attention to the missing assemblies.

Accordingly, an object of the present invention is to control access to and monitor activities related to a plurality of inventoriable-objects.

Another object of the present invention is to detect the presence or absence of an object.

Still another object of the present invention is to detect the presence or absence of an object without movement of the object or an interface member coupled to the object.

Still another object of the present invention is to detect the presence or absence of an object without movement of the object, or an interface member coupled to the object, relative to another component.

Still another object of the present invention is to detect the presence or absence of an object at any time.

Still another object of the present invention is to detect the presence or absence of an object with the object's receiver in any position or orientation.

Still another object of the present invention is to rapidly locate a particular object.

Still another object of the present invention is to display the location of a particular object.

Still another object of the present invention is to suggest a storage location for the return of an object.

Still another object of the present invention is to log the removal and replacement of objects by the object's identification code, the user's identification code, and the date/time of removal and replacement.

Still another object of the present invention is to identify objects which have been removed for an excessive period of time.

Still another object of the present invention is to uniquely identify an object with an identification code which is difficult to copy.

Still another object of the present invention is to attach an object to an assembly which enables tracking of the object.

Still another object of the present invention is to interface an electronic device, having a unique identification code, and a connector to enable accurate, repeatable reading of the identification code from the electronic device.

Still another object of the present invention is to form a connector, for receipt of an electronic device, from opposed contacts having portions which deflect independently to insure electrical connection with the electronic device.

Still another object of the present invention is to form a row and column matrix of contacts from a plurality of two-contact connectors by electrically connecting a first contact of each connector to a row of the matrix and a second contact of each connector to a column of the matrix.

Still another object of the present invention is to individually address each connector to determine whether or not an identification assembly and, hence, an object is present.

Still another object of the present invention is to retrieve the identification code from each of a plurality of identification assemblies.

Still another object of the present invention is to enable bi-directional, serial communication between a remote controller and an identification assembly using a parallel communication path.

Still another object of the present invention is to control access to a plurality of objects by storing them in an enclosure and controlling access to the enclosure.

Still another object of the present invention is to identify a user who removes or replaces an object from the enclosure.

Still another object of the present invention is to supply a unique address to a local controller in order to activate and enable operation of the local controller.

Still another object of the present invention is to determine whether or not a drawer resides fully within an enclosure.

Still another object of the present invention is to release a drawer from an enclosure by operating an electrically-actuated lock.

Still another object of the present invention is to enable daisy-chaining of a plurality of enclosures in a parallel bus arrangement.

Other objects, features, and advantages of the present invention will become apparent upon reading and understanding the present specification when taken in conjunction with the appended drawings.

BRIEF DESCRIPTION OF THE DRAWINGS

FIG. 12 is an isolated, front view of an identification assembly in accordance with the first preferred embodiment of the present invention.

FIG. 13 is an isolated, side view of the identification assembly of FIG. 12.

FIG. 14 is a front view of the electronic device of FIG. 12.

FIG. 15 is a side view of the electronic device of FIG. 14.

FIG. 21 is an electrical schematic of the receive direction section of FIG. 19.

FIG. 23 is an electrical schematic of the enable section of FIG. 19.

FIG. 26 is an electrical schematic of the transmit enclosure position section of FIG. 19.

FIG. 27 is an electrical schematic of the lock driver section of FIG. 19.

FIG. 33 is a front, perspective view of an object identification assembly of a second plurality of object identification assemblies of the second preferred embodiment of the present invention.

FIG. 34 is a front, elevational view of the interface member of the object identification assembly of FIG. 33.

FIG. 35 is a top, plan view of the interface member of FIG. 33.

DETAILED DESCRIPTION OF THE PREFERRED EMBODIMENT

Figure 1:
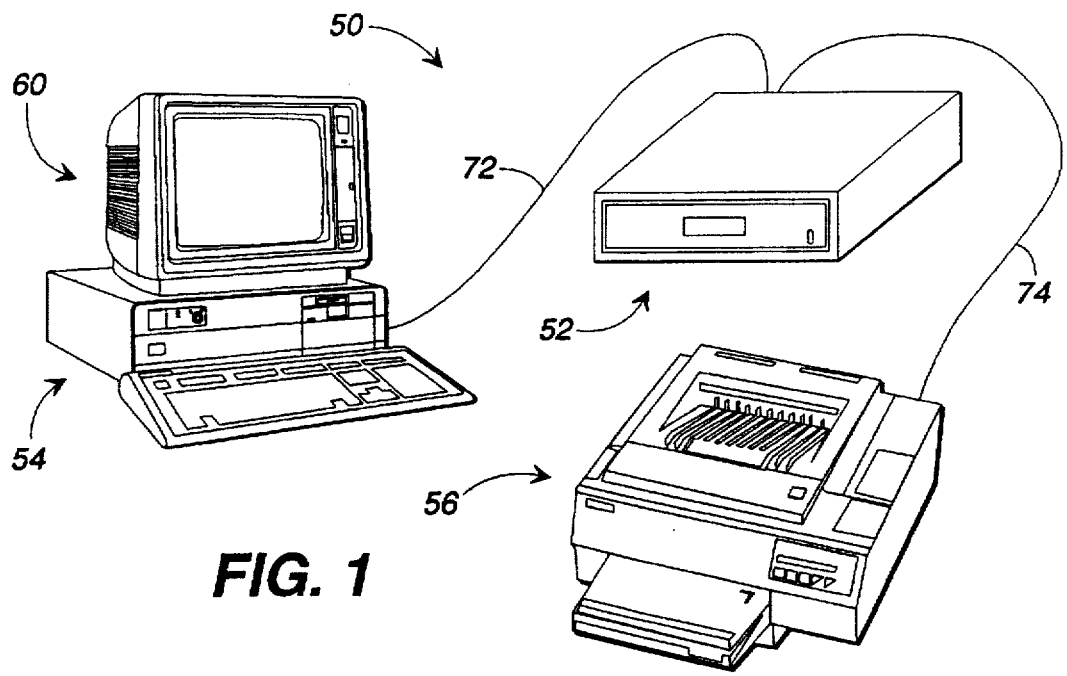
FIG. 1 is a front, perspective, pictorial representation of an inventoriable-object control and tracking system in accordance with the first preferred embodiment of the present invention.
Figure 2:
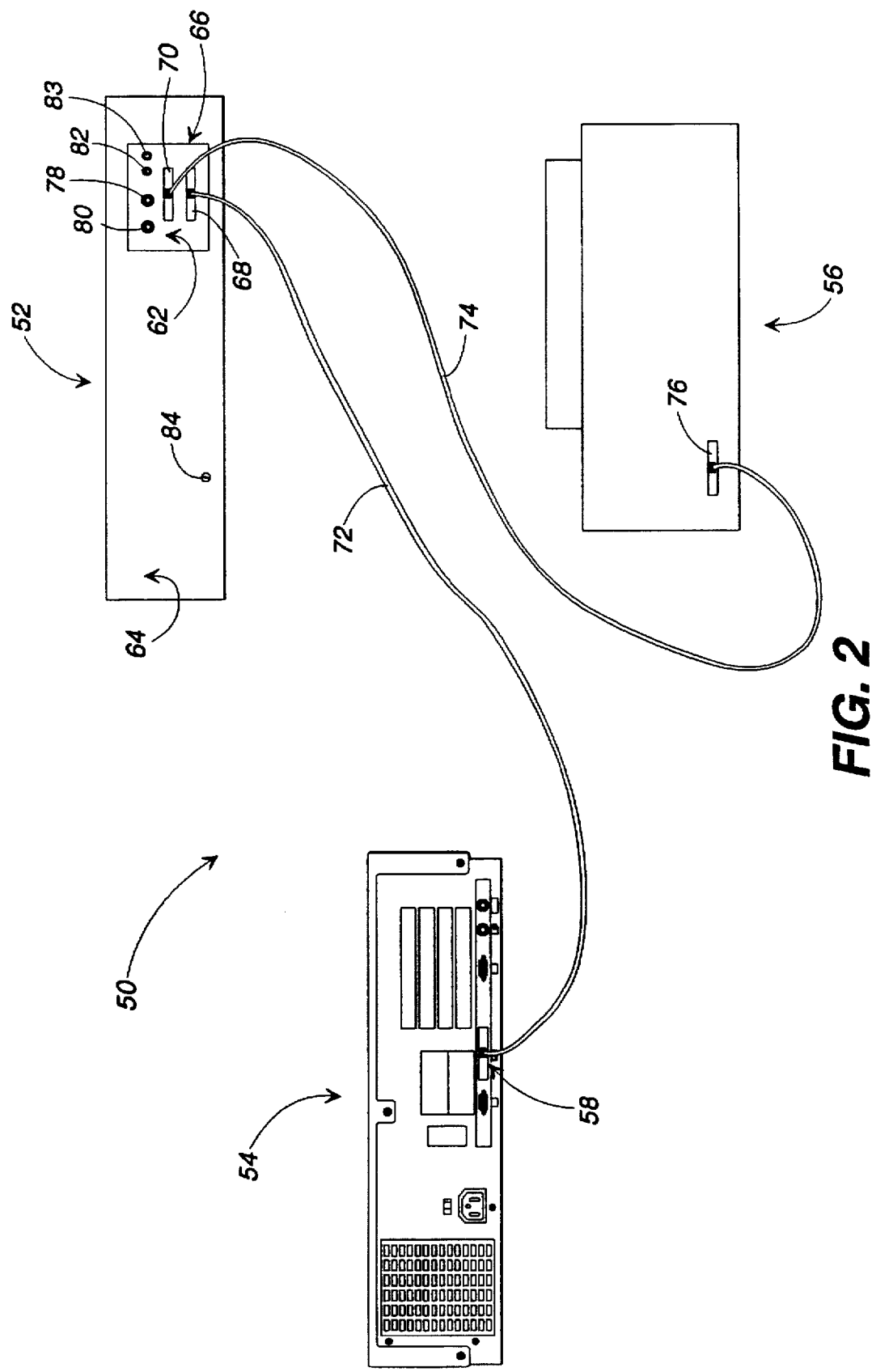
FIG. 2 is a back, schematic view of the inventoriable-object control and tracking system of FIG. 1.

Referring now to the drawings, in which like numerals represent like components throughout the several views, an inventory control and tracking system 50, in accordance with the first preferred embodiment of the present invention, is displayed in FIGS. 1 and 2. The inventory control and tracking system 50 comprises an inventoriable-object storage unit 52 which is electronically interposed between a remote controller 54 and a printer 56. An example of a remote controller 54, acceptable in accordance with the present invention, is an IBM-compatible personal computer having a central processing unit, a hard disk drive, a random access memory, a keyboard, a video interface, and a parallel communications port 58 (or data communication interface 58). A video monitor 60 resides atop the remote controller 54 and receives video data for display to system users. The components of the remote controller 54 and video monitor 60 perform in accordance with their conventional functions, thereby enabling the execution of computer software routines as described below. It is understood that the scope of the present invention includes other forms of remote controllers having similar capabilities and performing similar functions.

FIG. 2 displays the rear of the remote controller 54, the storage unit 52, and the printer 56 and better illustrates the electronic connection of the three components than does FIG. 1. As seen in FIG. 2, the storage unit 52 has a utility panel 62 and a back panel 64 which defines a cut-out 66 for receipt of electrical connectors attached to a portion of the utility panel 62 visible through the cut-out 66. The utility panel 62, discussed below in more detail, resides inside the storage unit 52 and against the back panel 64. The utility panel 62 includes bi-directional, parallel data communications ports 68,70 (or data communication interfaces 68,70) which are interconnected in a pin-for-pin arrangement to enable parallel communications signals supplied to port 68 to be accessed at port 70 and vice versa (e.g., configuring the ports 68,70 as "pass-through" or "daisy-chainable" parallel data communications ports 68,70). A parallel data communication path 72 (or data communication link 72) extends between the parallel communications port 58 of the remote controller 54 and parallel data communications port 68 of the storage unit 52. Preferably, the parallel data communication path 72 is a conventional parallel data cable well-known to those in the computer industry. As discussed below, the parallel data communication path 72 carries data signals, in a serial protocol, bi-directionally between the remote controller 54 and the storage unit 52. Another parallel data communication path 74 (or data communication link 74) extends between the pass-through, parallel data communications port 70 and a parallel data communications port 76 present at the back of the printer 56 to carry data signals, in a parallel protocol, from the remote controller 54 to the printer 56.

The utility panel 62 also includes power supply connectors 78,80 which are connected together inside the storage unit 52 to allow one connector 78 to receive electrical power from a power source (not shown), while the other connector 80 supplies electrical power to an additional storage unit 52 as described below. A fuse holder 82 and fuse (not visible) are secured to utility panel 62 and are electrically connected to the power supply connectors 78,80. The fuse protects internal electronic components of the storage unit 52 against over-current conditions. The back panel 64 also includes a key lock assembly 84, discussed below, having an externally accessible keyway as seen in FIG. 2. The key lock assembly 84 enables a user, in an extreme situation, to manually override an electrically-actuated lock mechanism 218 (see FIG. 17).

Figure 3:
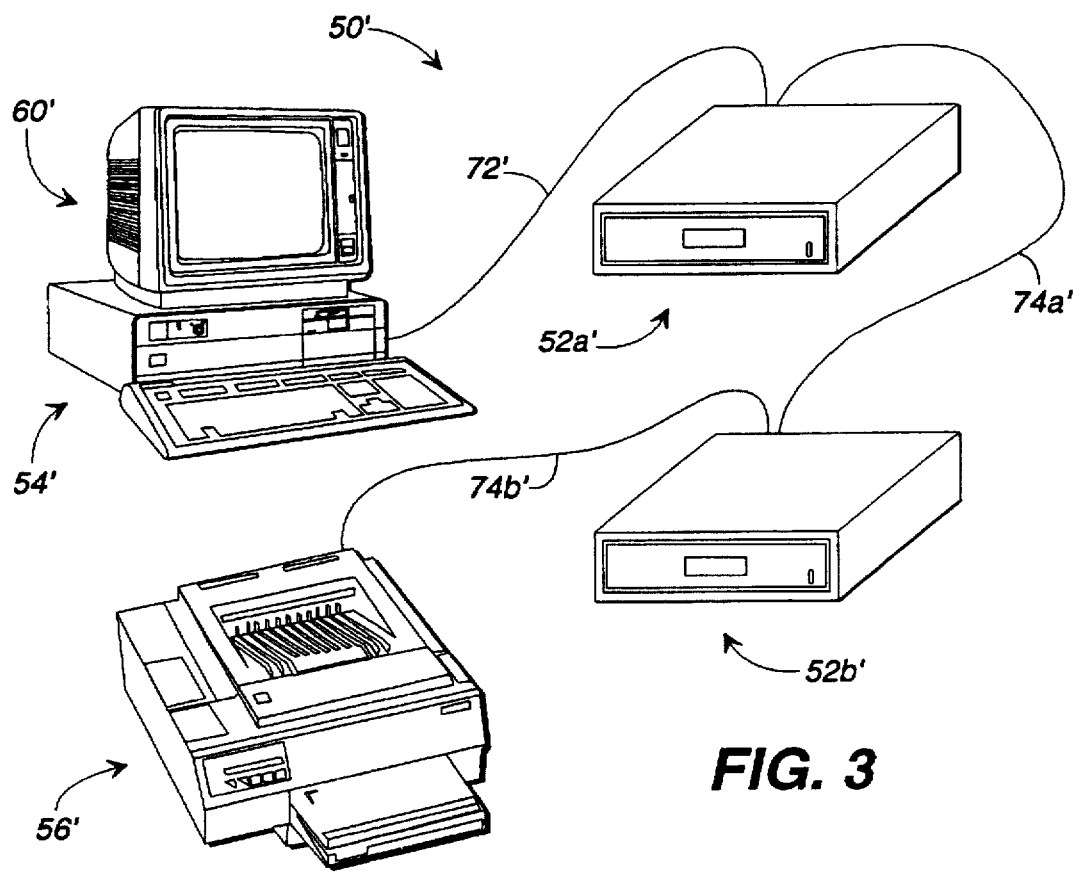
FIG. 3 is a front, perspective, pictorial representation of an inventoriable-object control and tracking system in accordance with an alternate embodiment of the present invention.

Note that in an alternate preferred embodiment of the present invention, as seen in FIG. 3, multiple storage units 52' (substantially similar to those of the first preferred embodiment) are employed to increase the number of inventoriable-objects which may be stored and tracked by the system 50'. The pass-through, parallel data communications ports 68',70' (or data communication interfaces 68',70') of each storage unit 52' are interconnected by parallel data communication paths 74a',74b' (or data communication links 74a',74b') to enable the remote controller 54' to communicate serially, using a serial data protocol, with each storage unit 52'. It is understood that the scope of the present invention includes various system configurations, including those configurations having a plurality of storage units 52'.

Figure 4:
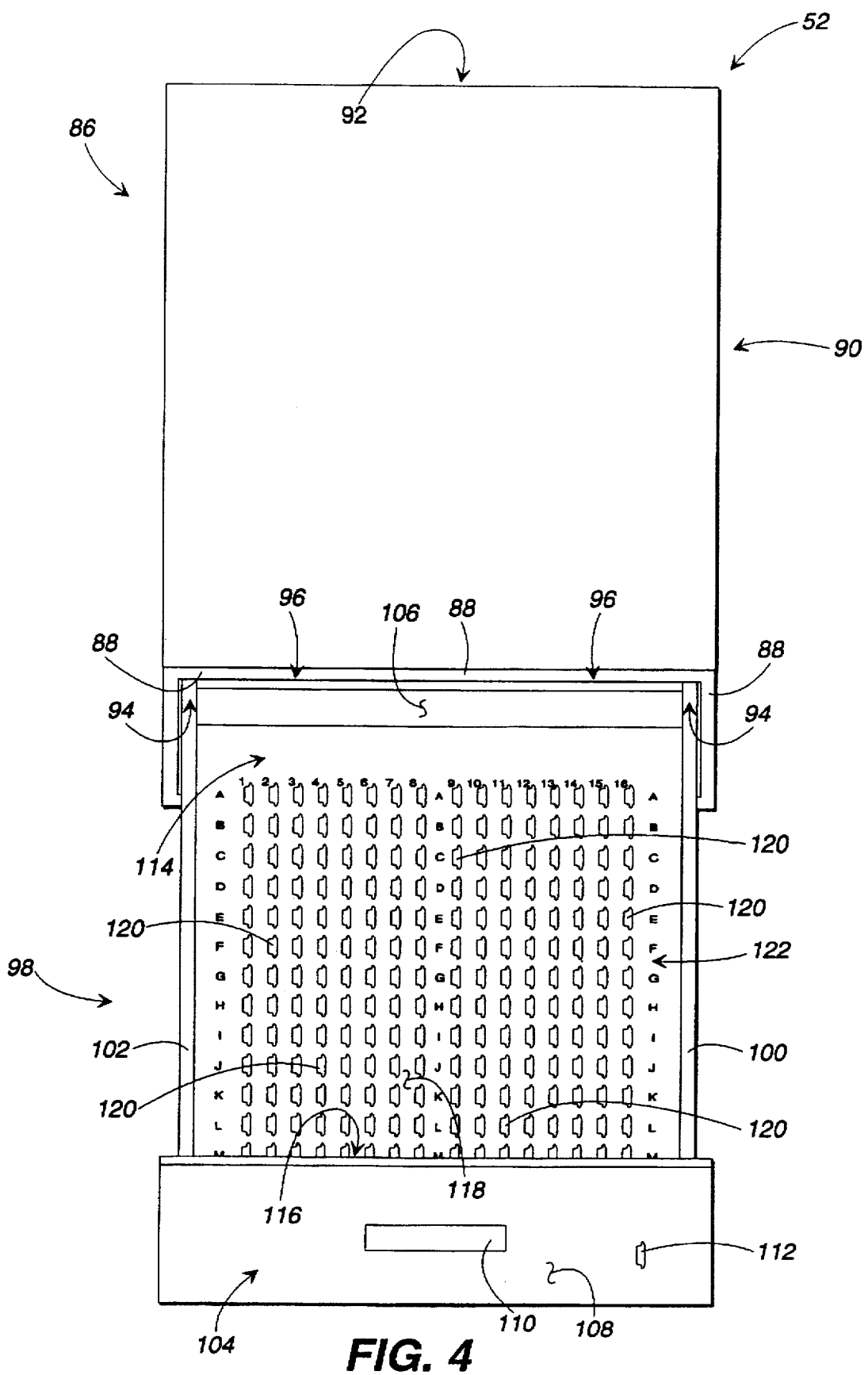
FIG. 4 is an isolated, front, perspective, schematic view of an enclosure and drawer of the inventoriable-object control and tracking system of FIG. 1.

FIG. 4 displays an isolated, front, perspective, schematic view of a storage unit 52 in accordance with the first preferred embodiment of the present invention. The storage unit 52 comprises an enclosure 86 having a front face 88, a right side 90, and a back 92. The enclosure 86 defines a cavity 94 which is accessible via an opening 96 defined by the front face 88. The cavity 94 slidably receives a drawer 98 which is shown partially extended from the cavity 94 in FIG. 4. The drawer 98 has a right side member 100, a left side member 102, a front face assembly 104, and a back member 106. The front face assembly 104 has a front face plate 108 and an inset handle 110 which is flush with the front face plate 108. The inset handle 110 enables easy withdrawal of the drawer 98 from the enclosure 86 after release of the drawer 98 by the electrically-actuated lock mechanism 218 (see FIGS. 17 and 18). The front face plate 108 defines an ID slot 112 for receipt of a user's personal identification assembly. A connector, similar to those described below, is mounted directly behind the ID slot 112 and within the front face assembly 104 for establishing electrical contact with the electronic device of a user's personal identification assembly. LED's 113 are positioned in the front face 88 and flash when the enclosure 86 is activated as discussed below.

Figure 5:
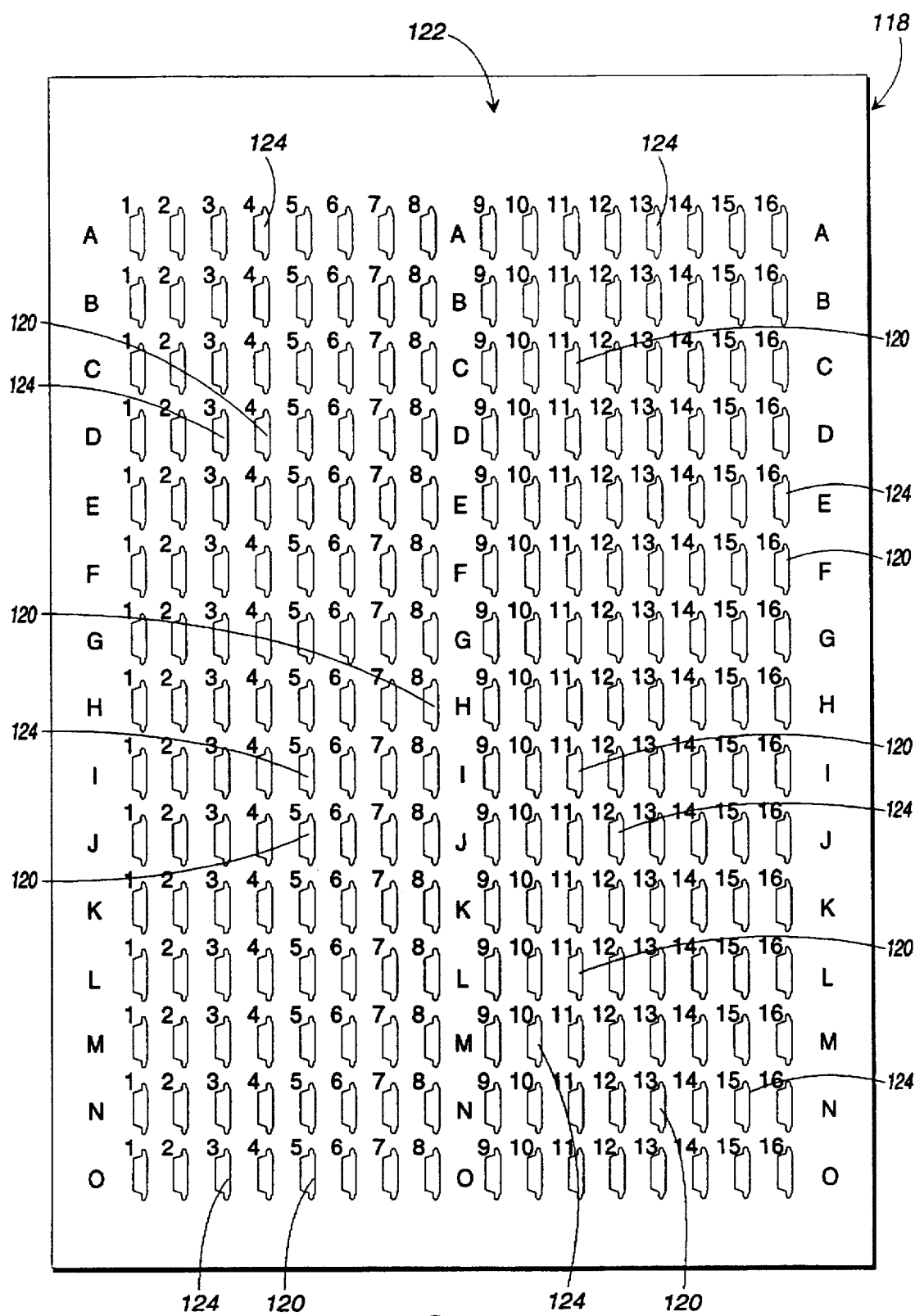
FIG. 5 is an isolated, top, plan view of an assembly retaining structure of the drawer of FIG. 4.
Figure 6:
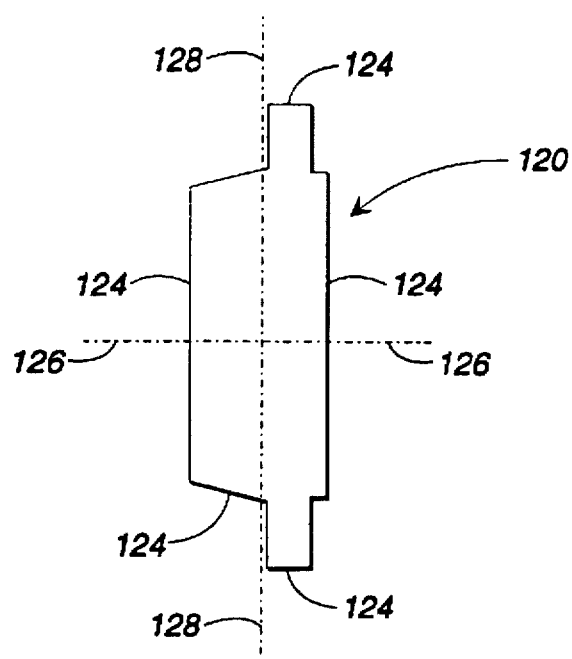
FIG. 6 is an isolated, top, plan view of a slot of the assembly retaining structure of FIG. 5.

The drawer 98 defines a reservoir 114 which receives an assembly retaining structure 116 having a top panel 118. The top panel 118 defines a plurality of slots 120, shown schematically in FIG. 4, which define a row and column matrix 122. FIG. 5, a top plan view of the top panel 118, more accurately displays the slot matrix 122 where the rows of slots 120 are labeled with letters A–O and the columns of slots 120 are labeled with numbers 1–16. Note that each slot 120 has an outer perimeter 124 which is shaped to receive a tongue portion 184 of an object identification assembly 182 described below (see FIG. 12). As seen in the isolated, top plan view of FIG. 6, the outer perimeter 124 of each slot 120 is symmetrical about a center lateral axis 126, but is not symmetric about a center longitudinal axis 128. The lack of symmetry about center longitudinal axis 128 causes each slot 120 to be "polarized", thereby allowing receipt of the tongue portion 184 of an object identification assembly 182 in only one orientation. Such polarization of each slot 120 is necessary to properly orient an object identification assembly 182, which, when present in a drawer 98, depends through a slot 120, for electrical interaction with a connector 154 as described below.

Figure 8:
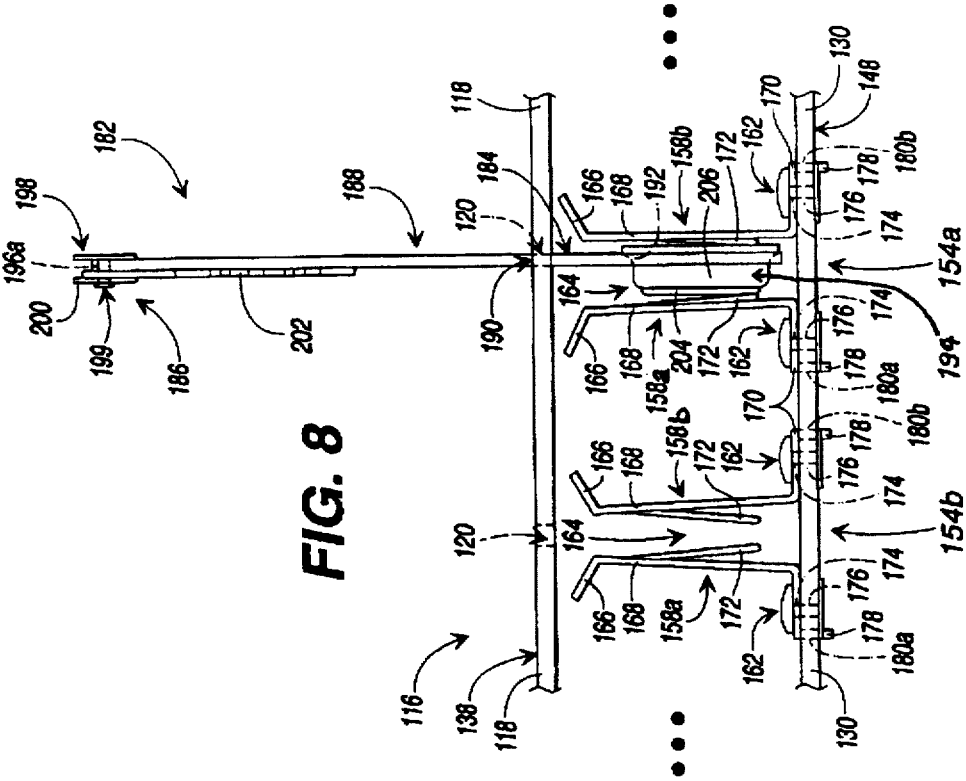
FIG. 8 is a partial, front view of the assembly retaining structure of FIG. 5.
Figure 7:
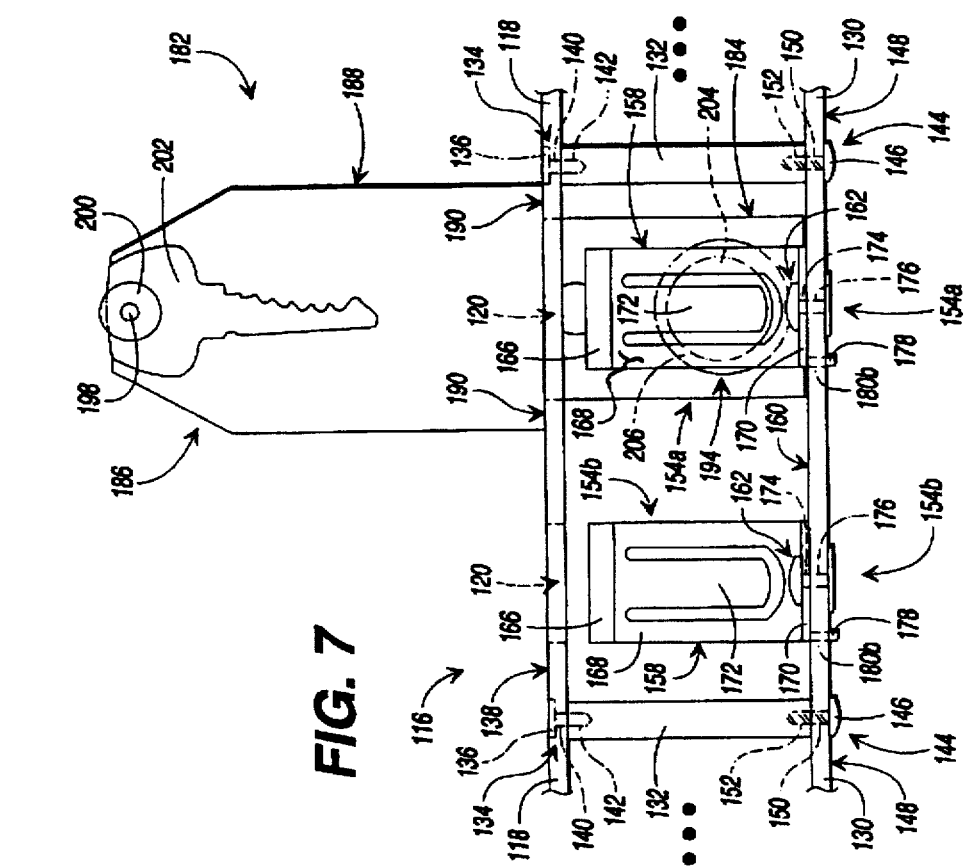
FIG. 7 is a partial, right side view of the assembly retaining structure of FIG. 5.

A portion of the assembly retaining structure 116, in accordance with the preferred embodiment, is shown in the right side and front partial views of FIGS. 7 and 8. The views also display an object identification assembly 182 which is received by a slot 120 of the top panel 118 of the assembly retaining structure 116. In addition to the top panel 118, the assembly retaining structure 116 includes a backplane 130 positioned beneath and opposed to the top panel 118. The backplane 130 is held in position relative to the top panel 118 by a plurality of standoffs 132 which are periodically located between the backplane 130 and top panel 118. Each standoff 132 is secured to the top panel 118 by a press-in stud 134 having a head 136 which lies flush with an upper surface 138 of the top panel 118. Each stud 134 extends downward through a hole 140 defined by the top panel 118 and is received by a hole 142 defined by a standoff 132. Each standoff 132 is secured to the backplane 130 by a screw 144 having a head 146 which rests against a bottom surface 148 of the backplane 130. The screw 144 extends through a hole 150 defined by the backplane 130 and is received by a threaded hole 152 defined by the standoff 132.

The assembly retaining structure 116 further comprises a plurality of connectors 154 with one connector 154 being positioned directly beneath and aligned with each slot 120 of the row and column slot matrix 122, thereby defining a row and column matrix of connectors 156 opposed to the row and column slot matrix 122 and residing between the top panel 118 and the backplane 130. FIG. 7 displays two connectors 154a,b, each being a member of a different row of the matrix of connectors 156, while FIG. 8 shows the same two connectors 154a,b, each also being a member of a different column of the matrix of connectors 156. Each connector 154 comprises a pair of opposed contacts 158 which are each rigidly mounted to a top surface 160 of the backplane 130 by a rivet 162. The opposed contacts 158 define a gap 164 between the contacts 158 for receipt of an object identification assembly 182 by connector 154a as illustrated in FIGS. 7 and 8.

Figure 9:
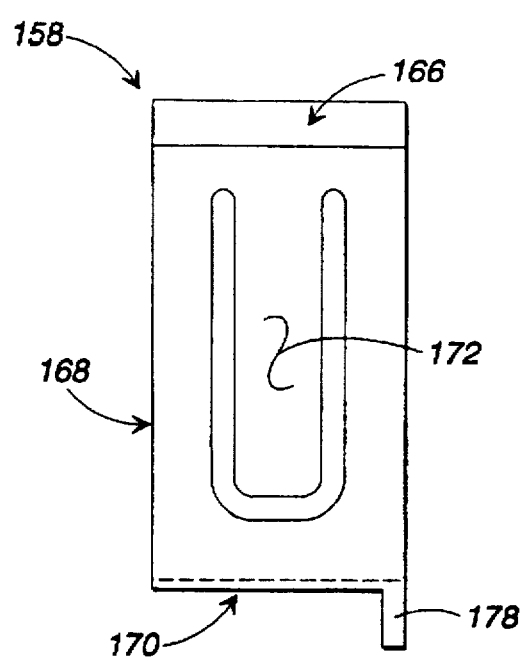
FIG. 9 is an isolated, front view of a contact of the assembly retaining structure of FIGS. 7 and 8.
Figure 10:
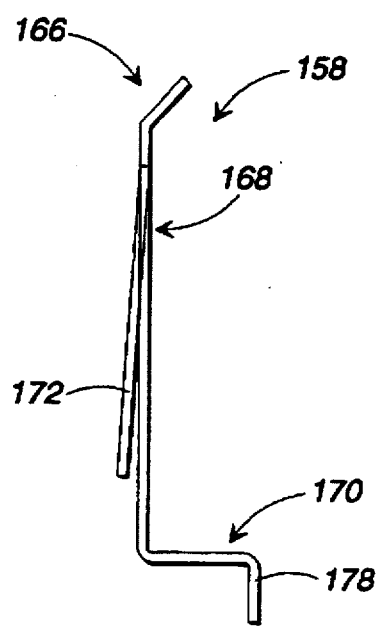
FIG. 10 is a side view of the contact of FIG. 9.
Figure 11:
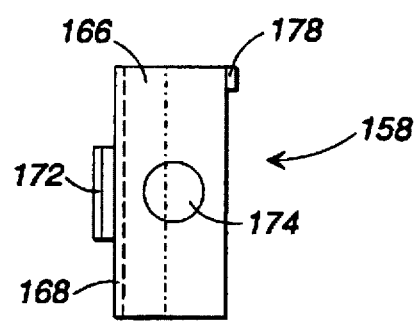
FIG. 11 is a bottom, plan view of the contact of FIG. 9.

FIGS. 9–11 display left side, front, and bottom views of a single contact 158 in accordance with the preferred embodiment of the present invention. Each contact 154 includes an upper portion 166, a mid-portion 168, and a base portion 170. The upper portion 166 is angled relative to the mid-portion 168 to enhance the reception of an object identification assembly 182 by guiding a received object identification assembly 182 toward the gap 164 defined between the contacts 158. The mid-portion 168 of each contact 158 is angled relative to the base portion 170 and includes a tongue 172 which is, itself, angled relative to the mid-portion 168. Upon receiving an object identification assembly 182, as seen in FIG. 8, the mid-portion 168 and the tongue 172 deflect independently to insure electrical connectivity between the contact 158 and an electronic device 194 of the object identification assembly 182. The base portion 170 resides atop and adjacent to a plated foil pad on the backplane 130 and defines a hole 174 for receipt of rivet 162 which extends through a plated-through hole 176 defined by an electrically-conductive surface of the backplane 130. The plated foil pad, base portion 170, and rivet 162 are crimped together, forcing expansion of the rivet 162 to fill the plated-through hole 176, thereby creating electrical continuity between the backplane 130, rivet 162, and the contact 158. The base portion 170 includes a tab 178 which depends from the base portion 170 and extends through a hole 180 defined by an electrically-conductive surface of the backplane 130 to aid in orienting the contact 158 relative to the backplane 130.

FIGS. 7 and 8 display connector 154a in receipt of an object identification assembly 182 which is more clearly illustrated in FIGS. 12 and 13. In accordance with the first preferred embodiment, each object identification assembly 182 comprises an inventoriable-object 202 and an interface member 183 having a tongue portion 184, an object connection portion 186, and a main portion 188 which extends between the tongue and object connection portions 184,186. Preferably, each interface member 183 is manufactured from plastic. The tongue portion 184 depends from the main portion 188 and, in conjunction with the main portion 188, defines shoulders 190 which abut the top surface 138 of the top panel 118, as seen in FIG. 7, when the tongue portion 184 is positioned within a slot 120. The shoulders 190 prevent excessive downward travel of the interface member 183 through a slot 120 and aid in properly positioning the interface member 183 relative to a connector 154. The sides of the tongue portion 184 are tapered to improve the ease of insertion into a slot 120 and to center the interface member 183 in the slot 120. The tongue portion 184 defines a hole 192 which receives and secures an electronic device 194. The object connection portion 186 defines apertures 196 (FIG. 12) and aperture 196a receives a tubular rivet 198 which receives a blind rivet 199. A washer 200, which resides adjacent to the object connection portion 186, cooperates with the blind rivet 199 to connect an inventoriable object 202 to the interface member 183. In FIGS. 7 and 8, the inventoriable object 202 is a key, however, it is understood that the scope of the present invention encompasses the connection of a different inventoriable object selected from a variety of other types of inventoriable objects.

The electronic device 194 is shown more clearly in the front view of FIG. 14 and the right side view of FIG. 15. The electronic device 194 has a positive data contact 204 and a negative return contact 206 which are electrically engaged by the mid and tongue portions 168,172 of contacts 158a,b, respectively, of a connector 154. Internally, the electronic device 194 includes a memory which permanently stores a unique identification code. Upon connection of an inventoriable object 202 to an interface member 183, the identification code in the electronic device 194 is associated with the inventoriable object 202. The identification code is electronically readable, upon supply of the appropriate input data signals, from the electronic device 194 via its bi-directional data contact 204.

An electronic device 194, acceptable in accordance with the preferred embodiments of the present invention, is a DS 1990A Touch Memory Device available from Dallas Semiconductor Corporation of Dallas, Tex. and includes a 48-bit serial number (i.e., which is a unique identification code), an 8-bit CRC code, and an 8-bit family code. It is understood that the scope of the present invention includes other electronic devices having a unique, electronically-readable identification code. It is also understood that the scope of the present invention includes other electronic devices having internal random access memories and timers which are electronically-communicable therewith and which enable additional functionality beyond the identification of objects.

Figure 16:
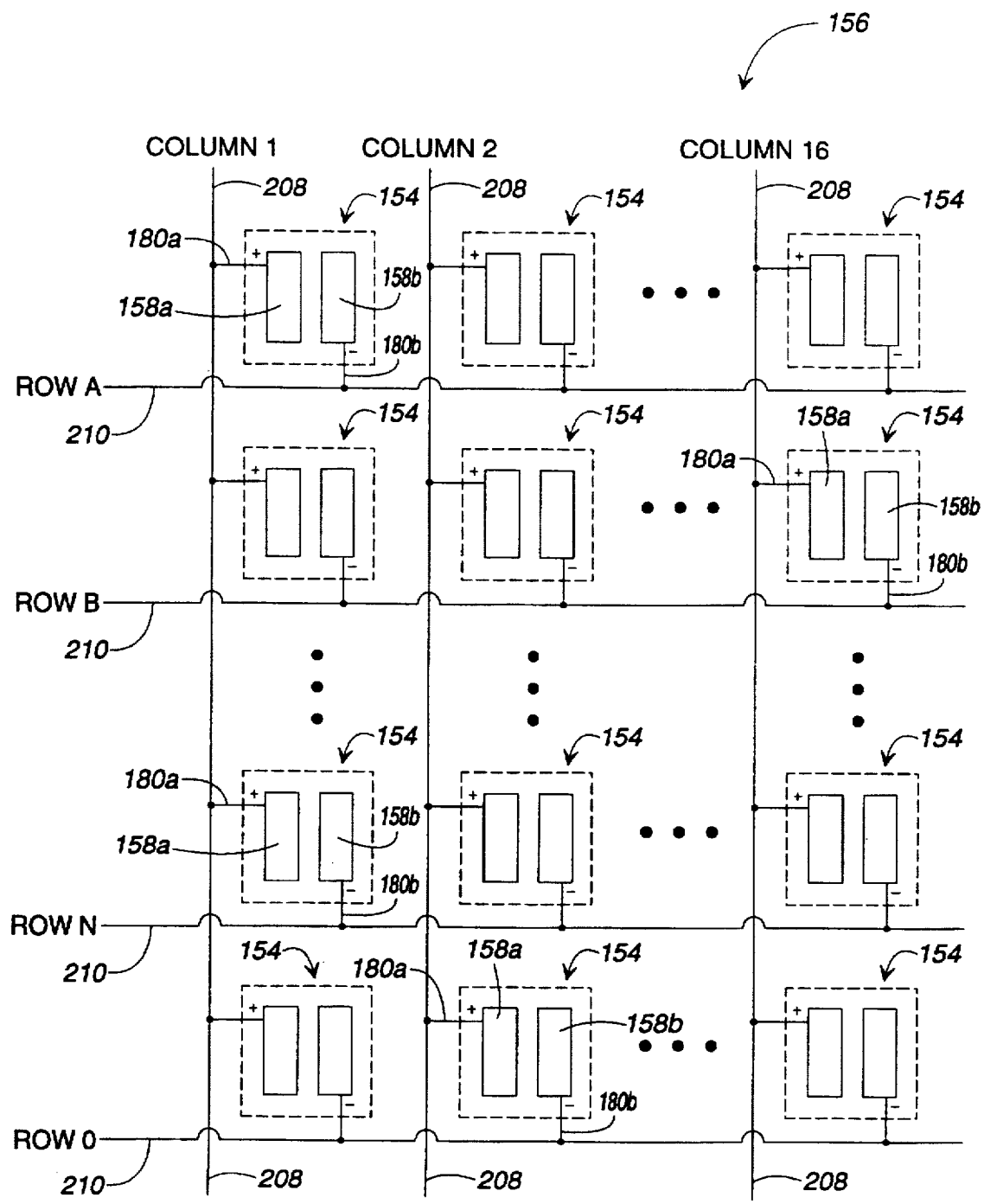
FIG. 16 is a top, plan, schematic view of the backplane of the assembly retaining structure of FIGS. 7 and 8.

The connectors 154, as discussed above and seen schematically in FIG. 16, are arranged in a row and column matrix 156 on the backplane 130 with each connector 154 having a row address and a column address. Each connector 154 includes a contact 158a which is electrically connected to one of a plurality of column data lines 208 and a contact 158b which is electrically connected to one of a plurality of row return lines 210. In accordance with the first preferred embodiment, each column data line 208 is a positive data line and each row return line 210 is a negative return line. By selecting the column data line 208 and the row return line 210 connected to a connector 154, it is possible, as described below, to determine whether or not an electronic device 194 and, hence, an object identification assembly 182 is present between the contacts 158. If an electronic device 194 is present, it is possible, as described below, to read the identification code of the electronic device 194 and, hence, the identification code of the object identification assembly 182 via column data line 208.

Figure 17:
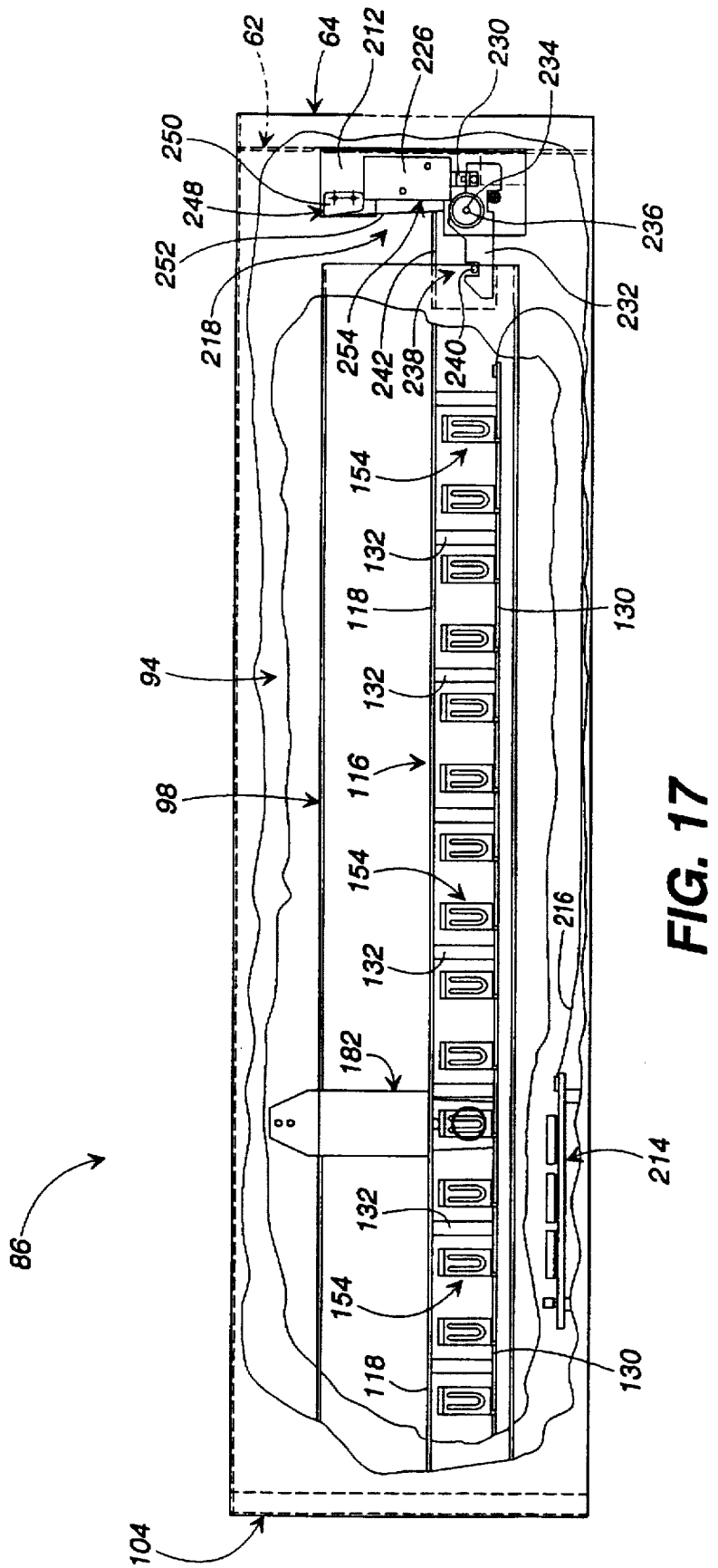
FIG. 17 is a side, pictorial view of the enclosure and drawer of FIG. 4, where the drawer is fully-inserted into the enclosure.

FIG. 17 displays the enclosure 86 with a drawer 98, holding an object identification assembly 182, fully-inserted into the cavity 94 defined by the enclosure 86. Note that portions of the enclosure 86, drawer 98, and lock mounting bracket 212 have been cut-away to enable viewing of various components located inside the enclosure 86. As seen in FIG. 17, the assembly retaining structure 116 resides above a local controller 214 which is mounted to the enclosure 86 in proximity to the drawer's front face assembly 104. A flexible cable 216 transfers electrical signals between the local controller 214 and the backplane 130 of the assembly retaining structure 116. The local controller 214 and the flexible cable 216 are positioned relative to the backplane 130 so that the flexible cable 216 rolls when the drawer 98 is withdrawn or inserted into the enclosure 86. The local controller 214 is also electrically connected to parallel data communications ports 68,70 (or data communication interfaces 68,70) by a ribbon cable 217 (see FIG. 18) to enable bi-directional serial communication with the remote controller 54. The parallel data communications ports 68,70 are hidden by the electrically-actuated lock mechanism 218 and lock mounting bracket 212 in FIG. 17, but are visible in FIG. 18 and are connected to the utility panel 62 which resides inside cavity 94 adjacent to the back panel 64 of the enclosure 86. Power supply lines 220 are electrically connected in series, via fuse holder 82 and pilot light 83, to power supply connectors 78,80 (which are connected together in parallel) and to the local controller 214. Lock signal lines 222 and drawer switch signal lines 224 are electrically interposed between the local controller 214 and the electrically-actuated lock mechanism 218 and drawer switch 248, respectively. LED lines 490,492 electrically connect the local controller 214 to the LED's 113.

Figure 18:
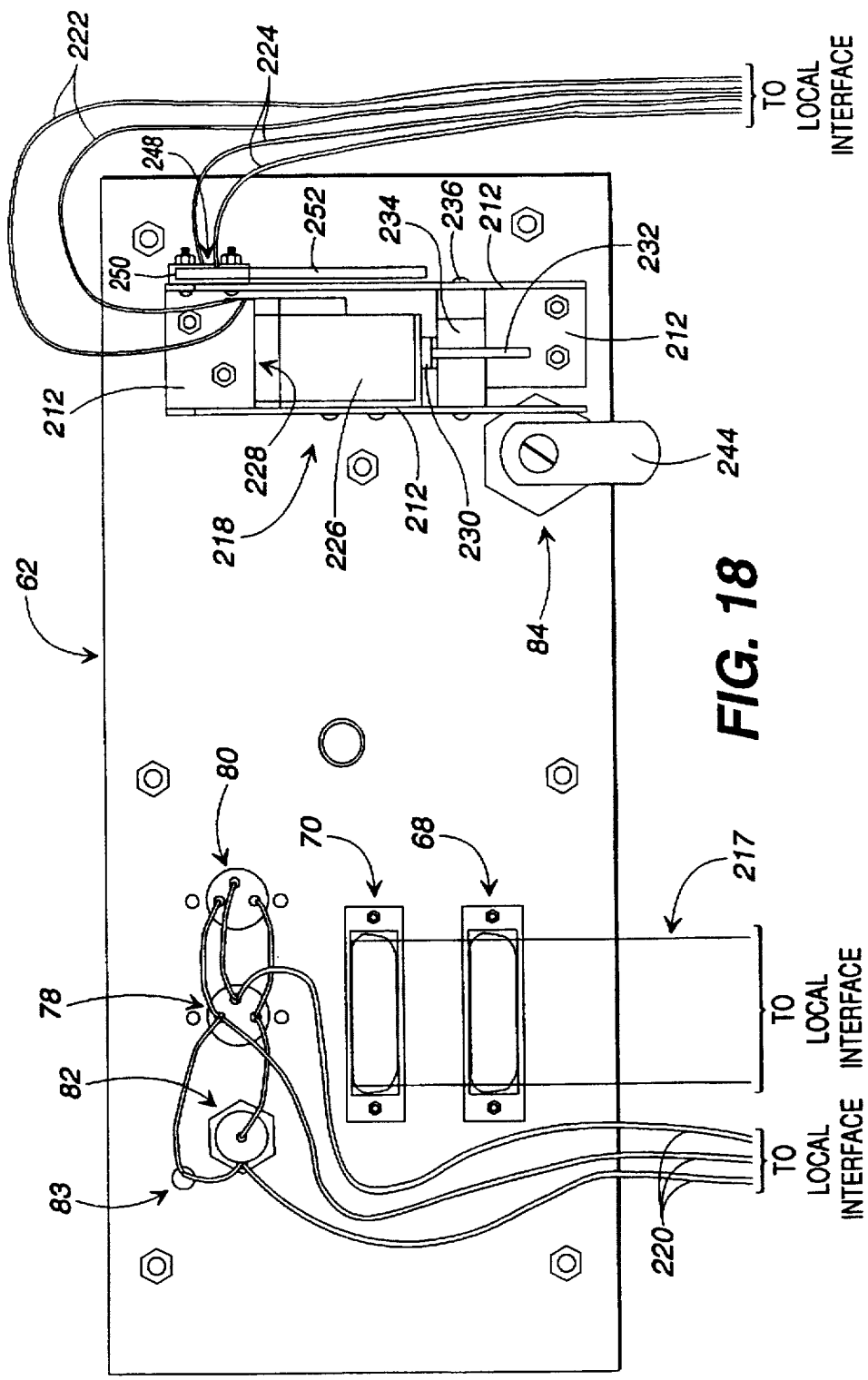
FIG. 18 is an isolated, front view of a utility panel of the enclosure of FIG. 4.

The electrically-actuated lock mechanism 218, illustrated in FIGS. 17 and 18, is held in place by lock mounting bracket 212 which is secured to the utility panel 62. The lock mechanism 218 includes a solenoid actuator 226 which is located in a well 228 defined by the lock mounting bracket 212. The solenoid actuator 226 is positioned to enable interaction of the solenoid's plunger 230 with a keeper plate 232. A bearing 234, pressed into the keeper plate 232, defines a bore for receipt of a shaft 236 which is rigidly attached to the lock mounting bracket 212 and extends through the bore. The bearing 234 enables the keeper plate 232 to rotate relative to the shaft 236 when the keeper plate 232 is rotated by linear movement of the solenoid actuator's plunger 230. A biasing member (not visible) is positioned about the solenoid's plunger 230 between the solenoid actuator 226 and the keeper plate 232. The keeper plate 232 defines a keeper slot 238 which receives a striker rod 240 when the drawer 98 is fully-inserted into the enclosure 86. The striker rod 240 is rigidly mounted in a striker bracket 242 which is attached to the rear of the drawer 98. Upon energization of the solenoid actuator 226 and the subsequent interaction of the solenoid's plunger 230 and keeper plate 232, the keeper slot 238 rotates away from the striker rod 240, thereby freeing the striker rod 240 and enabling the drawer 98 to be withdrawn from the enclosure 86. Upon de-energization of the solenoid actuator 226, the biasing member forces the keeper plate 232 to return to its normally-locked position. Note that key lock assembly 84 includes a striker plate 244 which, when rotated by an authorized user in an extreme situation, engages the keeper plate 232 to cause rotation of the keeper plate 232 away from striker rod 240.

In accordance with the first preferred embodiment, the drawer switch 248 is mounted to a side of the lock mounting bracket 212 and includes a microswitch 250 and a switch actuator 252. The switch actuator 252 extends from the microswitch 250 adjacent to a cut-out 254 defined by the lock mounting bracket 212. When the drawer 98 is fully-inserted into the enclosure 86, a portion of the striker bracket 242 resides within the cut-out 254 and engages the switch actuator 252.

Figure 19A:
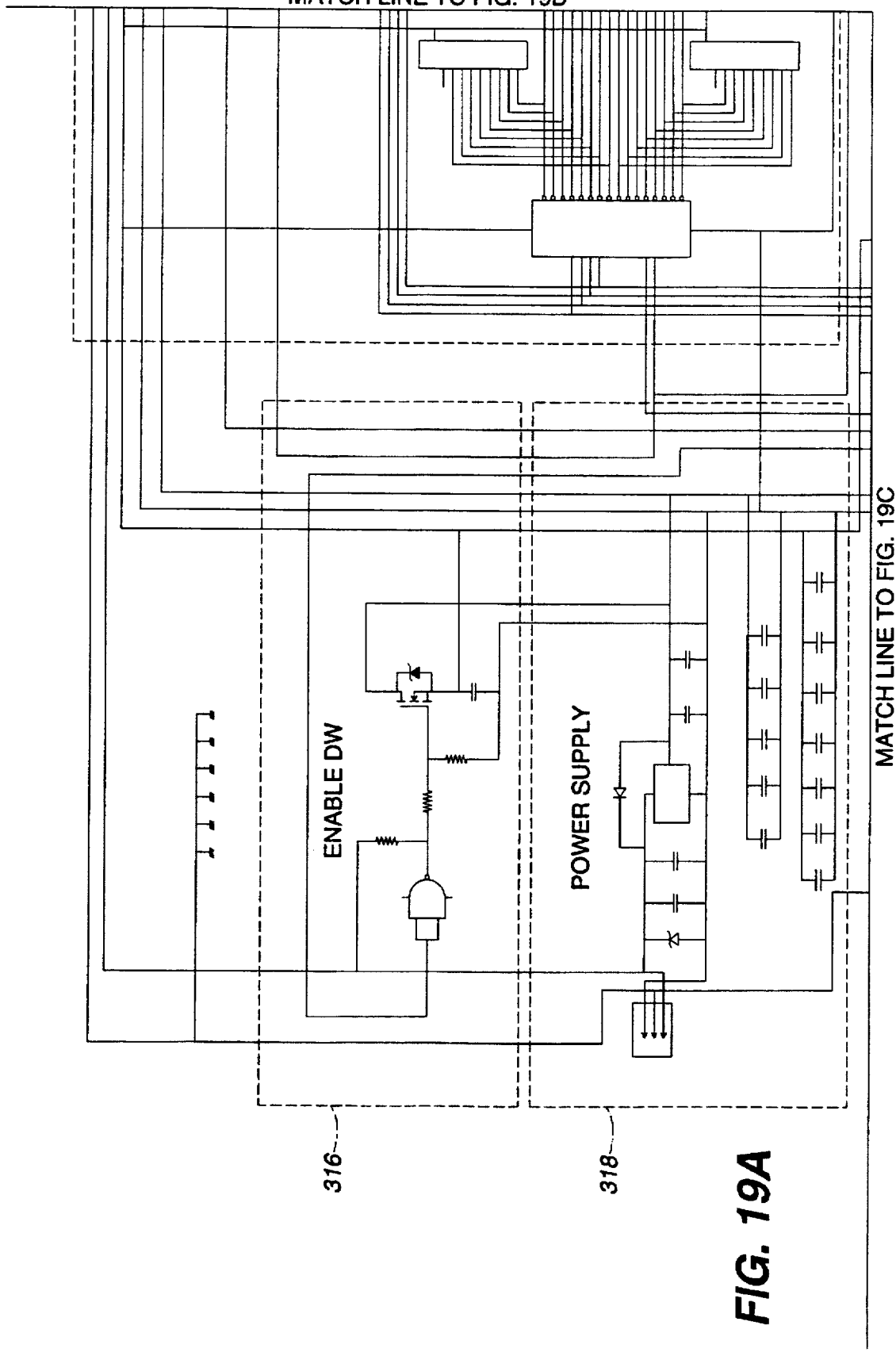
FIG. 19 is an electrical schematic of the local controller of FIG. 17.
Figure 19C:
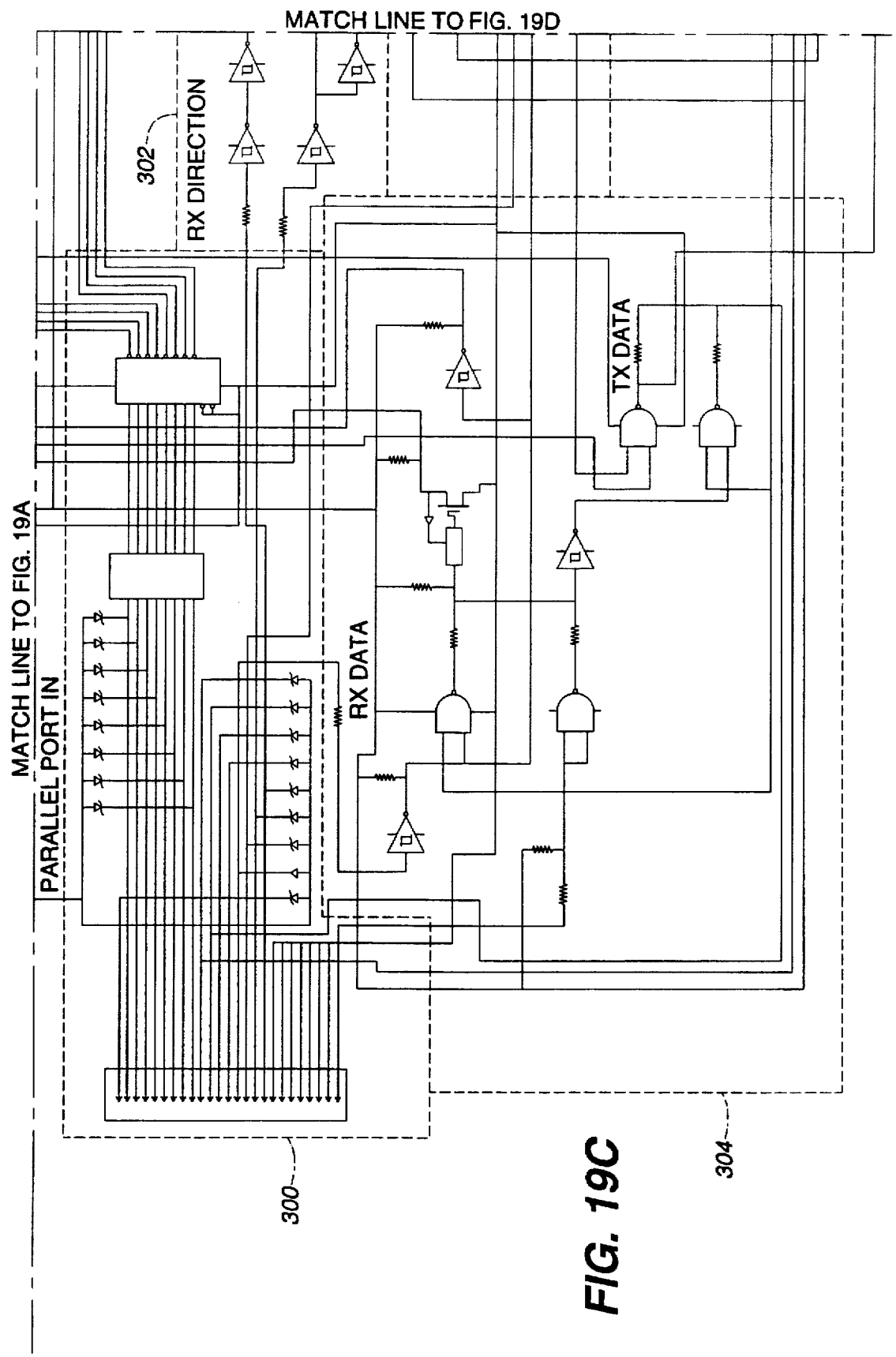
Figure 19D:
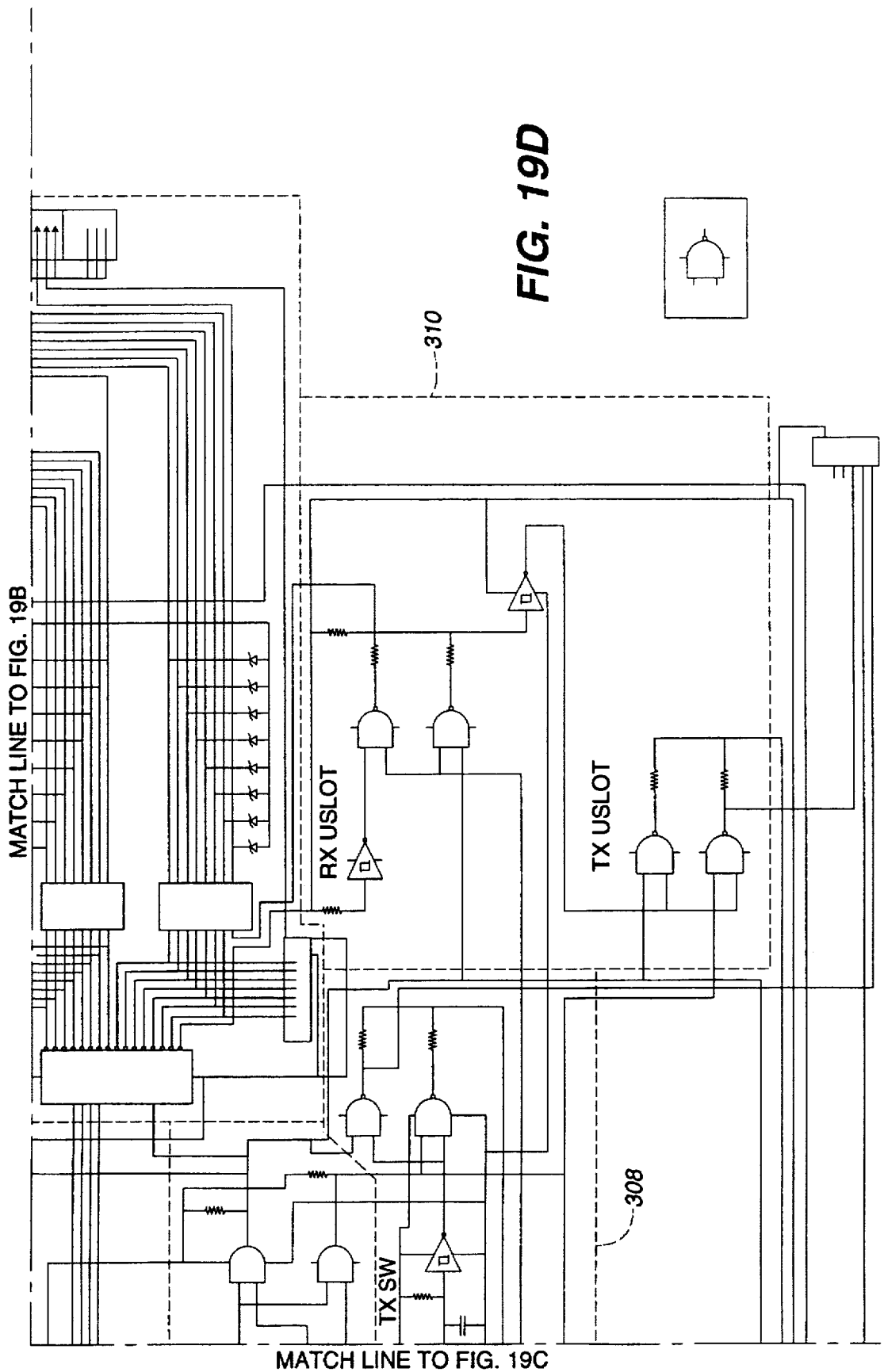

FIG. 19 displays a block diagram representation of the circuitry of the local controller 214 in accordance with the preferred embodiments of the present invention and identifies a plurality of major sections of the circuitry, including a parallel port section 300, a receive direction section 302, a receive/transmit data section 304, a matrix communications section 306, a transmit enclosure position section 308, a receive/transmit ID slot data section 310, a lock driver section 312, an LED driver section 314, an enable section 316, and a power supply section 318. To provide a more understandable description of the circuitry, the discussion below focuses on each section individually and describes its inputs, outputs, and relationship to the other sections of the local controller 214.

Figure 20A:
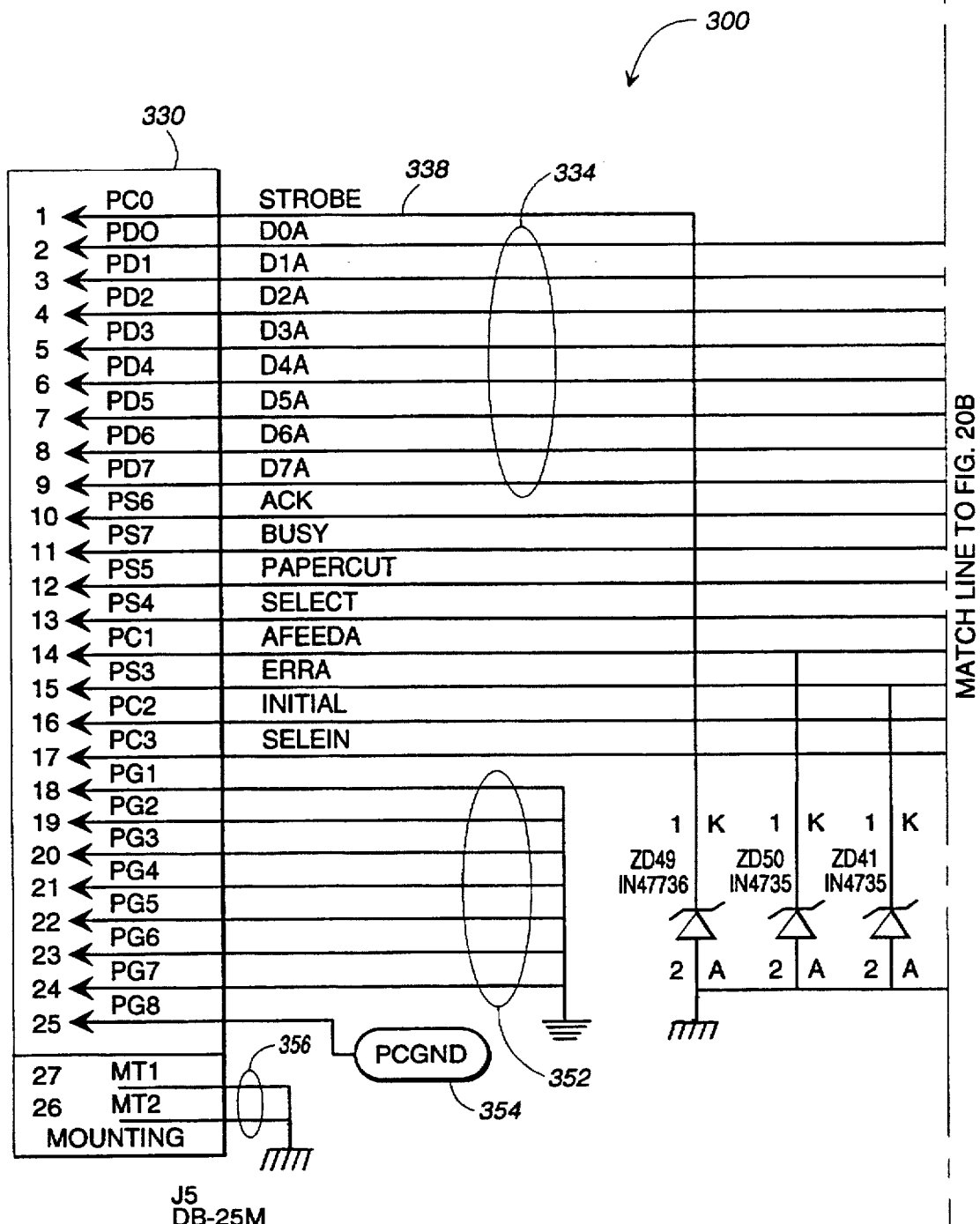
FIG. 20 is an electrical schematic of the parallel port section of FIG. 19.
Figure 20B:
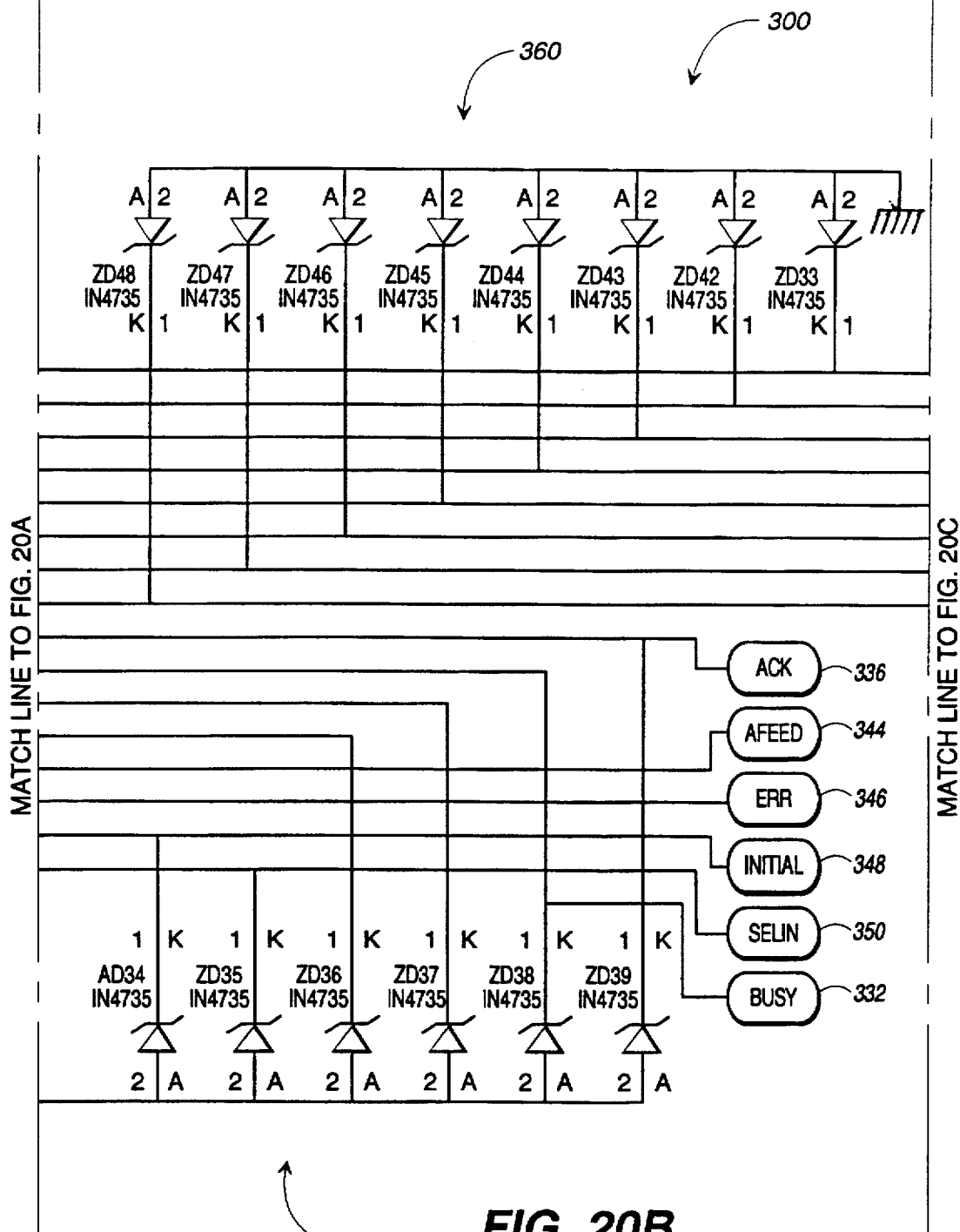
Figure 20C:
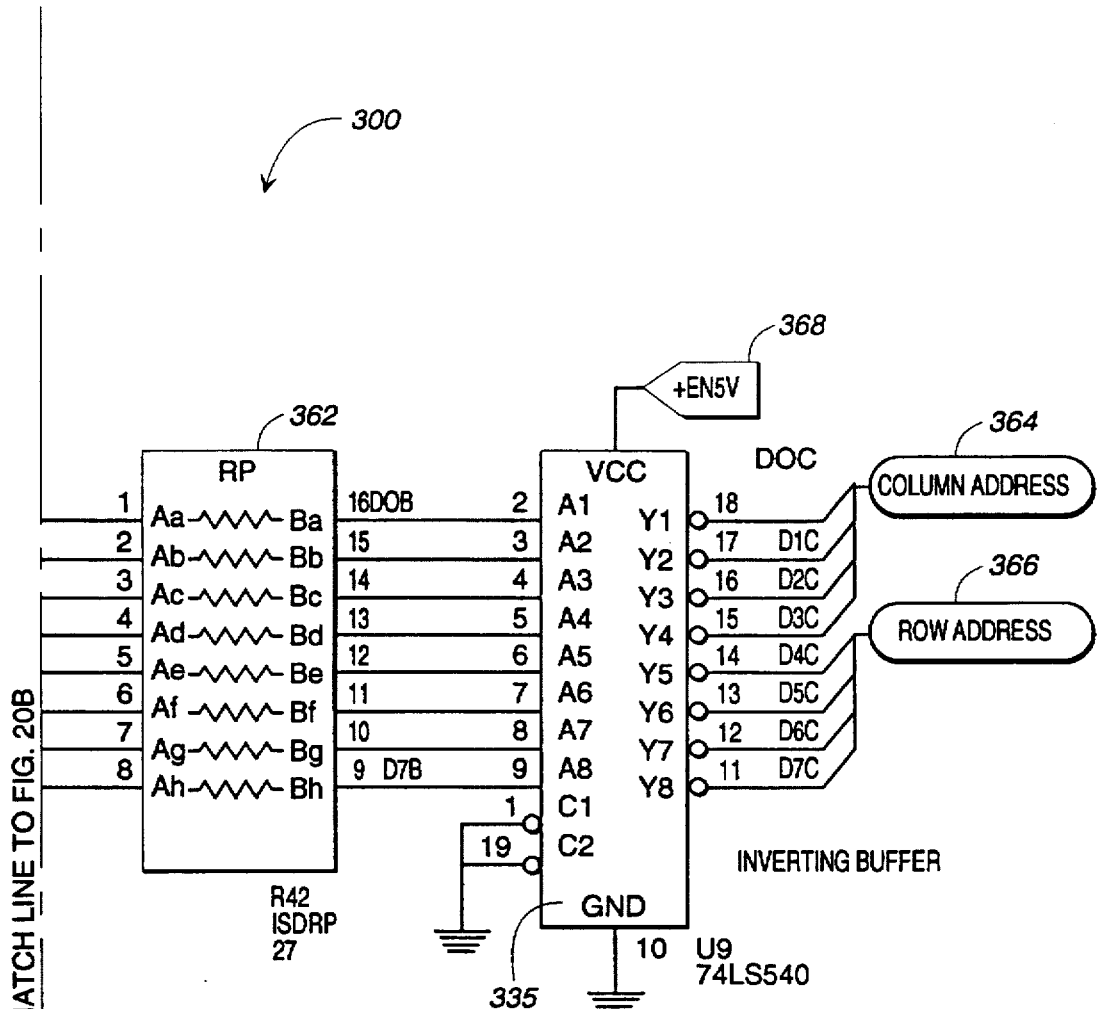

The parallel port section 300 is displayed in FIG. 20, according to the preferred embodiments of the present invention, and includes a parallel connector 330 which connects to ribbon cable 217 for transmission and receipt of a plurality of signals from the remote controller 54. The parallel connector 330 includes a BUSY line 332, a plurality of data lines 334, an ACK line 336, a STROBE line 338, a PAPEROUT line 340, an AFEED line 344, an ERR line 346, an INITIAL line 348, a SELIN line 350, a plurality of remote controller return lines 352, a RCGND line 354, and a plurality of mounting ground lines 356. The data lines 334 are protected by transient voltage suppressors 360 and series resistor network 362. Signals carried by the data lines 334 are shaped and buffered by inverting Schmitt buffer 335 to yield stable signals on column and row select lines 364,366 for use by the matrix communications section 306. The inverting Schmitt buffer 335 is enabled by the signal on the EN5V line 368 whenever the drawer is activated. The ACK line 336, the AFEED line 344, the ERR line 346, the INITIAL line 348, the SELIN line 350, and the BUSY line 332 are protected by transient voltage suppressors 370 and series damping resistors (not shown in FIG. 20). The ACK line 336 is an output from the local controller 214 and carries serial signals from the ID slot connector. The AFEED line 344 is an input to the local controller 214 and carries serial data to an addressable switch 394, the row and column matrix of connectors 156, and the ID slot connector. The ERR line 346 is an output from the local controller 214 and carries a signal from the drawer switch 248 which is representative of the position of the drawer 98 relative to the enclosure 86. The INITIAL line 348 is an input to the local controller 214 and carries a signal which is employed, in conjunction with a signal on the SELIN line 350, to derive data direction signals SDIR 372 and NSDIR 374. The SELIN line 350 is an input to the local controller 214 and carries a signal which is employed with the signal on the INITIAL line 348, as described above, and enables selection of the local controller 214 to output data to the parallel connector 330, thereby avoiding potential data collisions with data intended for use by the printer 56. The BUSY line 332 is an output line and carries serial data from the connectors 154 of the row and column matrix of connectors 156 and the addressable switch 394. The RCGND line 354 is an input line and carries a signal which resets the addressable switch 394 whenever the connection is lost between the remote controller 54 and enclosure 86.

The receive direction section 302, according to the preferred embodiments of the present invention, is shown in FIG. 21 and receives signals on the INITIAL line 348 and SELIN line 350 from the parallel port section 300. The SELIN signal is shaped and buffered by the inverting Schmitt buffers 376,378. The INITIAL signal is shaped and buffered by the inverting Schmitt buffer 380 and inverted by the inverting Schmitt buffer 382. The AND gates 384,386 receive the buffered SELIN signal and the inverted and non-inverted INITIAL signals to produce the data direction signals SDIR 372 and NSDIR 374 which are used as data routing signals throughout the local controller 214.

Figure 22A:
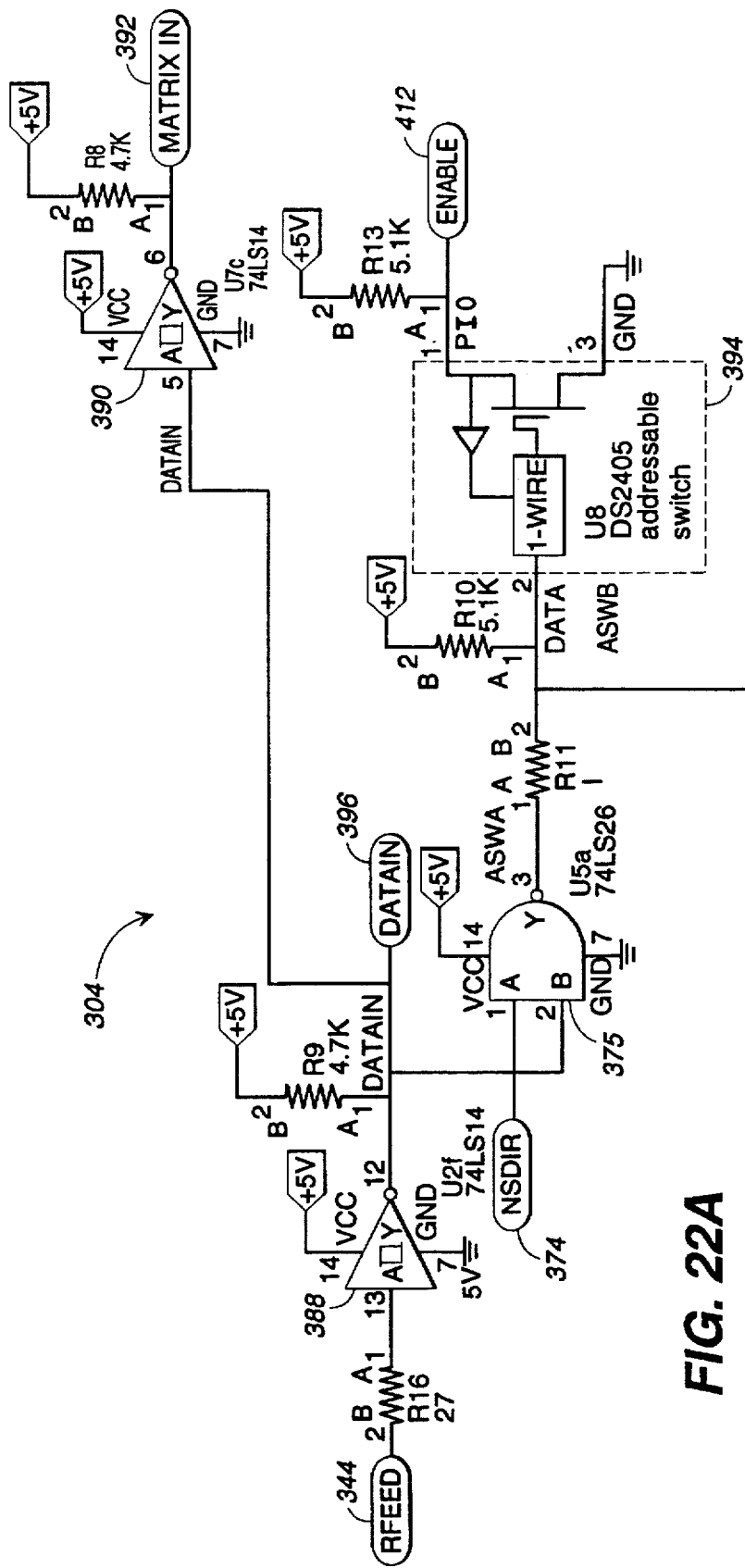
FIG. 22 is an electrical schematic of the receive/transmit data section of FIG. 19.
Figure 22B:
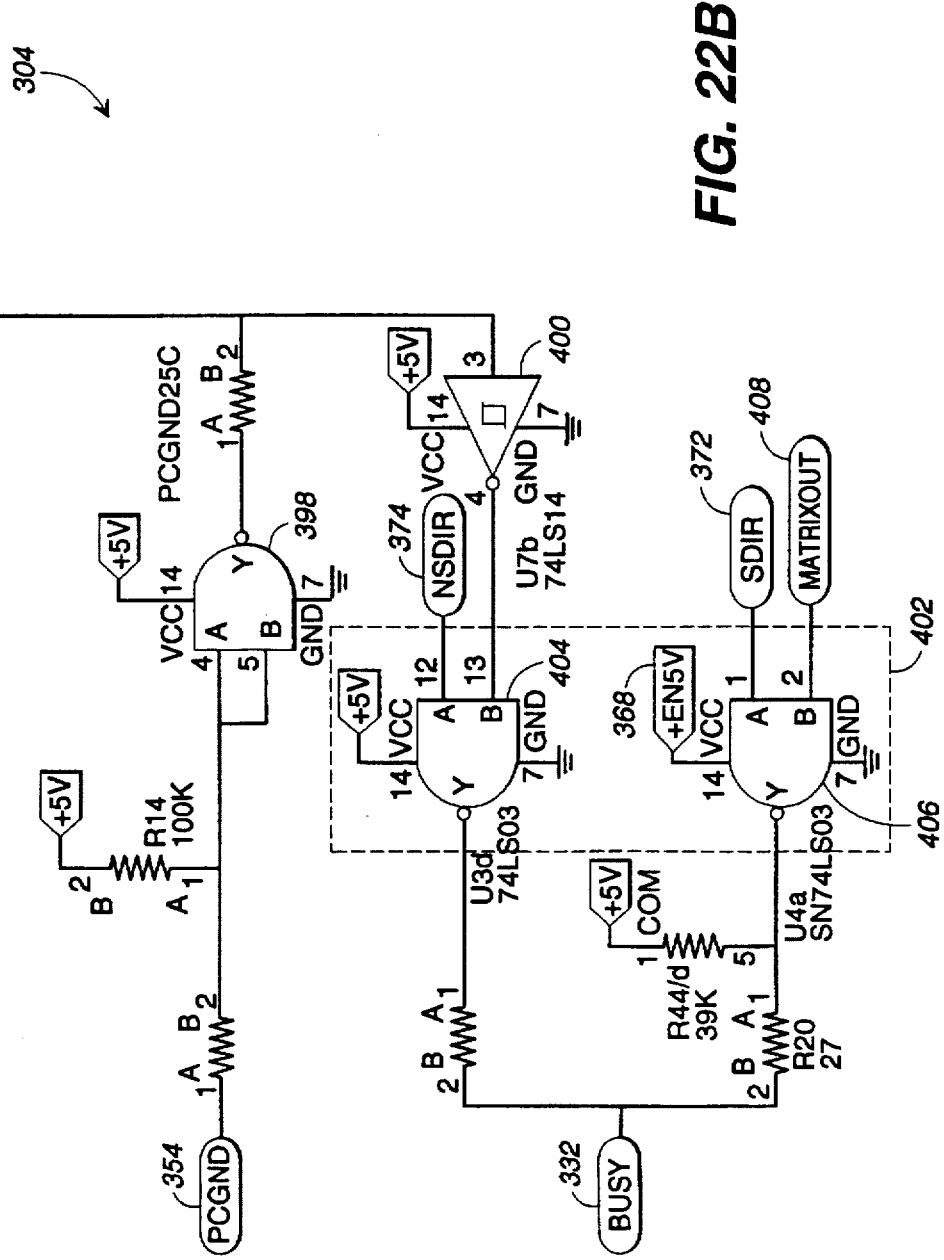
Figure 24A:
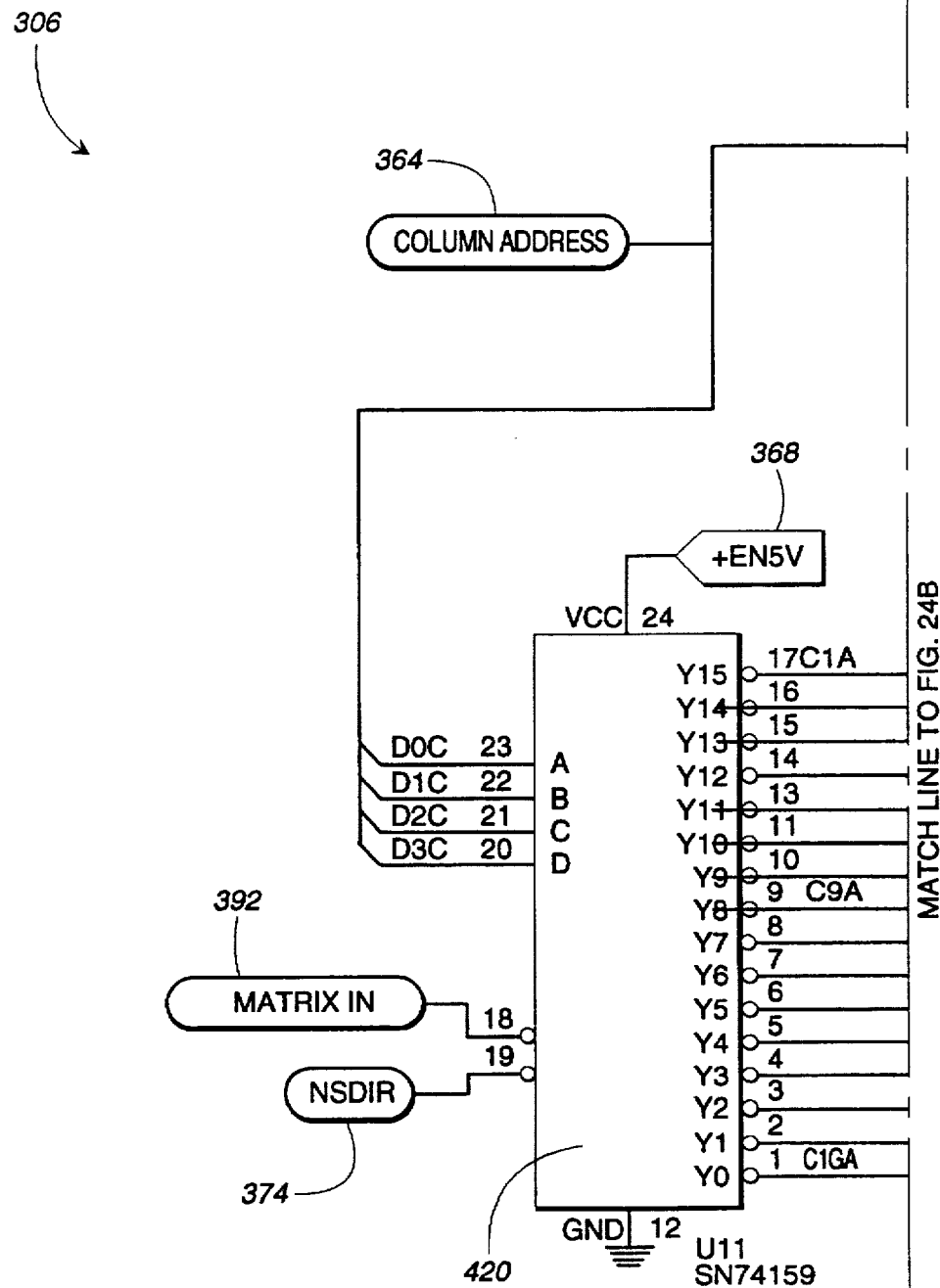
FIG. 24 is an electrical schematic of the matrix communication section of FIG. 19.
Figure 24B:
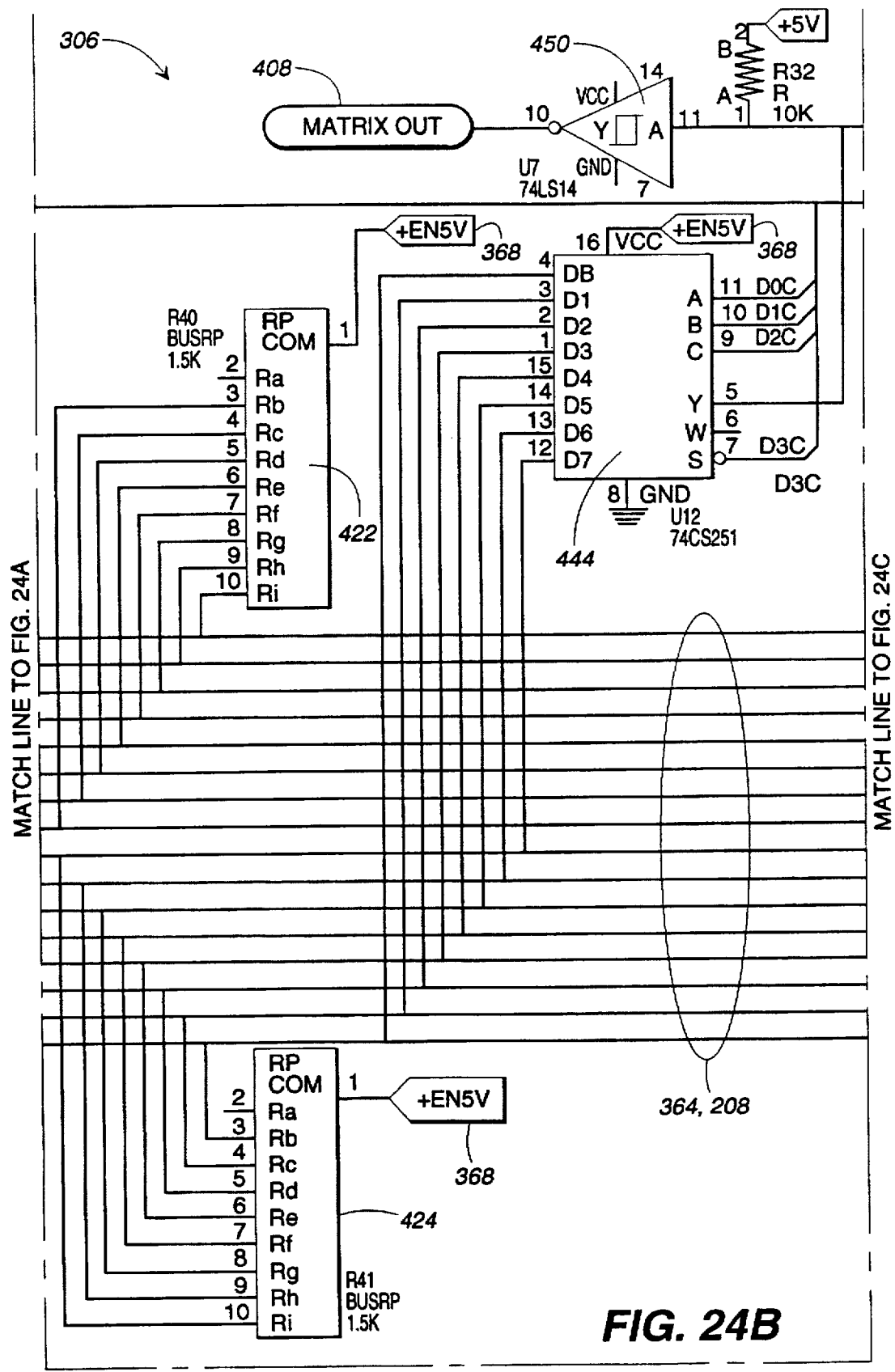
Figure 24C:
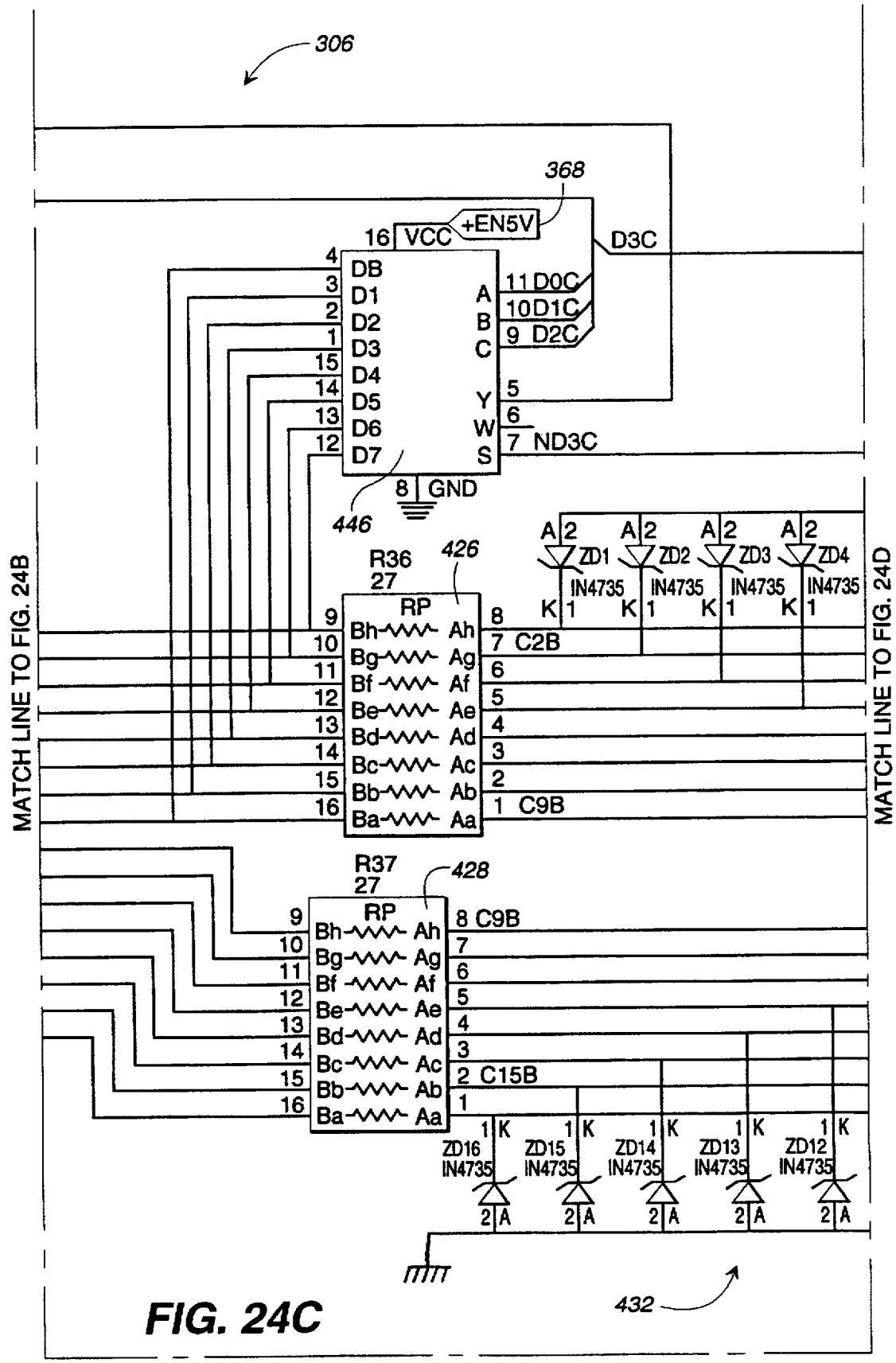
Figure 24D:
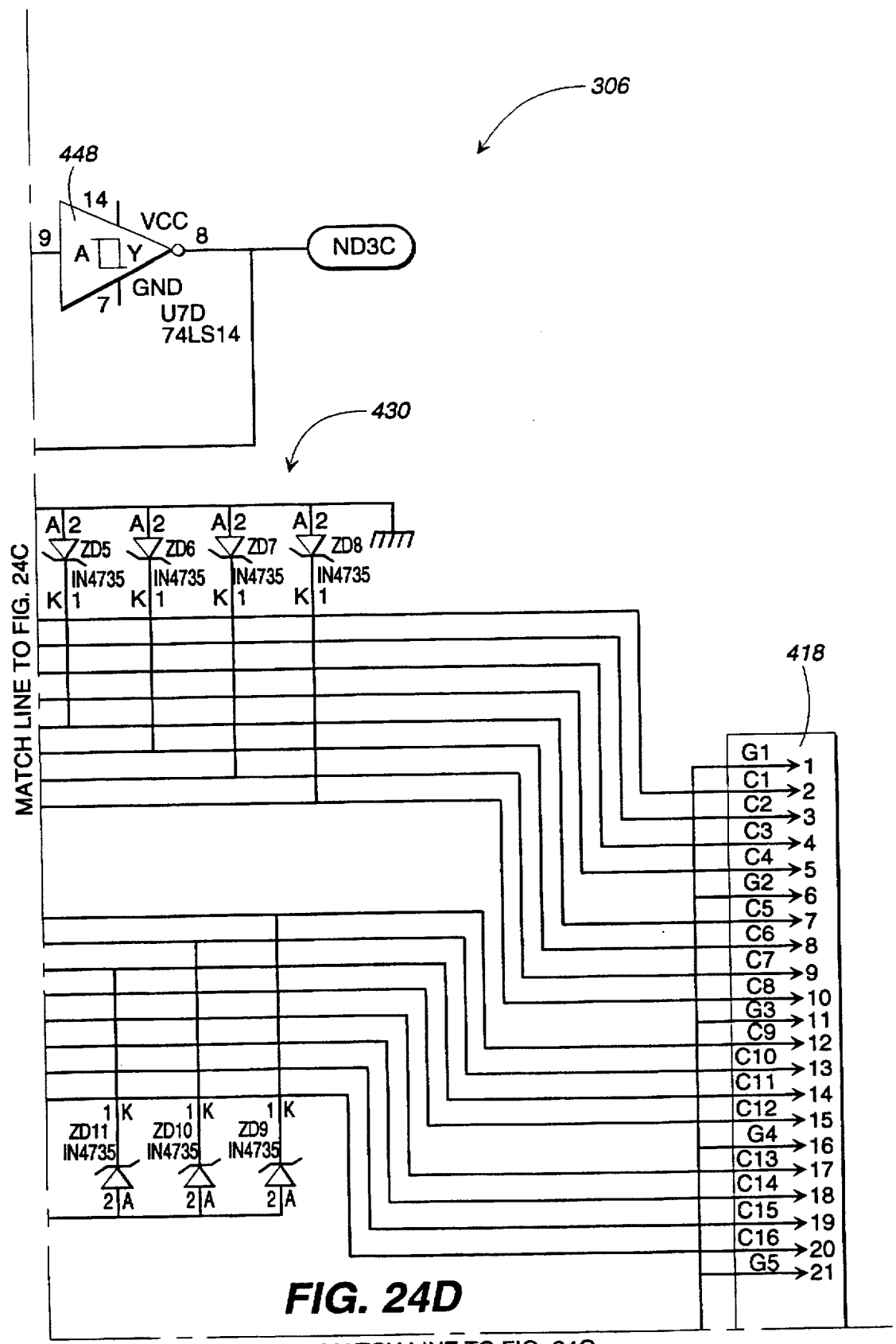
Figure 24E:
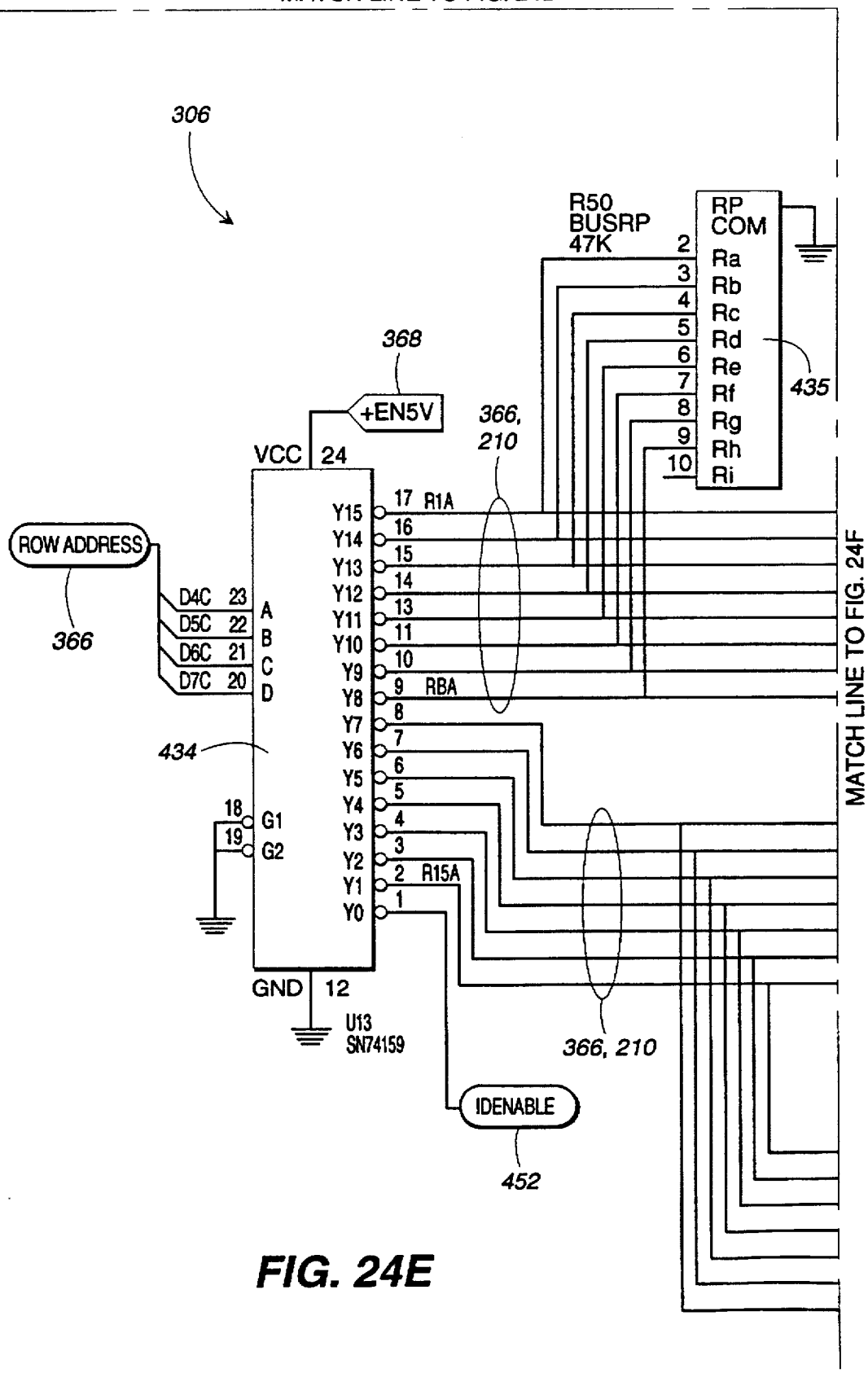
Figure 24F:
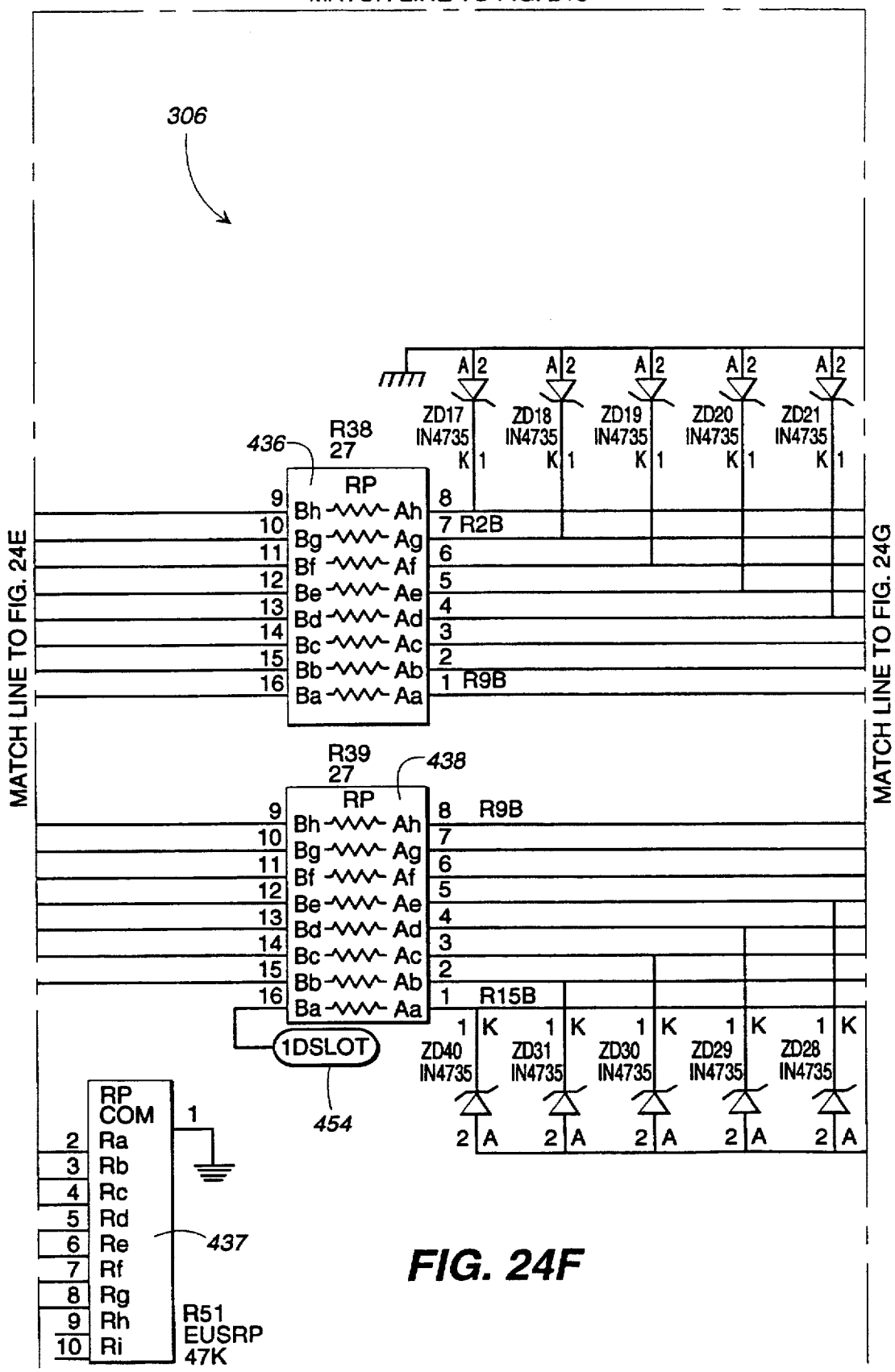
Figure 24G:
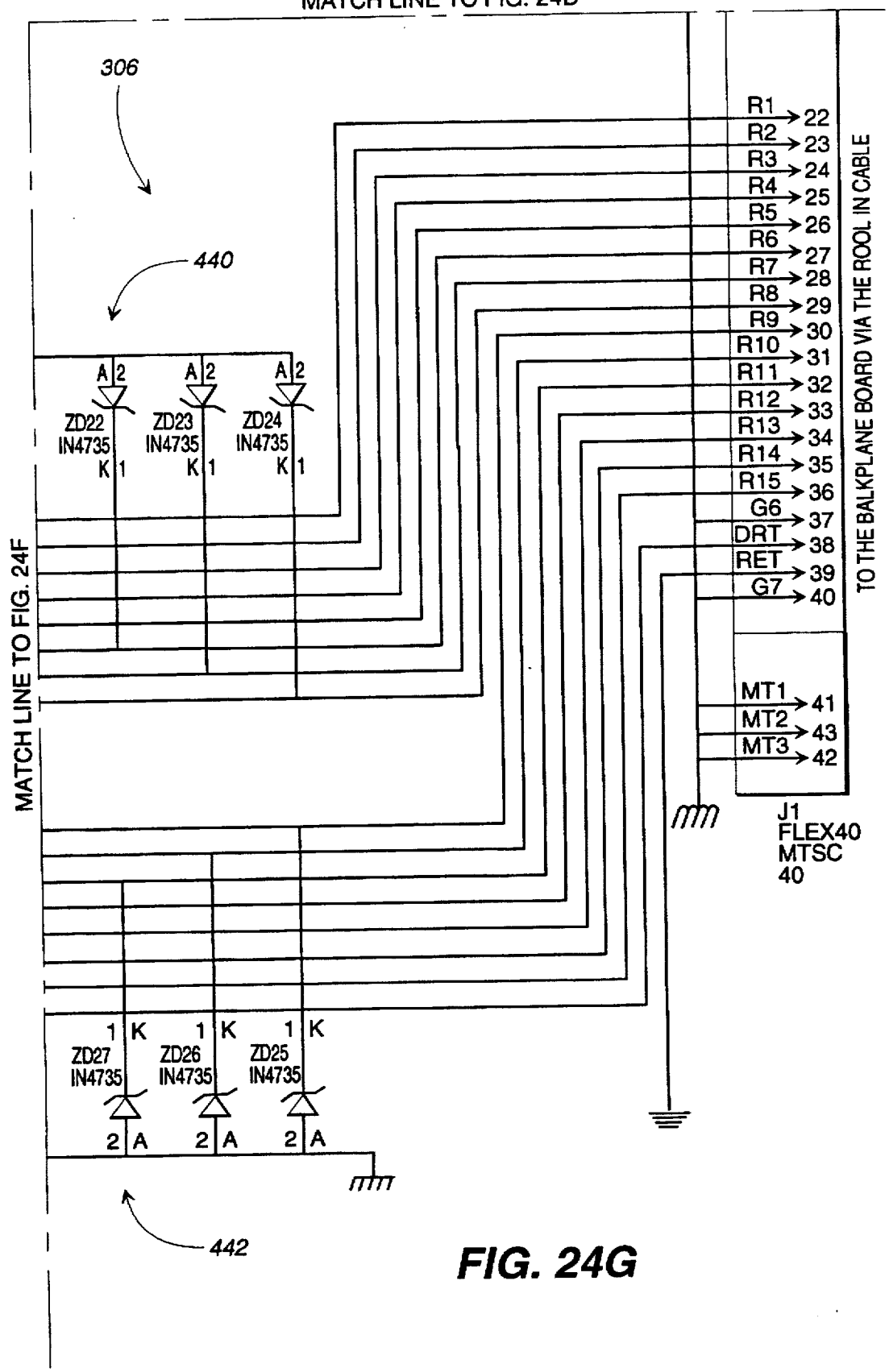

The receive/transmit data section 304, displayed in FIG. 22 in accordance with the preferred embodiments of the present invention, receives signals on the AFEED line 344 and RCGND line 354 and outputs signals on the BUSY line 332. Signals on the AFEED line 344 are shaped and buffered by the inverting Schmitt buffers 388, 390 to generate signals on MATRIX IN line 392 for use by the matrix communications section 306. An inverted signal on AFEED line 344 is NANDed with the signal on NSDIR line 374 to deliver serial data to an addressable switch 394 having a memory which stores a unique identification code (also referred to herein as an address). An inverted signal on AFEED line 344 is also routed to the DATAIN line 396 for use by the receive/transmit ID slot data section 310. A high signal on the RCGND line 354, caused by the loss of the connection between the remote controller 54 and the local controller 214, is gated by NAND gate 398 to create a low reset signal which resets the addressable switch 394 and, thereby deactivates the drawer 98. In response to the receipt of appropriate input data (including a switch address) from AFEED line 344, via NAND gate 375, the addressable switch 394 outputs serial data to an inverting Schmitt buffer 400 which provides inverted serial data to a two line-to-one line, open collector multiplexor 402 comprised of NAND gates 404, 406. Serial output data available from the addressable switch 394, upon receipt of appropriate input data, includes a unique identification code for the switch, data residing in the switch's memory, and the status of the switch's bi-directional port. Preferably, the addressable switch is a DS2405 from Dallas Semiconductor Corporation of Dallas, Tex. A MATRIX OUT line 408, from the matrix communications section 306, and the EN5V line 368, from the enable section 316, also connect to the multiplexor 402. Upon application of the appropriate SDIR and NSDIR signals 372,374 and EN5V signal 368, the multiplexor 402 selects serial data from either the MATRIX OUT line 408 (i.e., from the matrix communications section 306) or the addressable switch 394 and outputs the selected serial data on the BUSY line 332 for receipt by the parallel port section 300.

The addressable switch 394 has an input/output port 410 which is used to create an enable signal for the drawer 98 on ENABLE line 412. Upon receipt of an appropriate input signal, the addressable switch 394 sets the input/output port 410 to a low state which activates the drawer 98 to enable functions including communication with the ID slot connector, the drawer switch 248, and the matrix communications section 306 (and, hence, the row and column matrix of connectors 156).

The enable section 316, shown in FIG. 23 in accordance with the preferred embodiments of the present invention, receives an enable signal on ENABLE line 412 and outputs a power signal on the EN5V line 368 which is utilized to turn on and off various electronic components of the local controller 214. When the enable signal is low, the enable section 316, using NAND gate 414 and MOSFET transistor 416, creates a 5-volt signal on the EN5V line 368, thereby turning on various electronic components. When the enable signal is high, the enable section 316 creates, preferably, a 0-volt signal on the EN5V line 368, thereby turning off various electronic components.

The matrix communication section 306, according to the preferred embodiments of the present invention, is displayed in FIG. 24 and has inputs including column and row select lines 364,366, MATRIX IN line 392, NSDIR line 374, and the EN5V line 368. The matrix communication section 306 communicates bi-directionally with the row and column matrix of connectors 156 via a connector 418, which is attached to flexible cable 216, to supply connectors 154 with input data from the MATRIX IN line 392 and to receive output data generated by the electronic devices 194 of the object identification assemblies 182 which are present in the enclosure 86. A demultiplexor 420 receives input data from the MATRIX IN line 392 and column select lines 364. Upon being enabled by a power signal received on EN5V line 368 and a low signal on NSDIR line 374, the demultiplexor 420 decodes the received column selection signal (which identifies the column, of the row and column matrix of connectors 156, in which the connector 154 to be communicated with resides) to transfer the serial input data on MATRIX IN line 392 to the identified column data line 208 of the row and column matrix of connectors 156. The column data lines 208 are pulled up by resistor networks 422,424 and reflected signals traveling on column data lines 208 are dampened by resistor networks 426,428. The column data lines 208 are protected against transient voltages by transient voltage suppressors 430,432. A decoder 434 receives the row selection signal (which identifies the row, of the row and column matrix of connectors 156, in which the connector 154 to be communicated with resides) on row select lines 364 and, upon being enabled by a power signal received on EN5V line 368, the decoder 434 defines a row return line 210 (which is associated with the connector 154 with which communication is desired) by connecting the row return line 210 to an active, low-level logic state, thereby transitioning the row return line 210 from the floating-level logic state in which it normally exists when not selected by the decoder 434. Resistor networks 436,438 dampen reflected signals traveling on the row return lines 210 and transient voltages are suppressed by transient voltage suppressors 440,442. Resistor networks 435,437, connected to row return lines 210, prevent oscillation of the signals communicated by the row return lines 210. Once a column select line 364 and a row select line 366 have been identified (and, hence, a unique connector 154) by the demultiplexor 420 and decoder 434, respectively, data communication with the corresponding connector 154 of the row and column matrix of connectors 156 is established, thereby enabling transmission of signals to the connector 154.

The matrix communication section 306 also comprises cascaded multiplexors 444,446 which are connected to column data lines 208, column select lines 364, and EN5V line 368. Note that inverter 448 inverts the fourth column select line 364 to enable multiplexor 444 to operate when multiplexor 446 does not and vice versa. Upon being enabled by a power signal received on EN5V line 368, the multiplexors 444,446 transfer the serial output data from the previously identified column data line 208 (and, hence, from a connector 154 of the row and column matrix of connectors 156) to an inverting Schmitt buffer 450 for output on MATRIX OUT line 408 and reception by multiplexor 402 of the receive/transmit data section 304.

Decoder 434 also provides an output signal on IDENABLE line 452 for receipt by the receive/transmit ID slot data section 310. IDSLOT line 454 is connected, via the flexible cable 216, to the positive data line of the ID slot connector to provide a bi-directional communication path.

Figure 25:
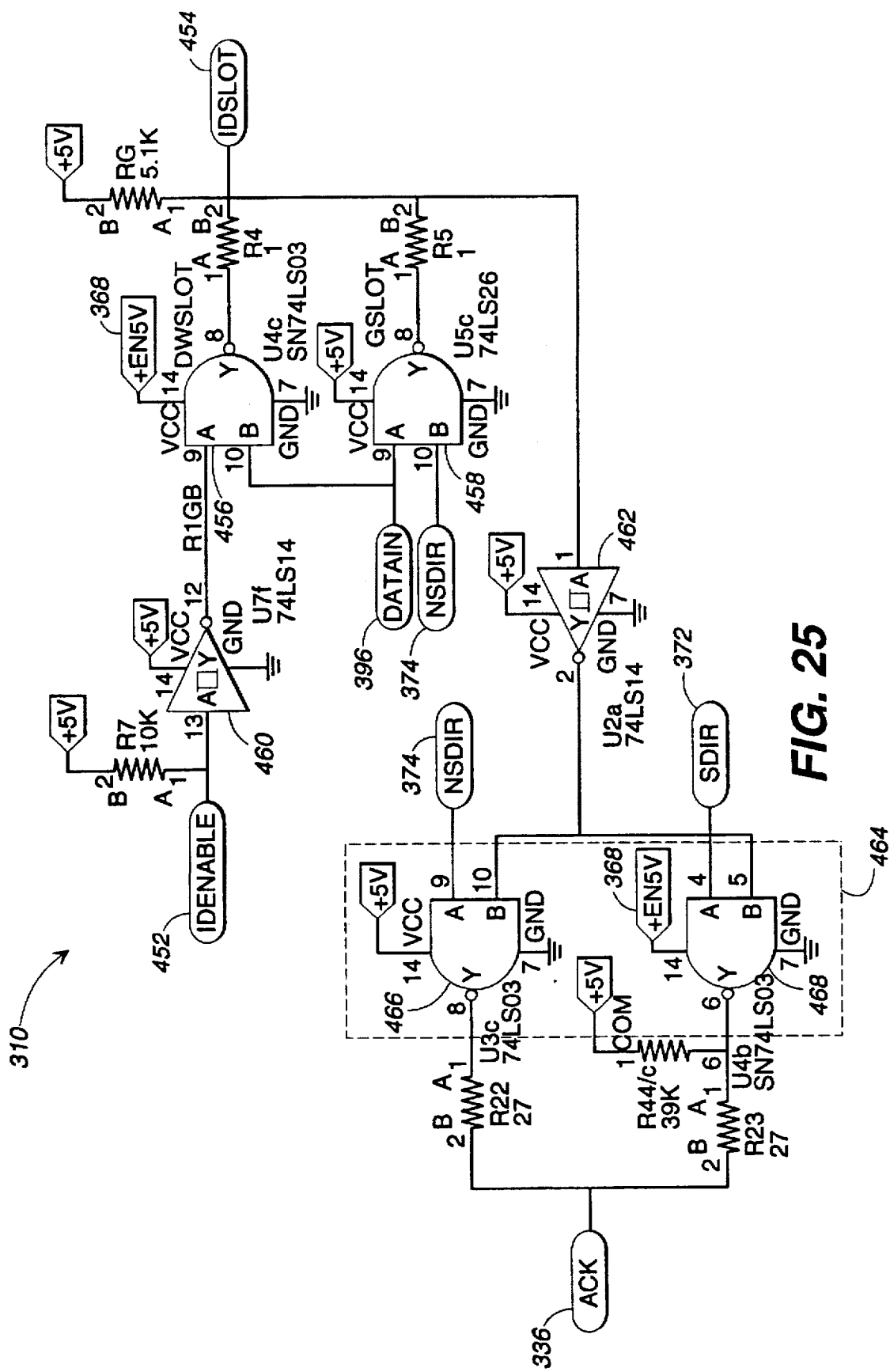
FIG. 25 is an electrical schematic of the receive/transmit ID slot data section of FIG. 19.

The receive/transmit ID slot data section 310, illustrated in FIG. 25 in accordance with the preferred embodiments of the present invention, receives a signal on the DATAIN line 396 from the receive/transmit data section 304 and supplies it to IDSLOT line 454 after selection by NAND gates 456,458 using a routing signal on the NSDIR line 374 and a routing signal on the IDENABLE line 452 which has been inverted by inverter 460. Serial data from the ID slot connector is transferred on IDSLOT line 454 to the inverting Schmitt buffer 462 for supply to a two line-to-one line multiplexor 464 comprising NAND gates 466,468. NAND gate 466 receives input serial data from IDSLOT line 454 and a selection signal on NSDIR line 374. NAND gate 468 receives input serial data from IDSLOT line 454 and a selection signal on SDIR line 372, in addition to a power signal on EN5V line 368. Upon selecting a NAND gate's output by using the selection signals on SDIR and NSDIR lines 372,374 (i.e., thereby selecting data from an ID slot of an activated drawer or a non-activated drawer), the output signal is provided on ACK line 336 to the parallel port section 300.

The transmit enclosure position section 308, seen in FIG. 26 according to the preferred embodiments of the present invention, receives a signal from the drawer switch 248 on POSITION line 224 (also referred to herein as drawer switch signal line 224). The signal is debounced utilizing an RC circuit 472 and an inverting Schmitt buffer 474. Transient voltages are suppressed by transient voltage suppressor 476. The inverting Schmitt buffer 474 provides an input signal to a multiplexor 478 including NAND gates 480,482. NAND gate 480 receives input data from the inverting Schmitt buffer 474, receives a selection signal from NSDIR line 374, and a power signal from EN5V line 368. NAND gate 482 receives input data from the inverting Schmitt buffer 474 and receives a selection signal from SDIR line 372. Upon selecting a NAND gate's output by using the selection signals on SDIR and NSDIR lines 372,374 (i.e., thereby selecting data from a drawer switch 248 of an activated drawer or a non-activated drawer), the output signal is provided on ERR line 346 to the parallel port section 300.

The lock driver section 312, according to the preferred embodiments of the present invention, is displayed in FIG. 27 and receives input signals from the inverted fourth line of the column select lines 364 of the matrix communication section 306, the third line of the column select lines 364, the NSDIR line 374, and receives a power signal on EN5V line 368. The input signals are ANDed by AND gates 484,486 to turn on and off MOSFET transistor 488. When the MOSFET transistor 488 is turned on, it causes the solenoid actuator 226 to be energized via lock signal lines 222, thereby unlocking the electrically-actuated lock mechanism 218. When the MOSFET transistor 488 is turned off, the solenoid actuator 226 is not energized, thereby enabling the keeper plate 232 to return to its locked position as shown in FIG. 17.

Figure 28:
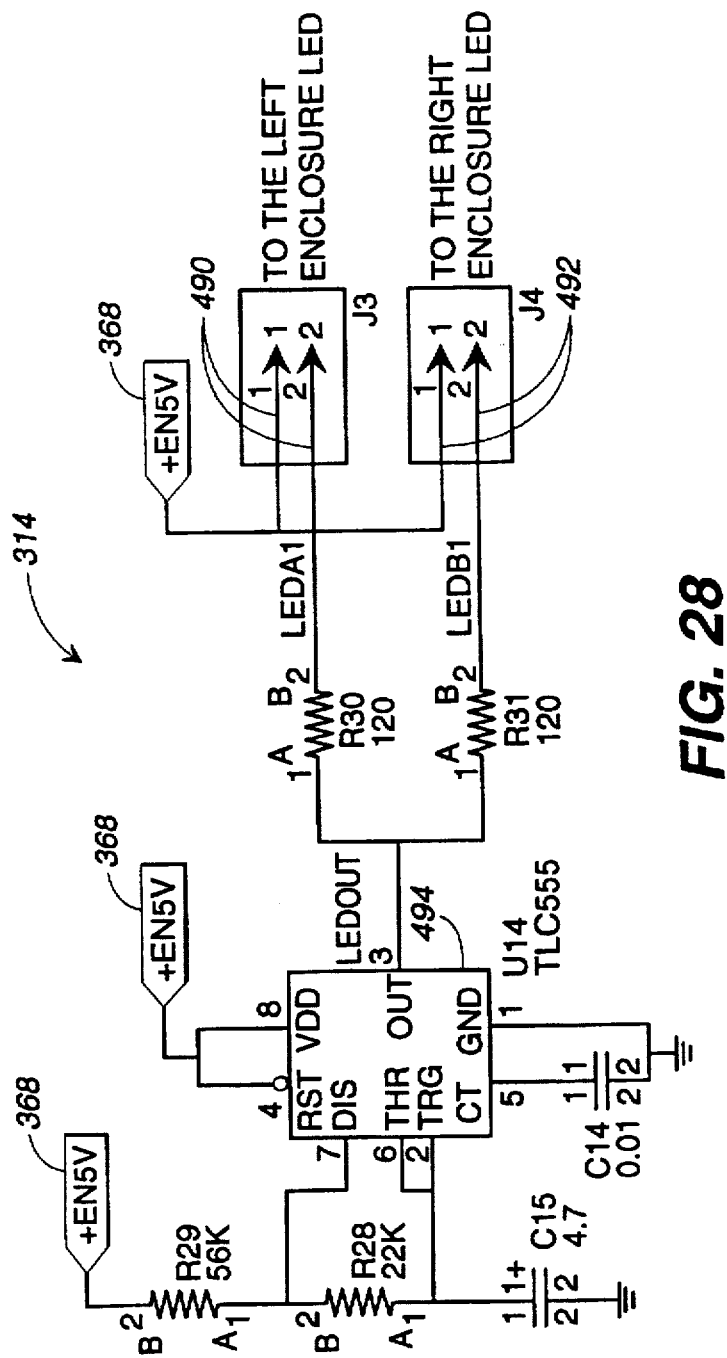
FIG. 28 is an electrical schematic of the LED driver section of FIG. 19.

The LED driver section 314, displayed in FIG. 28 in accordance with the preferred embodiments of the present invention, receives a power signal on EN5V line 368 when the drawer 98 is activated and supplies power to LED's 113 via LED lines 490,492. The LED driver section 314 includes an oscillator 494 which causes the LED's 113 to flash.

Figure 29:
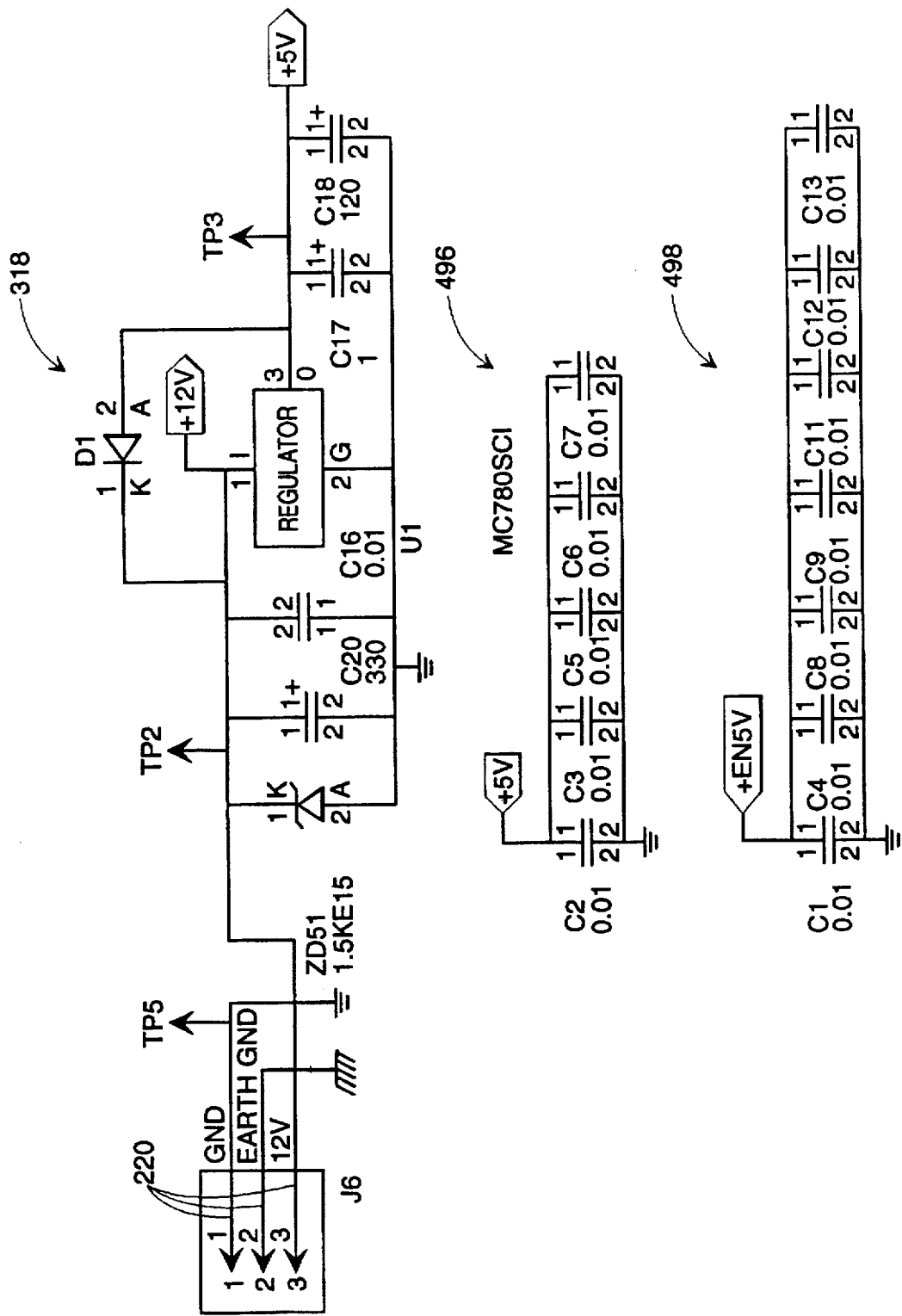
FIG. 29 is an electrical schematic of the power supply section of FIG. 19.

The power supply section 318, shown in FIG. 29 according to the preferred embodiments of the present invention, receives input power from the fuse holder 82 on the utility panel 62 and conditions and regulates the power to provide a stable source of electrical energy for the local controller 214 and related components. The power supply section 318 includes decoupling capacitors 496,498 to filter out high-speed switching noise created by the logic circuits incorporated in the local controller 214.

Figure 30:
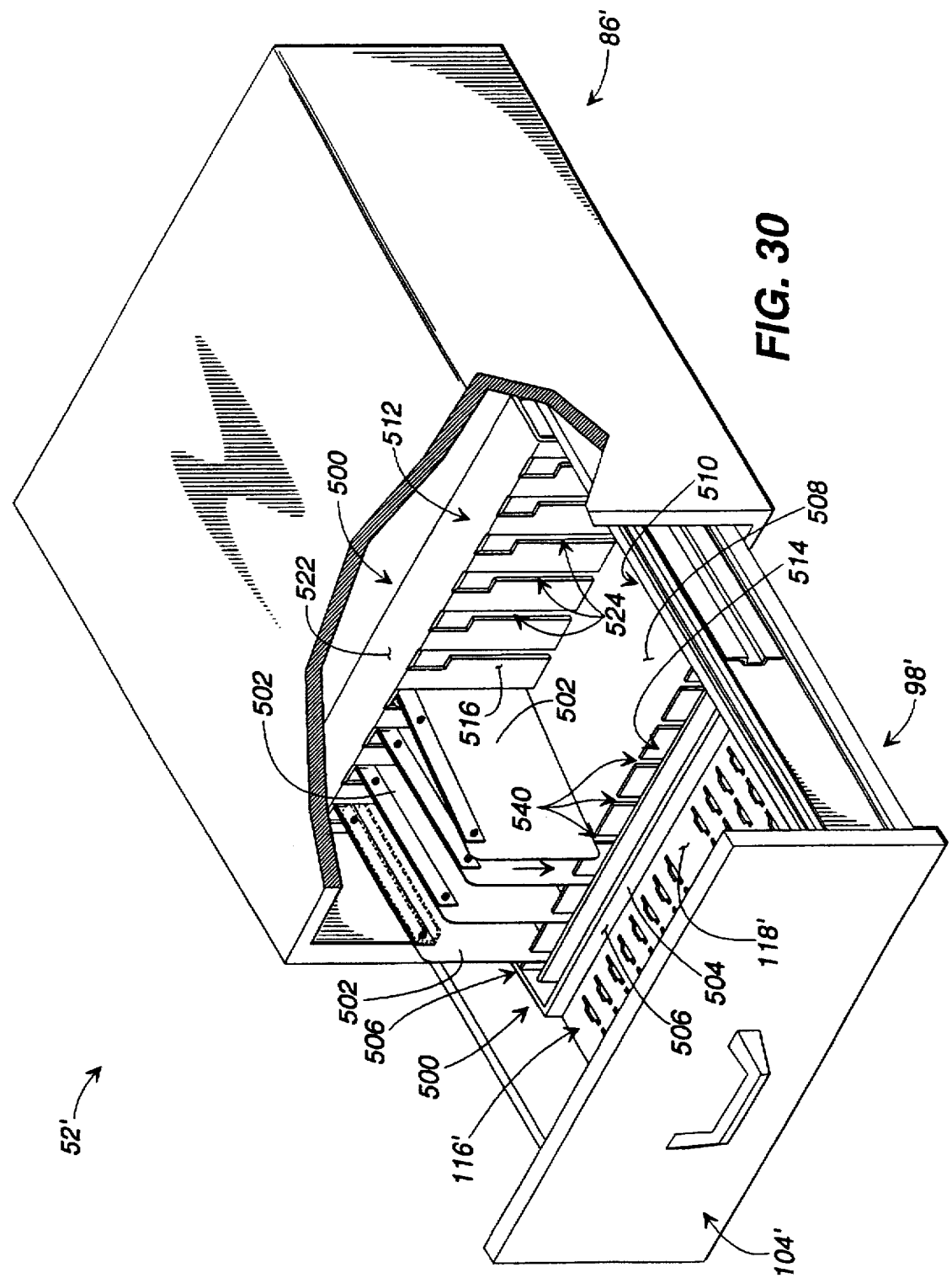
FIG. 30 is an isolated, front, perspective, schematic view of an enclosure and drawer of an inventoriable-object control and tracking system in accordance with a second preferred embodiment of the present invention.

FIG. 30 displays an isolated, front, perspective, schematic view of a storage unit 52' of an inventoriable-object control and tracking system in accordance with a second preferred embodiment of the present invention. The storage unit 52' is substantially similar to storage units 52 of the first preferred embodiment of the present invention, having an enclosure 86' and a drawer 98' with an assembly retaining structure 116' (referred to in the second preferred embodiment, as a first assembly retaining structure 116') for receipt of object identification assemblies 182' (referred to in the second preferred embodiment, as a first plurality of object identification assemblies 182') and a local controller 214', and additionally includes a second assembly retaining structure 500 for receiving object identification assemblies 502 of a second plurality of object identification assemblies 502. The second assembly retaining structure 500 rests atop the top panel 1 18' of the first assembly retaining structure 116' and comprises a base 504 (i.e., a drip pan for catching any liquid which may drop off of an object identification assembly 502 while the assembly 502 resides in the second assembly retaining structure 500) having upwardly extending walls 506 which bound a top surface 508 and define a recess 510. The second assembly retaining structure 500 further comprises a housing 512 which extends upward from the top surface 508 of the base 504 and adjacent the back member 106' of the drawer 98' and a channel member 514 which is mounted, within recess 510, atop the top surface 508 of the base 504.

Figure 31:
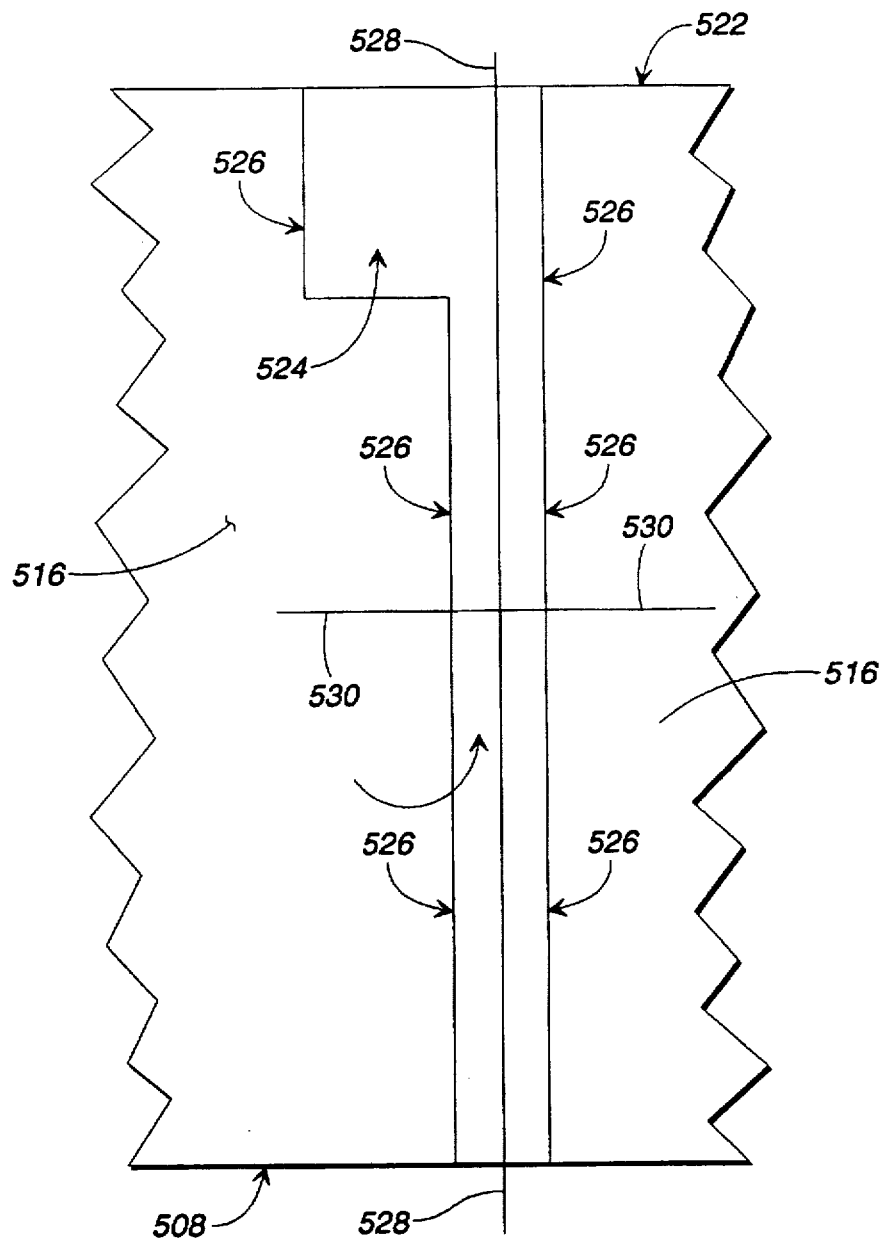
FIG. 31 is an isolated, front, elevational view of an opening of the second assembly retaining structure of FIG. 30.
Figure 36:
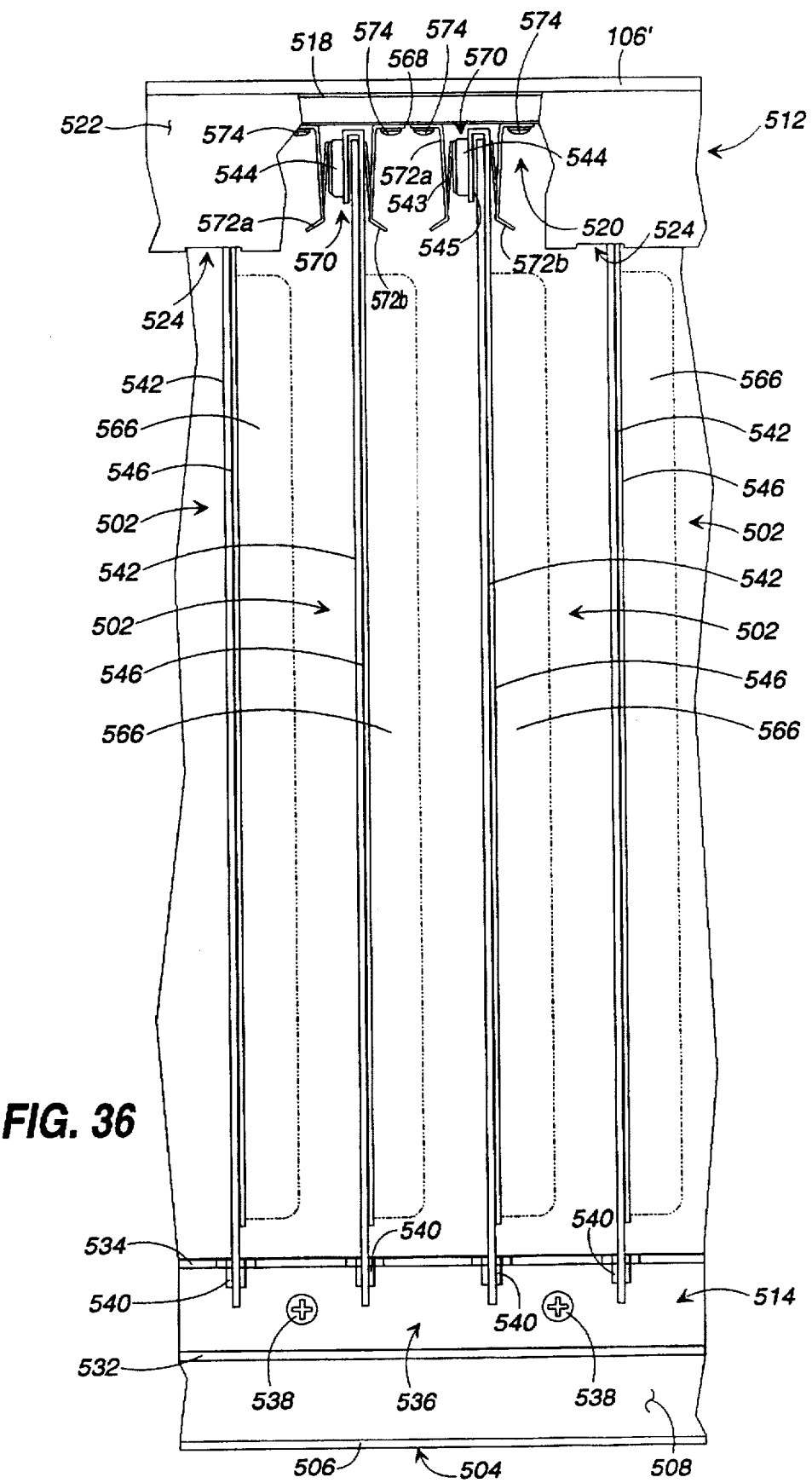
FIG. 36 is a partial, top, plan view of a second assembly retaining structure of FIG. 30.
Figure 37A:
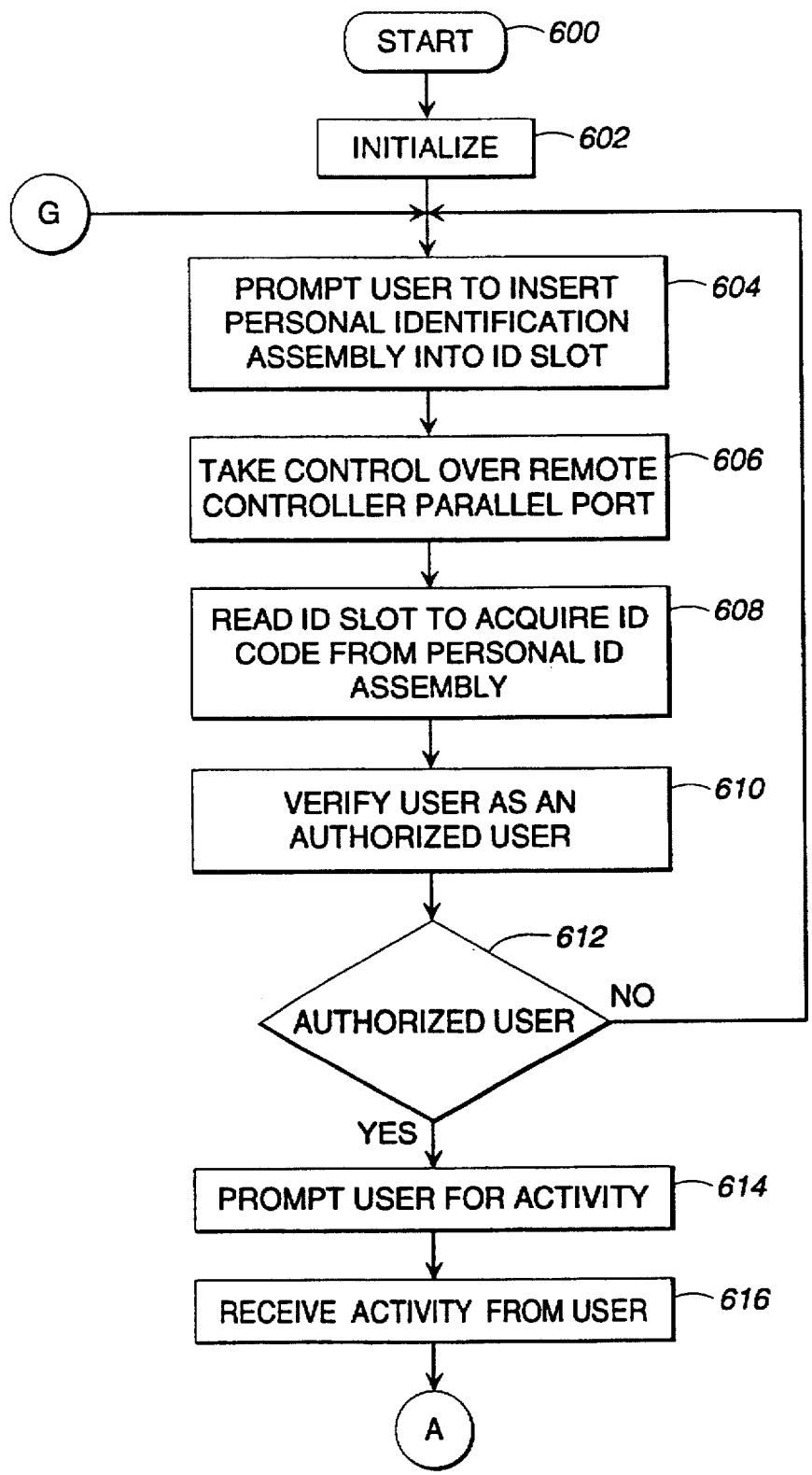
FIG. 37 is a flowchart representation of a preferred method in accordance with a preferred embodiment of the present invention.
Figure 37B:
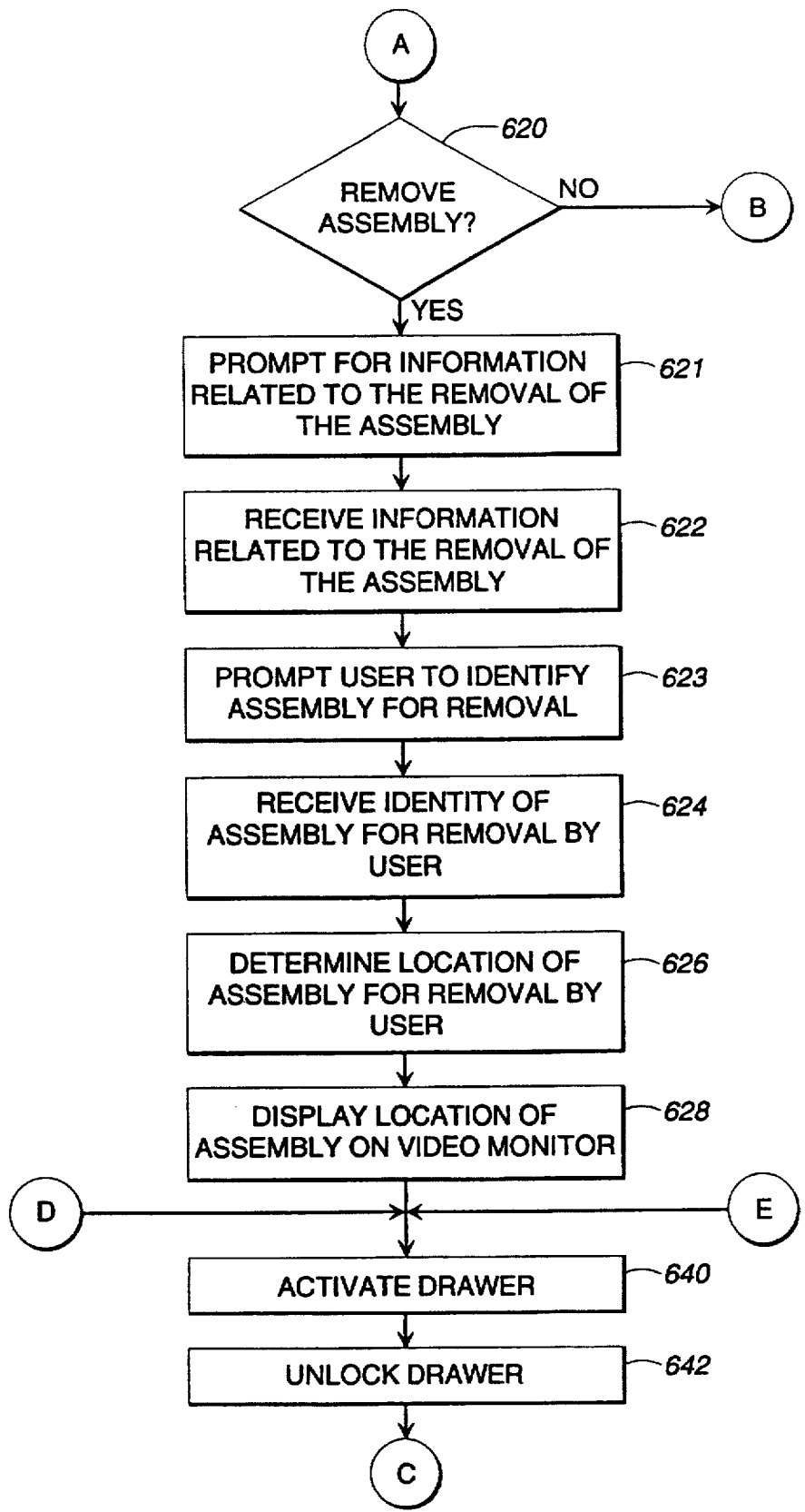
Figures 37C, 37E:
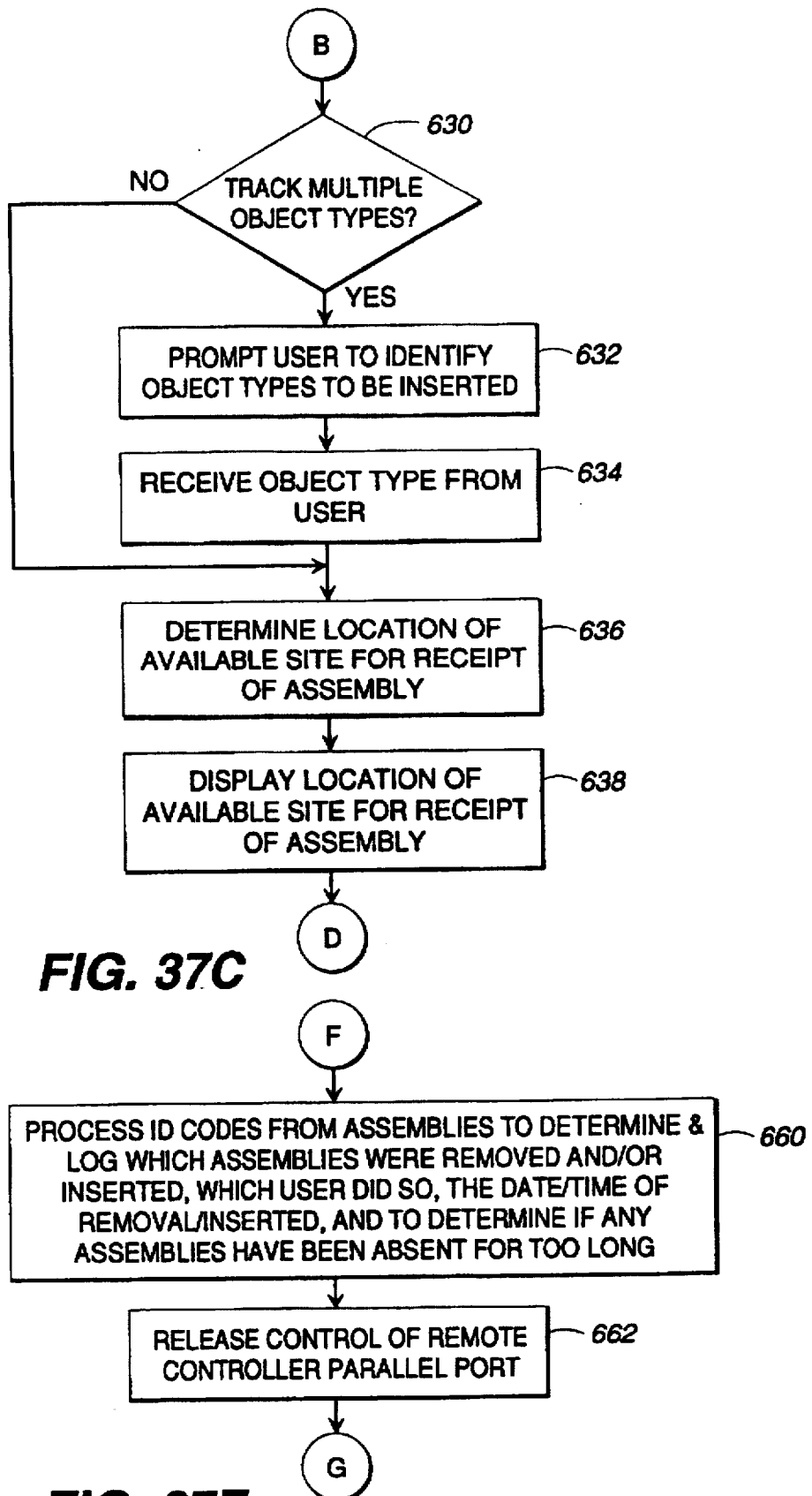
Figure 37D:
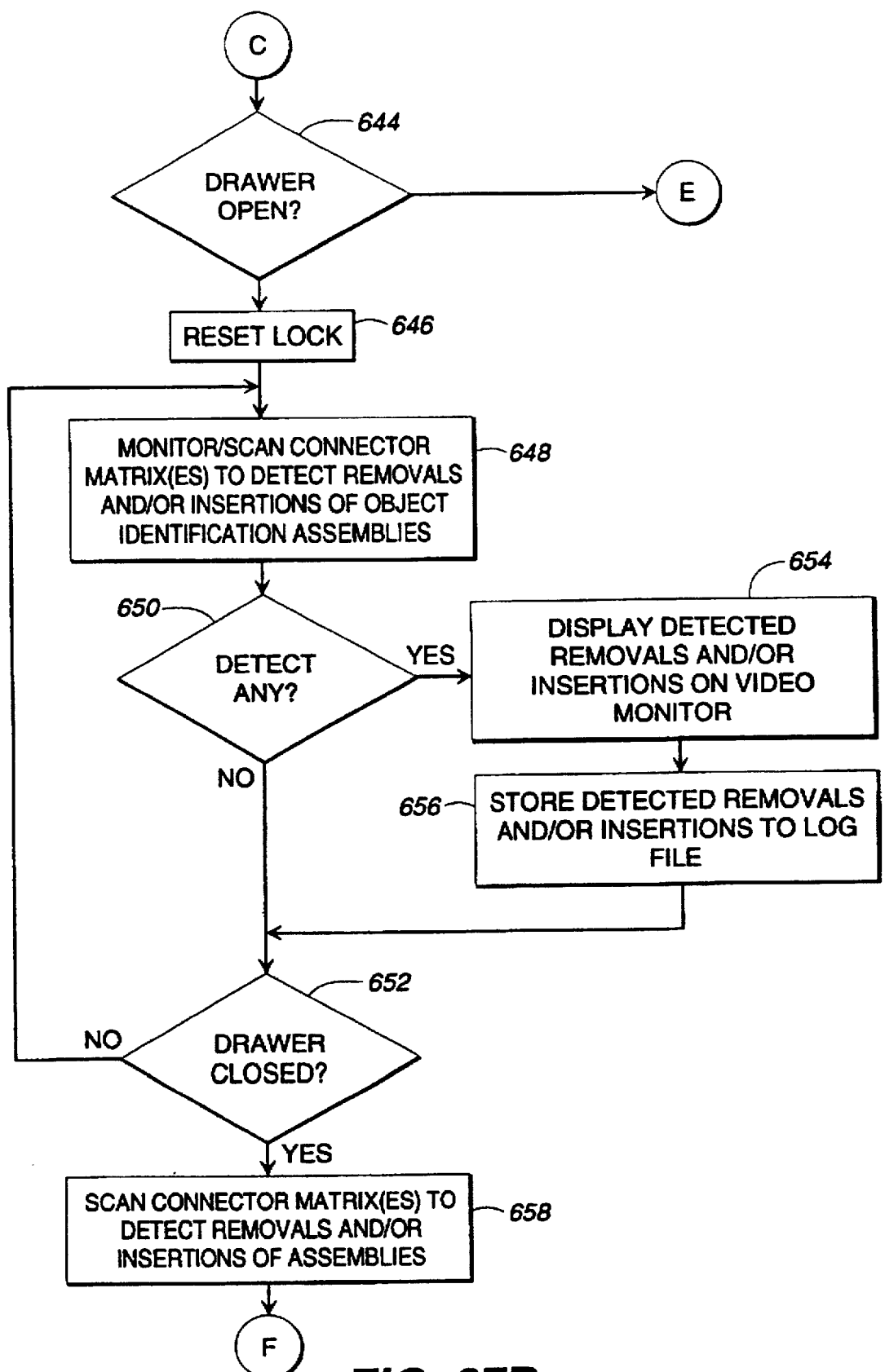

The housing 512, as seen in FIGS. 30 and 36 in accordance with the second preferred embodiment of the present invention, has a first panel 516, an opposed second panel 518, and a third panel 522 extending between the first and second panels 516,518 to partially define a cavity 520 within housing 512. The first panel 516, located nearest the front face assembly 104' of the drawer 98', defines a plurality of openings 524 with each opening 524 being defined by an edge 526 (or outer perimeter) which is shaped to receive a portion of an object identification assembly 502 of a second plurality of object identification assemblies 502 (see FIG. 33). As illustrated in FIG. 31, the first panel 516 also defines a longitudinal axis 528 and a lateral axis 530 extending through each opening 524. Note that the edge 526 defining each opening 524 is asymmetrical about both axes 528,530, thereby enabling each opening 524 to receive an object identification assembly 502 in only one orientation relative to the opening 524. Such "polarization" of each opening 524 is necessary to orient each object identification assembly 502 relative to the housing 512 for proper electrical interaction as described below. Note also that object identification assemblies 502 of the second plurality of object identification assemblies 502, as seen in FIG. 34, differ from object identification assemblies 182' of the first plurality of object identification assemblies 182' (described above with respect to the first preferred embodiment of the present invention) which are received by slots 120' of top panel 118' of first assembly retaining structure 116'.

Figure 32:
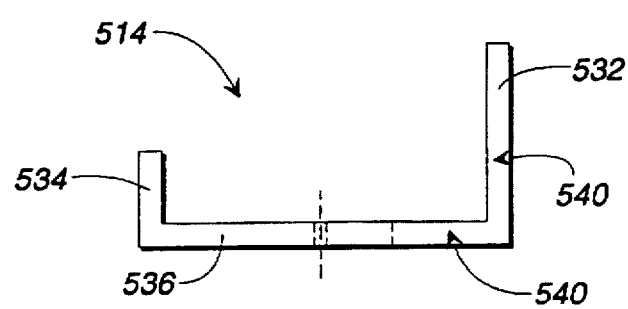
FIG. 32 is an isolated, right side, elevational view of the channel member of the drawer of FIG. 30.

The channel member 514 of the second assembly retaining structure 500, displayed in FIGS. 30, 32, and 36 in accordance with the second preferred embodiment of the present invention, has a first leg 532 and a second leg 534 connected by a web 536 which is secured to base 504 of the second assembly retaining structure 500 by fasteners 538. The legs 532,534 extend between the upwardly rising walls 506 of the base 504 of the second assembly retaining structure 500 with the first leg 532 being positioned nearer the housing 512 and the second leg 534 being positioned nearer the front face assembly 104' of the drawer 98'. The legs 532,534 also extend upward from the top surface 508 of base 504 with the first leg 532 extending to a greater elevation than the second leg 534. The first leg 532 and web 536 define a plurality of slots 540, each slot 540 being aligned with a corresponding opening 524 defined by the first panel 516 of housing 512 for receipt of an object identification assembly 502. The portions of the first leg 532 adjacent the slots 540 guide the object identification assemblies 502 during insertion and removal of object identification assemblies 502 from the second assembly retaining structure 500, and provide support for and limit lateral movement of an object identification assembly 502 present in a slot 540. Note that each slot 540, preferably, extends through the entire vertical height of the first leg 532 and through the entire thickness of the web 536 and that a corresponding opening 524, preferably, extends downward to the top surface 508 of base 504, thereby enabling a received object identification assembly 502 to contact the top surface 508 of base 504 when the assembly 502 is positioned for proper electrical interaction as described below. Note also that the vertical height of the second leg 532 is, preferably, selected to enable an object identification assembly 502 to barely clear the second leg 532 during insertion and removal of object identification assemblies 502 from the second assembly retaining structure 500.

In accordance with the second preferred embodiment of the present invention and as displayed in FIG. 33, an object identification assembly 502 comprises an object 542 to be tracked (such as, for example, but not limitation, a license plate), an electronic device 544 having a memory which stores a unique identification code, and an interface member 546 which couples the object 542 and the electronic device 544. The electronic device 544 is, like electronic device 194' of the first preferred embodiment, a DS 1990A Touch Memory Device available from Dallas Semiconductor Corporation of Dallas, Tex. and has a positive data contact 543 and a negative return contact 545. The object 542 has a front 548, a back 550, side edges 552, and a top edge 554. The interface member 546 (see FIGS. 34 and 35) wraps about side edge 552a of the object 542 and includes a first portion 556 adjacent to the front 548 of the object 542 and a second portion 558 adjacent to the back 550 of the object 542. The first portion 556 of the interface member 546 defines a hole 560 extending therethrough for receipt of the electronic device 544 which contacts, both physically and electrically, the front 548 of the object 542 near top edge 554 and side edge 552a. A crimp ring 561 resides about the electronic device 544, adjacent to the first portion 556 of the interface member 546, and secures the electronic device 544 to the interface member 546. The second portion 558 of the interface member 546 extends adjacent to the back 550 of the object 542 from side edge 552a in a direction toward side edge 552b and defines a plurality of slots 562 which receive fasteners 564, thereby securing the object 542 to the interface member 546 and electrically connecting the return line contact of the electronic device 544 to the interface member 546 and to the object 542. Note that, in accordance with the second preferred embodiment of the present invention, the object identification assembly 502 further includes a magnet-holding bracket 566 which is secured to the rear of the second portion 558 of the interface member 546. In an alternate preferred embodiment of the present invention, the magnet-holding bracket 566 is not present.

The second assembly retaining structure 500, in accordance with the second preferred embodiment of the present invention, additionally comprises a backplane 568 and plurality of connectors 570 which are substantially similar to the backplane 130' and plurality of connectors 154' of the preferred embodiment of the present invention. As seen in FIG. 36, the backplane 568 resides within housing 512 and is secured to the second panel 518 of the housing 512 in a vertical orientation by a plurality of standoffs (not visible). Each connector 570 of the plurality of connectors 570 is positioned directly behind a corresponding opening 524 of the plurality of openings 524 defined by the first panel 516 of housing 512. The connectors 570 define a matrix having, preferably, a single row and multiple columns of connectors 570. Each connector 570 comprises a pair of opposed contacts 572 (substantially similar to contacts 158' of connectors 154' of the preferred embodiment of the present invention) which are rigidly mounted to backplane 568 by rivets 574. Each contact 572a is electrically connected to one of a plurality of column data lines and each contact 572b is electrically connected to a row return line in a manner substantially similar to the contacts 158' of connectors 154'. The backplane 568 and its column data lines and row return line connect to local controller 214' via a flexible cable (not visible) in order to transfer electrical signals between the backplane 568 and the local controller 214'.

When an object identification assembly 502 is present between the contacts 572 of a particular connector 570, the positive data contact 543 engages a contact 572a and the negative return contact 545 engages a contact 572b of the particular connector 570. By selecting the column data line and row return line connected to the particular connector 570, it is possible, as described below, to determine whether or not an electronic device 544 and, hence, an object identification assembly 502 of the second plurality of object identification assemblies 502 is present between the contacts 572 of the particular connector 570. If an electronic device 544 is present, it is possible, as described below, to read the identification code stored within the electronic device 544 and, hence, the identification code of the object identification assembly 502 via the column data line.

In accordance with a preferred method of the present invention as illustrated in FIG. 37, the process starts at step 600 and advances to step 602 where the system 50 initializes itself, locates the address of the parallel port 58 of the remote controller 54 which is connected to the storage unit 52, and determines the speed at which software must execute in order to perform serial communications over parallel communication paths 58. Next, at step 604, the system 50 begins a process of identifying a user who wishes to perform an activity on an object identification assembly 182,202 such as, for example, inserting an object identification assembly 182,202 into a drawer 98 for receipt by a respective assembly retaining structure 116,500 or removing an object identification assembly 182,202 from a respective assembly retaining structure 116,500. At step 604, the system 50 prompts a user to insert his personal identification assembly into the ID slot 112 of a drawer 98 by displaying prompt text on the video monitor 60. After prompting the user, the system 50, at step 606, takes control over all access to the remote controller's parallel port 58 to prevent data collisions created by other application software programs attempting to communicate, via the parallel port 58, to the printer 56.

Once the system 50 has control over the parallel port 58, the system 50, at step 608, reads the ID slots 112 of the various drawers 98 (if more than one drawer 98 is present in the system 50 or the only ID slot 112 if only one drawer 98 is present in the system 50) on the drawers' front face 108 to acquire an identification code from the user's personal identification assembly. To read an ID slot 112, the remote controller 54 selects the ID slot 112 by generating appropriate signals on the INITIAL and SELIN lines 348,350, which are communicated through the necessary data communication link(s) 72,74 and data communication interfaces 68,70 using a serial protocol to the respective local controller 214, for supply to the positive data contact 204 of the electronic device 194 of the personal identification assembly via AFEED line 344. In response, the electronic device 194 outputs its unique identification code through its positive data contact 204 and ACK line 336 for transmission to the remote controller 54. Upon receiving the identification code contained in the personal identification assembly, the remote controller 54, at step 610, verifies that the personal identification assembly is being used by its owner by prompting the user for a password on video monitor 60, receiving a password from the user at the remote controller 54, and then determining, at step 612, whether or not the user is authorized to access the system 50 by looking-up the identification code and password in a table including authorized code/password combinations. If the user is not authorized to access the system 50, the method loops back to step 604 where the remote controller 54 prompts the user to insert his personal identification assembly. If the user is authorized to access the system 50, the method continues at step 614.

After determining that the user is authorized, the remote controller 54, at step 614, prompts the user on video monitor 60 for the type of activity that the user wishes to perform on an object identification assembly 182,502. The types of activities include for example, but not limitation, inserting (or re-inserting, or returning) an object identification assembly 182,502 into a drawer 98 for receipt by a slot 120 (or opening 524) and an associated connector 154,570, and removing an object identification assembly 182,502 from a slot 120 (or opening 524) and an associated connector 154,570 of a drawer 98. At step 616, the remote controller 54 receives input from the user, in response to the prompt, which identifies the type of activity that the user wishes to perform. Then, at step 620, the remote controller 54 evaluates the user's input to determine if the user wishes to remove an object identification assembly 182,502 and associated object from a respective assembly retaining structure 116,500.

If the remote controller 54 determines, at step 620, that the user wishes to remove an object identification assembly 182,502, the remote controller 54, according to the preferred method of the present invention, prompts the user on video monitor 60 to provide information related to the removal of an object identification assembly 182,502 at step 621. The information, for example and not limitation, may include the purpose or reason for the removal of the object identification assembly 182,502, a work order number with which the removal of the object identification assembly 182,502 is to be associated with (i.e., when the work order number is utilized in conjunction with the time of removal and time of re-insertion of an object identification assembly 182,502, the remote controller 54 may compute the amount of time required to perform the task identified by the work order number), etc. After receiving the information from the user in response to the prompt and storing the received information on storage media present in a disk drive of the remote controller 54 at step 622, the remote controller 54 prompts the user on video monitor 60 to identify an object identification assembly 182,502 for removal from a drawer 98 at step 623. The remote controller 54 receives input from the user at step 624, in response to the prompt, which identifies the object identification assembly 182,502 (and, hence, an object) for removal. Advancing to step 626, the remote controller 54 determines the location (including the slot 120 or opening 524, and the drawer 98, if more than one drawer 98 is present in the system 50) of the object identification assembly 182,502 identified by the user in step 624 by retrieving the location information from a data file, containing the location information, which is stored, preferably, on the remote controller's hard disk drive. The remote controller 54 then outputs, at step 628, the location of the identified object identification assembly 182,502 on video monitor 60 by displaying, preferably, a row and column matrix representative of the connectors 154,570 of the assembly retaining structure 116,500 in which the identified object identification assembly 182,502 resides and by indicating, on the display, the particular row and column of the matrix in which the identified object identification assembly 182,502 is present. The remote controller 54 also, preferably, displays an identifier which distinguishes the drawer 98 in which the identified object identification assembly 182,502 resides. After outputting the location of the object identification assembly 182,502 identified by the user, the method continues at step 640 as described below.

If the remote controller 54 determines, at step 620, that the user wishes to insert (or re-insert) an object identification assembly 182,502 into a drawer 98, the remote controller 54, according to the preferred method of the present invention, determines whether or not the system 50 tracks multiple types of objects (for example and not limitation, vehicle keys and vehicle license plates) by reading and evaluating data stored in a configuration file residing on the remote controller's hard disk at step 630. If the system 50 determines, at step 630, that it is configured to track only one type of object, the method advances to step 636, described below.

If the system 50 determines, at step 630, that it is configured to track multiple types of objects, the remote controller 54 prompts the user, at step 632, to prompt the user, on video monitor 60, to identify the type of object to be inserted into a drawer 98 for receipt by a slot 120 or opening 524 (and respective connectors 154,570) of a respective assembly retaining structure 116,500. The remote controller 54, at step 634, receives input from the user, in response to the prompt at step 632, which identifies the type of object to be inserted into a drawer 98.

At step 636, the remote controller 54 determines, based on the type of object to be received from the user by a drawer 98, the location (including the slot 120 or opening 524, and the drawer 98, if more than one drawer 98 is present in the system 50) of a site which is available for receipt of the object identification assembly 182,502 by retrieving and comparing location and configuration information from data files stored, preferably, on the remote controller's hard disk drive. The location information includes the locations of each object identification assembly 182,502 which currently resides in an assembly retaining structure 116,500 of a drawer 98 and the configuration information includes the locations of the slots 120, or openings 524, which are available in a particular drawer 98 when the drawer 98 contains no object identification assemblies 182,502. After determining the location of an available site for receipt of an object identification assembly 182,502, the remote controller 54 then outputs, at step 638, the location of the available site on video monitor 60 by displaying, preferably, a row and column matrix representative of the connectors 154,570 of the assembly retaining structure 116,500 in which the available site is present and by indicating, on the display, the particular row and column of the matrix in which the available site is present. The remote controller 54 also, preferably, displays an identifier which identifies the drawer 98 in which the available site resides. After outputting the location of the available site, the method advances to step 640 as described below.

According to the preferred method of the present invention, the remote controller 54, at step 640 activates the appropriate storage unit 52, containing the object identification assembly 182,502 to be removed or containing an available site for receipt of an object identification assembly 182,502, by establishing communications with the unit's addressable switch 394 through generation of appropriate signals on the INITIAL and SELIN lines 348,350 and communicating the unique address of the addressable switch 394 to the addressable switch 394. Once the addressable switch 394 replies to the remote controller 54, acknowledging receipt of its unique address, appropriate signals are sent to the addressable switch 394 over the AFEED line 344 to toggle the status of the switch's bidirectional port to an active state, thereby enabling the supply of electrical power (which was previously not supplied) to the remainder of the local controller 214.

Advancing to step 642, the remote controller 54 unlocks the appropriate drawer 98 by actuating the drawer's lock mechanism 218. In order to energize the lock solenoid 226, the remote controller 54 generates the appropriate signals on the INITIAL and SELIN lines 348,350 and supplies an energize signal on data lines 334. Then, at step 644, the remote controller 54 checks to see if the drawer 98 is open by generating the appropriate signals on the INITIAL and SELIN lines 348,350 and by reading the signal present on the ERR line 346. If the signal has a logical low level, the drawer 98 is not open and the method loops back to step 640 to maintain energization of the lock solenoid 226. If the signal has a logical high level, the drawer 98 is open and the method continues at step 646 where the lock mechanism 218 is reset by removing the energize signal on data lines 334 to deenergize the lock solenoid 226.

At step 648, the system 50 monitors, or scans, the object identification assemblies 182,502 to detect which, if any, assemblies 182,502 are present in the drawer 98. Detection of the assemblies 182,502 is accomplished by the remote controller 54 selecting each connector 154,570 of a row and column matrix of connectors 154,570 (by transmitting the row and column addresses of the connector 154,570 to the local controller 214) and attempting to read output data from the data output contact of an electronic device 194 (by supplying appropriate data signals to the data output contact and waiting for a response from the electronic device 194) which may or may not be present in the selected connector 154,570. If an object identification assembly 182,502 (and, hence, an electronic device 194) is present in the selected connector 154,570, output data, including the unique identification code of the electronic device 194, is communicated by the local controller 214 to the remote controller 54 on BUSY line 332. The remote controller 54 stores the identification code and location of the object identification assembly 182,502 in a list for subsequent review. If no object identification assembly 182,502 is present in the selected connector 154,570, no output data is detected by the remote controller 54, within an appropriate period of time, and the remote controller 54 proceeds to attempt to read output data from the next connector 154,570 of the row and column matrix of connectors 154,570 being monitored until all connectors 154,570 have been selected for reading.

In accordance with the preferred method, the remote controller 54 detects, at step 650, whether or not any object identification assemblies 182,502 have been inserted or removed from the drawer 98 by comparing the identification codes of the assemblies 182,502 which discovered and stored in a list at step 648 with the identification codes of the assemblies 182,502 which were discovered and stored in a different list on the remote controller's hard disk drive at a previous point in time. If no object identification assembly 182,502 removals or insertions are detected at step 650, the method advances to step 652, as discussed below, where the remote controller 54 checks to see whether or not the drawer 98 is closed. If object identification assembly 182,502 removals or insertions are detected at step 650, the remote controller 54 outputs the identification codes of the assemblies 182,502 which were removed or inserted on the video monitor 60 at step 654. The removed or inserted object identification assemblies 182,502 are then stored, at step 656, in a log file by the remote controller 54 to replace the previous list of assemblies 182,502 which are present in an assembly retaining structure 116,540 of the drawer 98. The stored information includes the user's identification code, the object identification code, and the date and time of the activity. At step 652, the remote controller 54 checks to see if the drawer 98 is closed by generating the appropriate signals on the INITIAL and SELIN lines 348,350 and reading the signal present on the ERR line 346. If the signal has a logical low level, the drawer 98 is determined to be closed and the method advances to step 658. If the signal has a logical high level, the drawer 98 is determined to be open and the method loops back to step 648 to scan the object identification assemblies 182,502 present in the drawer 98.

The remote controller 54, at step 658, reads the identification codes of the object identification assemblies 182 which are present in the drawer 98. To read the identification codes, the remote controller 54, as described above, scans the connectors 154,570 by selecting each connector 154,570 of each row and column matrix of connectors 154,570 and attempting to read output data, on BUSY line 332, from an electronic device 194 which may or may not be present in the selected connector 154,570. Then, at step 660, the remote controller 54 processes the identification codes held by the connectors 154,570 and received from the object identification assemblies 182,502 at step 658, as described above, to determine and log which assemblies 182,502 were removed and/or inserted, which user did so, and the date and time when the removal or insertion was made by the user. The remote controller 54 also determines, by comparing the identification codes of the assemblies 182,502 presently in the drawer 98 with those already removed from the drawer 98 and with an acceptable amount of time stored in a configuration file on the remote controller 54, which assemblies 182,502 have been absent from the drawer 98 for an excessive amount of time and displays them on the video monitor 60. Additionally, the remote controller 54 performs supplementary data processing related to, and in conjunction with, the information collected from the user at step 622. For instance, the amount of time required to do a job may be computed from the time of removal and re-insertion of an object identification assembly 182,502 (i.e., connected to a door key) and associated with a work order number, the amount of time spent on vehicle test drives may be computed from the times of removals and re-insertions of object identification assemblies 182,502 (i.e., connected to vehicle keys) and associated with the salesperson who accessed the assemblies 182,502, etc. Advancing to step 662, control over the remote controller's parallel port 58 is released and the method loops back to step 604 where the user is prompted to insert his personal identification assembly.

In accordance with an alternate preferred method of the present invention, the identification codes of the object identification assemblies 182,502 are loaded into the remote controller 54 for later use by receiving the assemblies 182,502 in the front face ID slot 112 of a drawer 98 and then by reading their identification codes. After reading, the identification codes are associated with descriptive information related to the object being controlled and tracked by the system 50.

Whereas this invention has been described in detail with particular reference to its most preferred embodiments, it is understood that variations and modifications can be effected within the spirit and scope of the invention, as described herein before and as defined in the appended claims. The corresponding structures, materials, acts, and equivalents of all means or step plus function elements in the claims below are intended to include any structure, material, or acts for performing the functions in combination with other claimed elements as specifically claimed.

I claim:

1. An object tracking system for tracking the removal of an object from a location and the replacement of the object at the location, said object tracking system comprising:

a trackable unit associated with the object to be tracked, said trackable unit carrying electronic memory means storing data uniquely identifying said trackable unit and its associated object, said electronic memory means having first and second electrically conducting surfaces for transmission of its stored data;

a panel defining a row and column matrix of receptacles, said trackable unit being selectively insertable in and removable from any of said receptacles of said matrix;

an electrical connector associated with each of said receptacles of said matrix for operatively engaging said memory means of said trackable unit when said trackable unit is inserted into the receptacle;

each electrical connector having a first contact associated with the column of its receptacle for engaging said first surface of said memory means and a second contact associated with the row of its receptacle for engaging said second surface of said memory means;

said first contact of each electrical connector in one column of said matrix being electrically connected to a common column data line and said second contact of each electrical connector on one row of said matrix being electrically connected to a common row data line, said row data lines and said column data lines defining a row and column matrix of data lines;

a pull-up resistance connected between each column data line and a voltage source;

a bleeder resistance connected between each row data line and a grounding potential, said pull-up resistances and said bleeder resistances preventing false triggering of memory devices located in said receptacles as a result of cross-talk; and control means coupled to said row and column data lines for accessing and processing the data stored in said electronic memory means of said trackable unit when said trackable unit is present in one of said receptacles to determine the presence or absence of said trackable unit.

2. An object tracking system as claimed in claim 1 and wherein said electrical connectors are fixed to a backplane located behind said receptacles with each electrical connector being aligned with its associated receptacle.

3. An object tracking system comprising a plurality of electronic memory devices each storing data uniquely identifying an object to be tracked, a communication matrix created by conducting columns and rows of data communication lines defining communication nodes, each of said communication nodes being configured to couple with any one of said electronic memory devices when present at said communication node to define a data communication path from the conducting column of said node, through said electronic memory device, and to the conducting row of said node, a controller coupled to said conducting columns and rows for accessing and processing data stored in electronic memory devices located at nodes of said communication matrix, and a bleeder resistance coupled between each of said conducting rows and a grounding potential to inhibit accidental triggering of electronic memory devices located at the nodes of said communication matrix.

4. An object tracking system as claimed in claim 3 and further comprising a pull-up resistance coupled between each of said conducting columns and a voltage source to further inhibit accidental triggering of electronic memory devices located at the nodes of said communication matrix.

5. An object tracking system as claimed in claim 4 and wherein each of said nodes is defined by a pair of electrical contacts fixed to a backplane with one of said contacts being coupled to a conducting row and the other one of said contacts being coupled to a conducting column, said pair of contacts being configured to receive and couple with any one of said electronic memory devices.

6. An object tracking system as claimed in claim 5 and wherein each of said electronic memory devices is attached to a trackable unit associated with an object to be tracked and wherein said system further comprises a frame defining a matrix of receptacles into which said trackable units can be selectively inserted and removed, said frame being positioned over said backplane with each of said receptacles being aligned with a selected pair of contacts on said backplane in such a way that said contacts couple with said electronic memory device of a trackable unit when the trackable unit is inserted into a receptacle.

* * * * *